United States Patent
Chun et al.

(10) Patent No.: US 10,728,799 B2
(45) Date of Patent: Jul. 28, 2020

(54) METHOD FOR TRANSMITTING DATA IN WIRELESS COMMUNICATION SYSTEM AND DEVICE THEREFOR

(71) Applicant: LG ELECTRONICS INC., Seoul (KR)

(72) Inventors: Jinyoung Chun, Seoul (KR); Kiseon Ryu, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 20 days.

(21) Appl. No.: 15/770,440

(22) PCT Filed: Oct. 24, 2016

(86) PCT No.: PCT/KR2016/011946
§ 371 (c)(1),
(2) Date: Apr. 23, 2018

(87) PCT Pub. No.: WO2017/069589
PCT Pub. Date: Apr. 27, 2017

(65) Prior Publication Data
US 2018/0317128 A1    Nov. 1, 2018

Related U.S. Application Data

(60) Provisional application No. 62/249,902, filed on Nov. 2, 2015, provisional application No. 62/245,298, filed on Oct. 23, 2015.

(51) Int. Cl.
*H04W 28/06*    (2009.01)
*H04W 74/00*    (2009.01)
(Continued)

(52) U.S. Cl.
CPC ........ *H04W 28/065* (2013.01); *H04B 7/0617* (2013.01); *H04B 7/0626* (2013.01);
(Continued)

(58) Field of Classification Search
None
See application file for complete search history.

(56) References Cited

U.S. PATENT DOCUMENTS 9,071,491 B2    6/2015   Lee et al.
2008/0049654 A1  2/2008   Otal et al.
(Continued)

FOREIGN PATENT DOCUMENTS

KR    1020140130128    11/2014
WO    2012057960    5/2012

OTHER PUBLICATIONS

European Patent Office Application Serial No. 16857846.6, Search Report dated Mar. 25, 2019, 8 pages.
(Continued)

*Primary Examiner* — Yemane Mesfin
*Assistant Examiner* — Jeff Banthrongsack
(74) *Attorney, Agent, or Firm* — Lee Hong Degerman Kang Waimey

(57) ABSTRACT

According to one embodiment of the present invention, an operation method for a station (STA) in a wireless LAN (WLAN) system comprises the steps of receiving a first physical protocol data unit (PPDU), and transmitting a second PPDU as a response to the first PPDU, wherein the first or second PPDU includes at least one MAC protocol data unit (MPDU), a MAC header of the MPDU includes a high-efficiency (HE) control field, the HE control field is a high throughput (HT) field, in which each of values of a very high throughput (VHT) sub-field indicating a VHT format and an HE sub-field indicating an HE format is set to "1",
(Continued)

and includes at least one control sub-field, and the at least one control sub-field is fixed at a preset length and can be included in the HE control field by being aggregated for each control identifier (ID).

12 Claims, 18 Drawing Sheets

(51) Int. Cl.
*H04W 80/02* (2009.01)
*H04W 28/02* (2009.01)
*H04W 84/12* (2009.01)
*H04L 1/00* (2006.01)
*H04L 1/16* (2006.01)
*H04B 7/26* (2006.01)
*H04B 7/06* (2006.01)
*H04L 5/00* (2006.01)
*H04L 29/06* (2006.01)

(52) U.S. Cl.
CPC ............ *H04B 7/26* (2013.01); *H04L 1/0003* (2013.01); *H04L 1/1614* (2013.01); *H04L 5/0055* (2013.01); *H04L 69/04* (2013.01); *H04W 28/0278* (2013.01); *H04W 28/06* (2013.01); *H04W 74/00* (2013.01); *H04W 80/02* (2013.01); *H04W 84/12* (2013.01)

(56) References Cited

U.S. PATENT DOCUMENTS

2013/0235836 A1* 9/2013 Roh ...................... H04L 1/0031
370/329
2016/0366254 A1* 12/2016 Asterjadhi ............ H04L 69/324

OTHER PUBLICATIONS

Asterjadhi, A. et al., "HE A-Control filed", doc.: IEEE 802.11-15/1121r0, XP068098372, Sep. 2015, 18 pages.
Merlin, S. et al., "VHT Control and Link Adaptation", doc.: IEEE 802.11-11/0040r0, XP068035411, Jan. 2011, 16 pages.
PCT International Application No. PCT/KR2016/011946, International Search Report dated Jan. 31, 2017, 2 pages.

* cited by examiner

[FIG. 1]
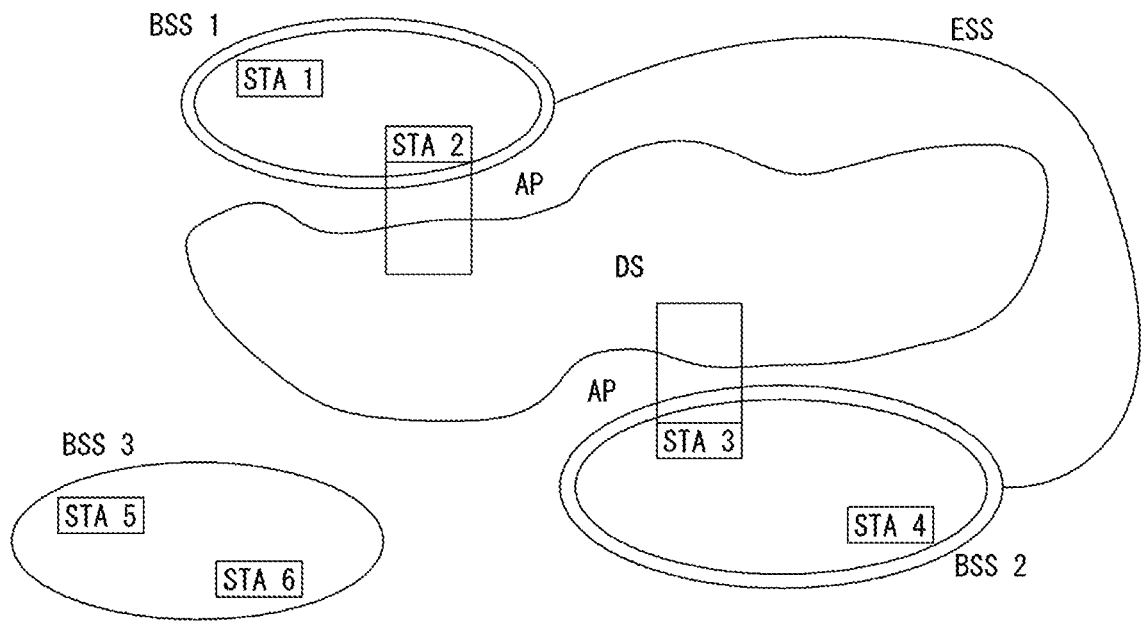
[FIG. 2]
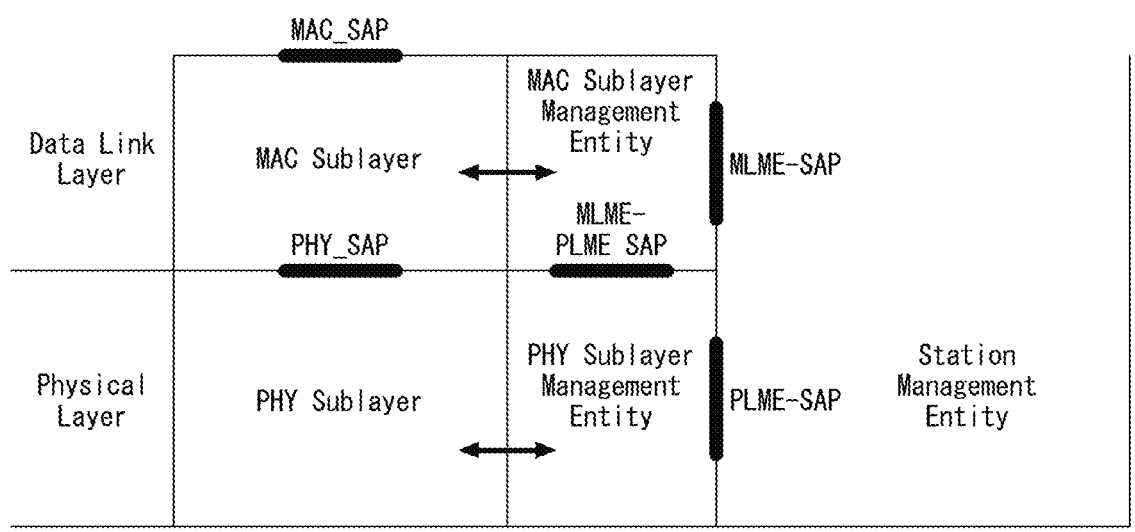

[FIG. 3]
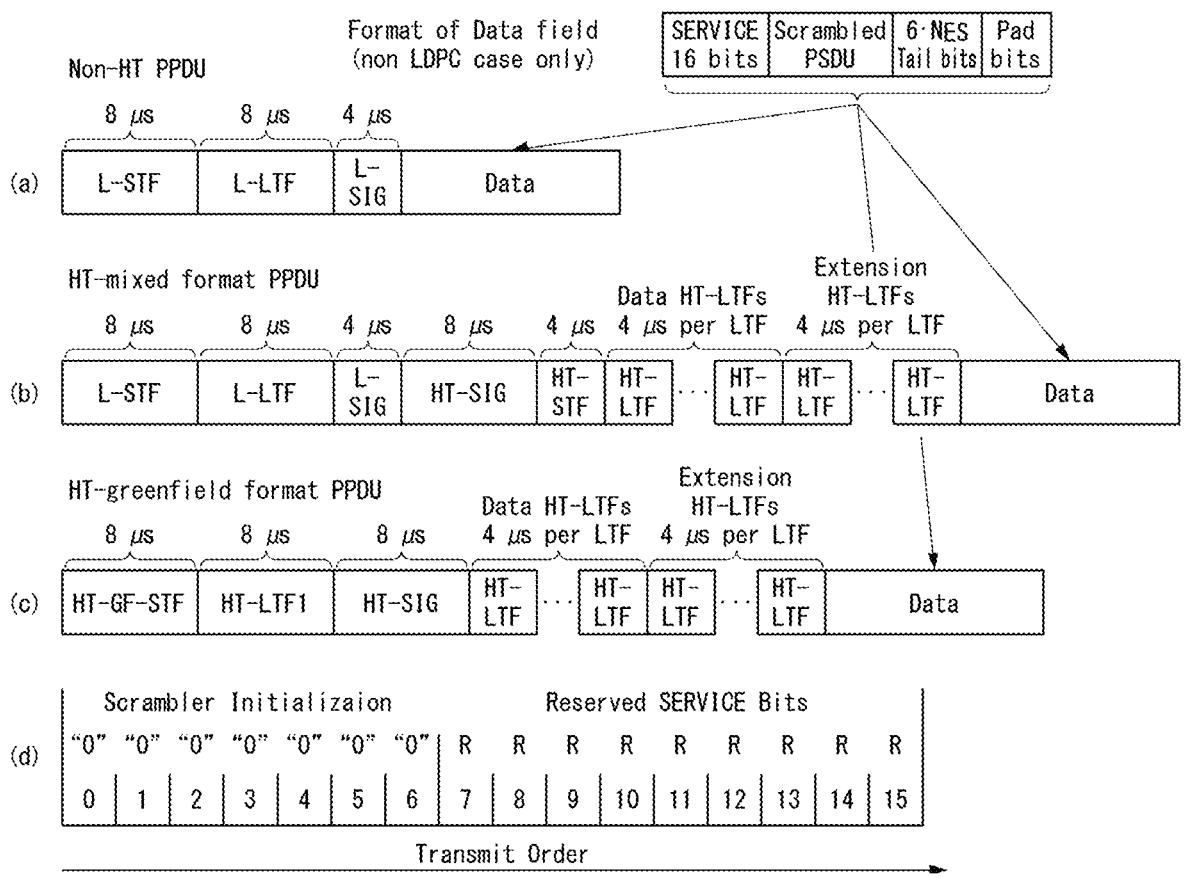

[FIG. 4]
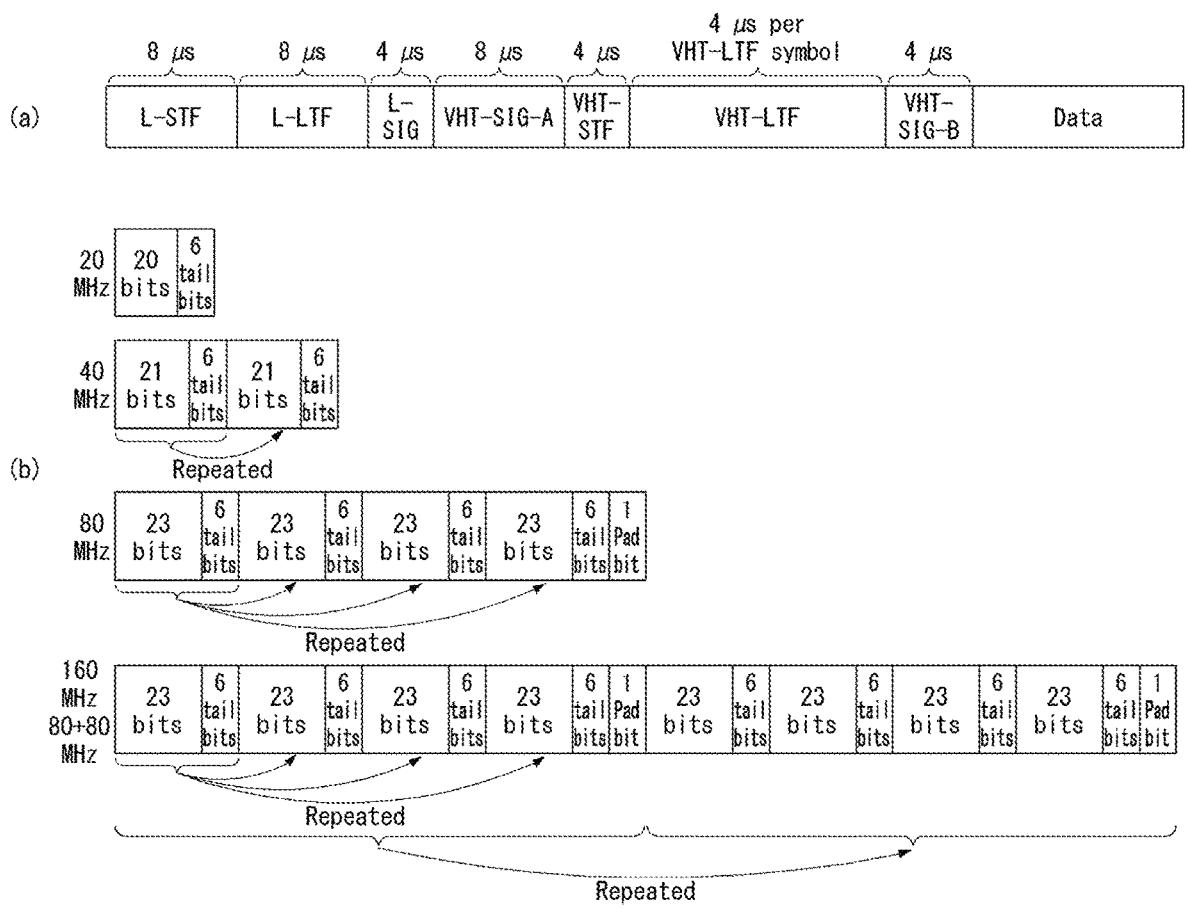

【FIG. 5】
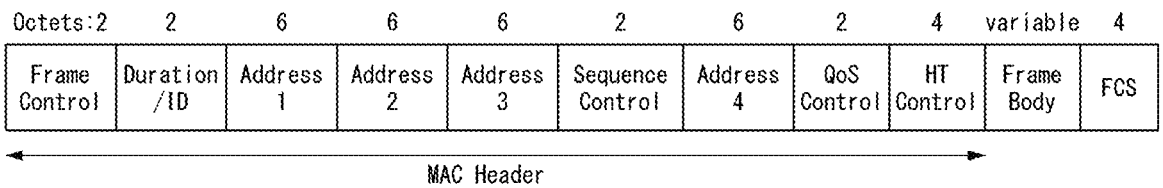
【FIG. 6】
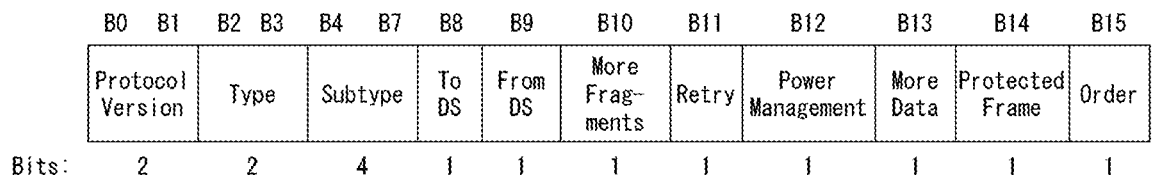
【FIG. 7】
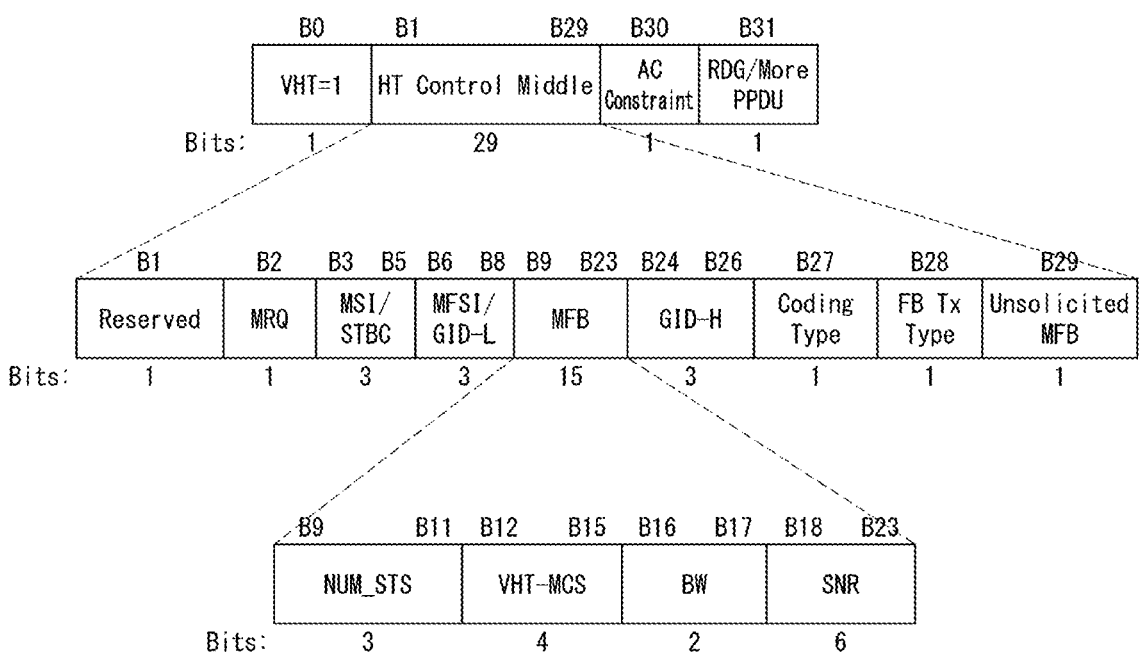

[FIG. 8]
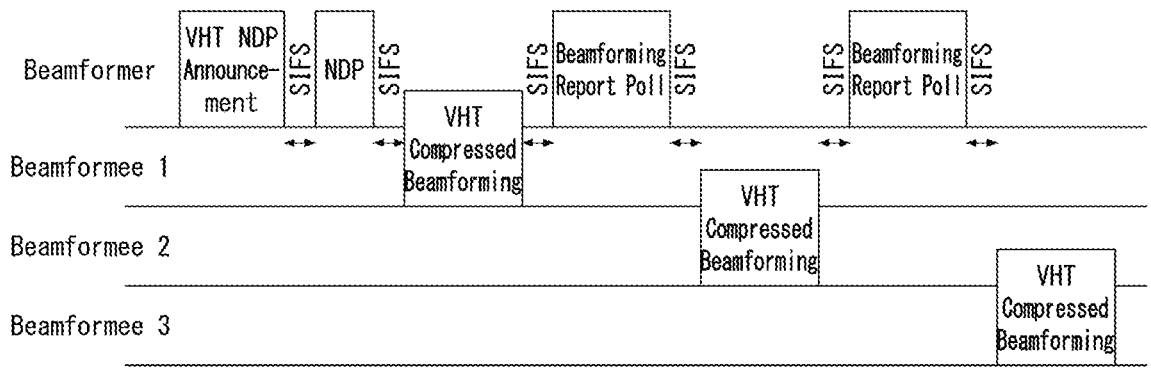
[FIG. 9]
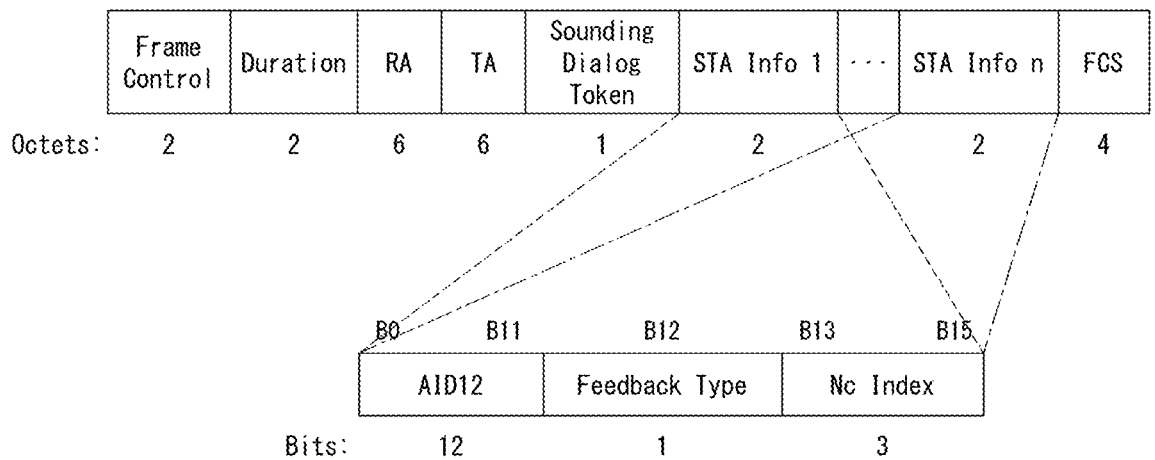
[FIG. 10]
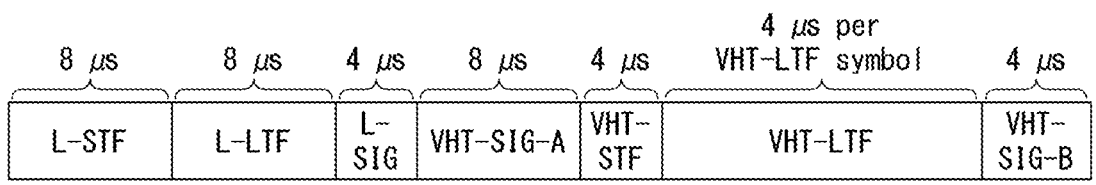

【FIG. 11】
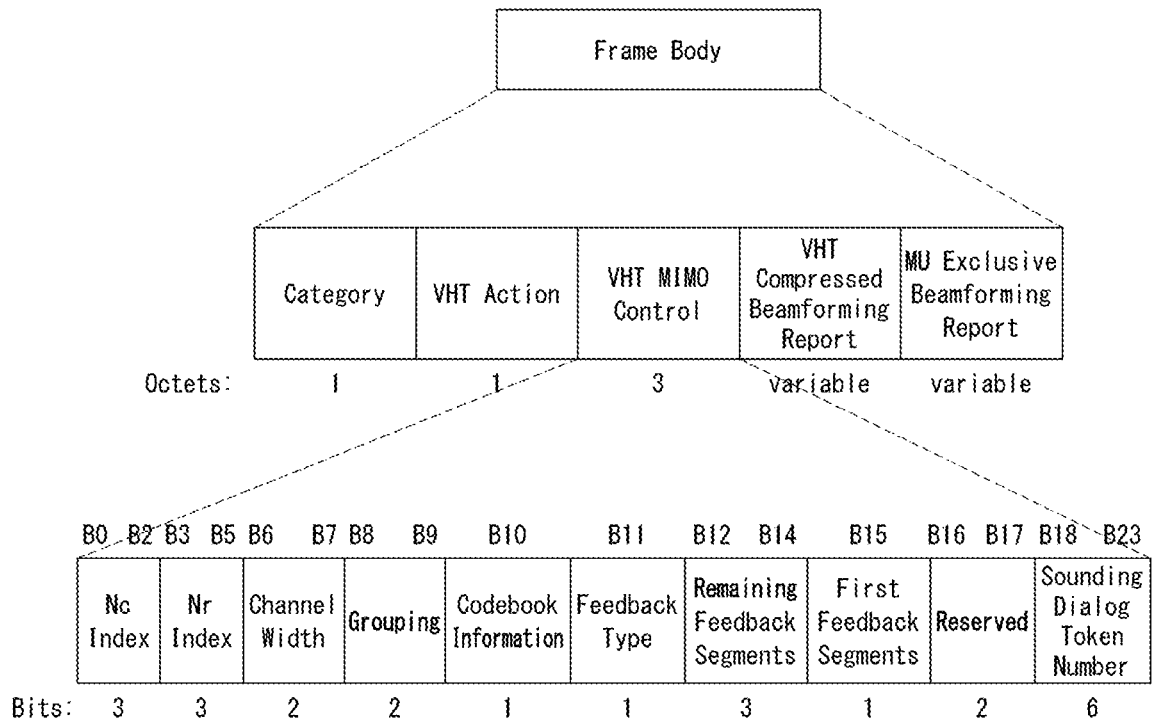
【FIG. 12】
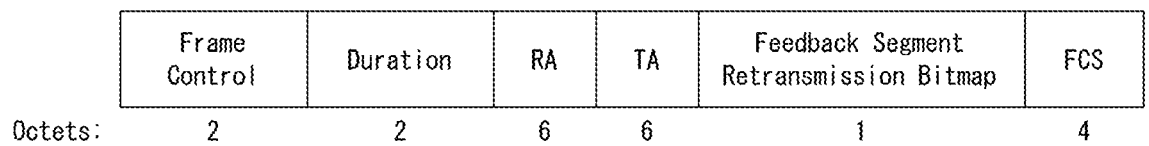
【FIG. 13】
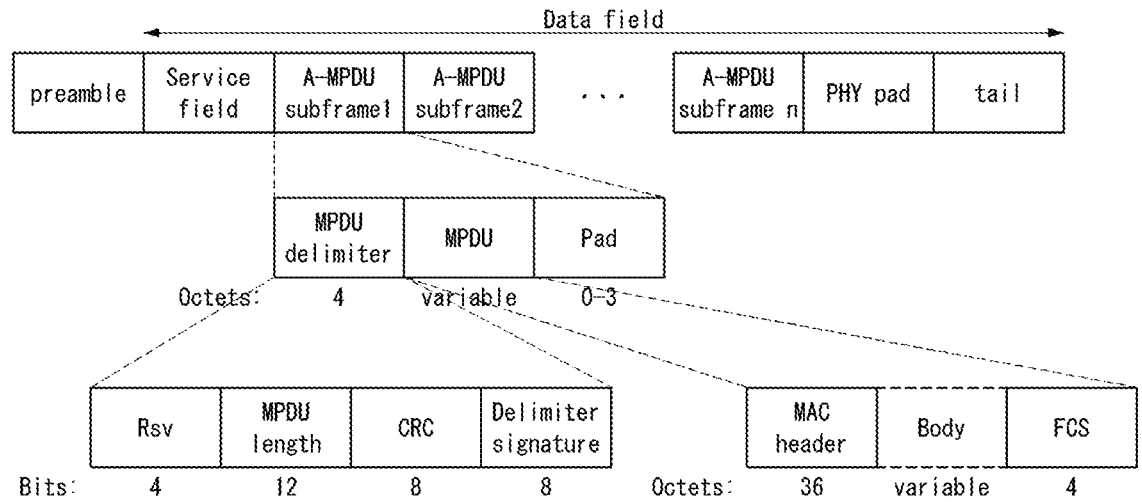

【FIG. 14】
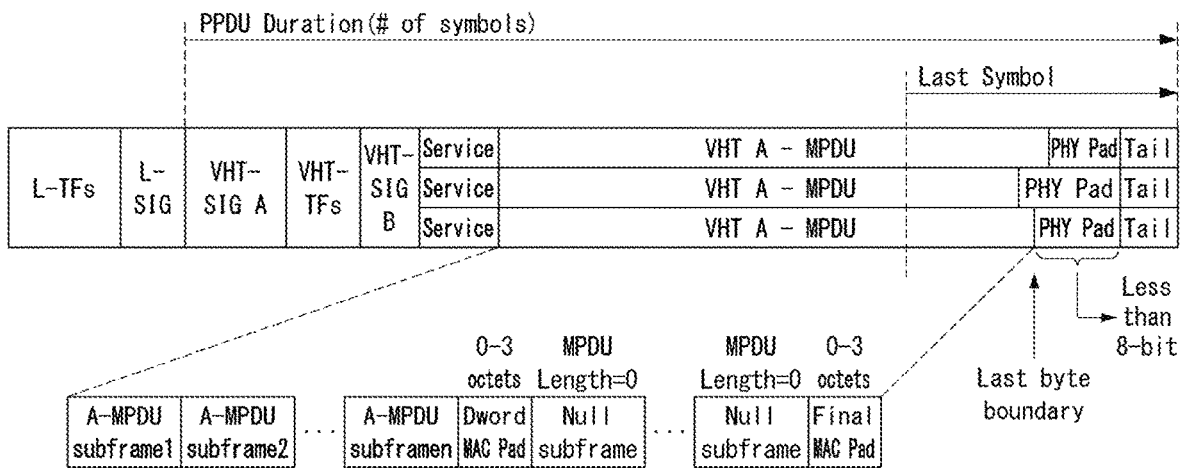
【FIG. 15】
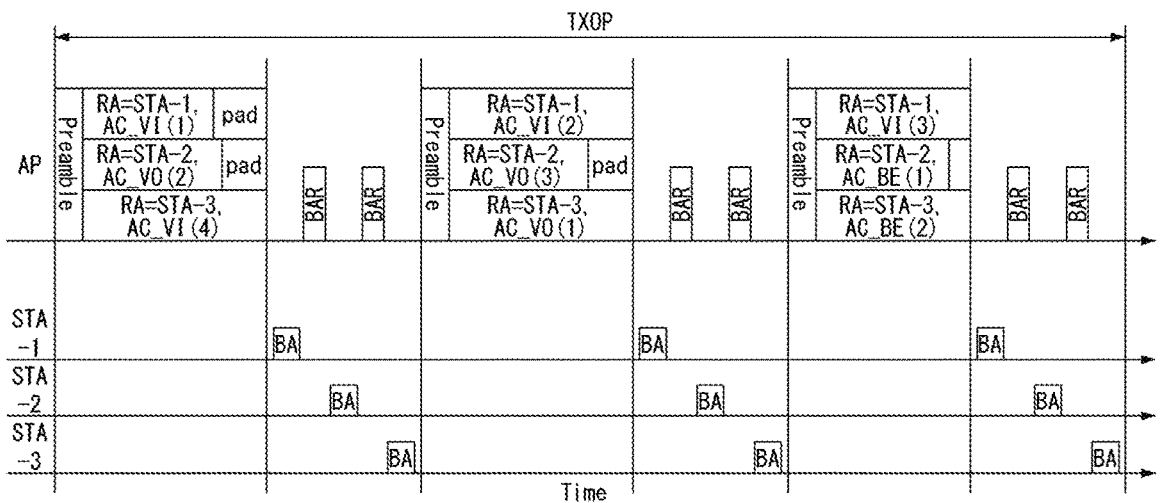
【FIG. 16】
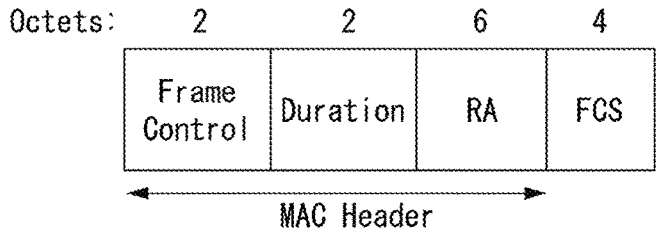

[FIG. 17]
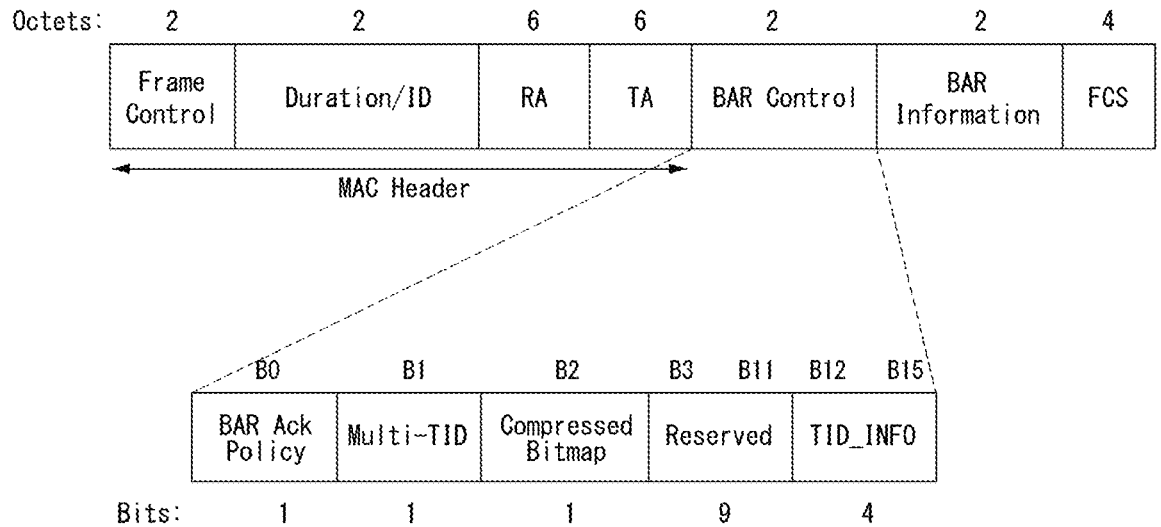
[FIG. 18]
(a)
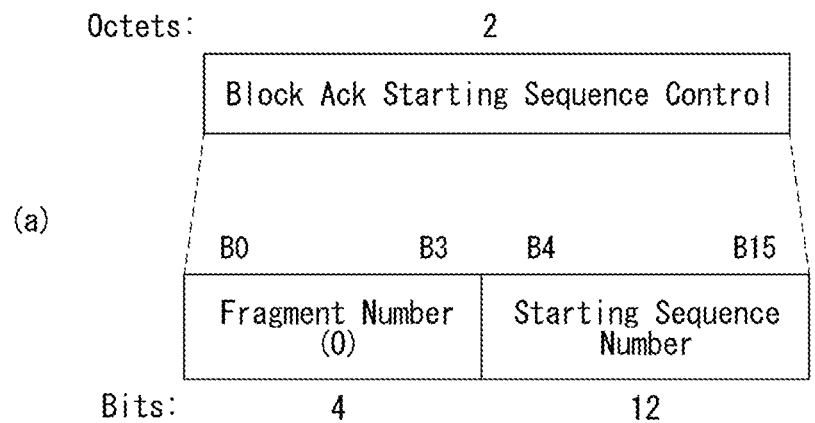
(b)
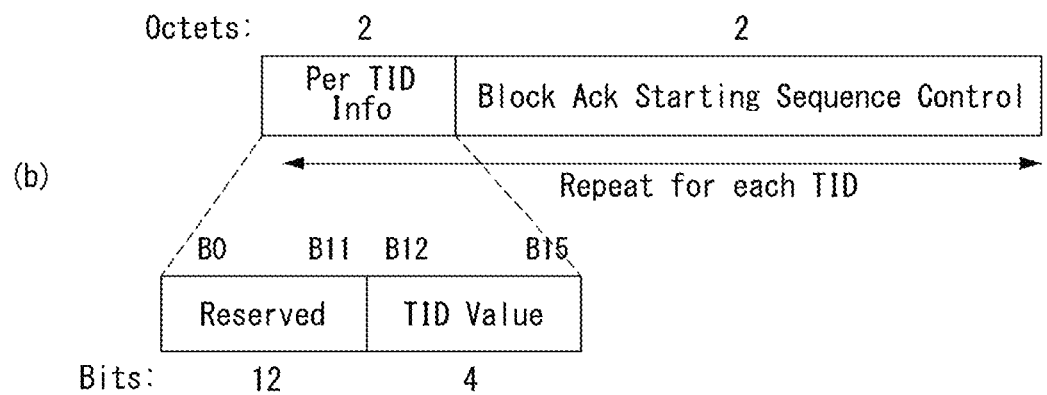

[FIG. 19]
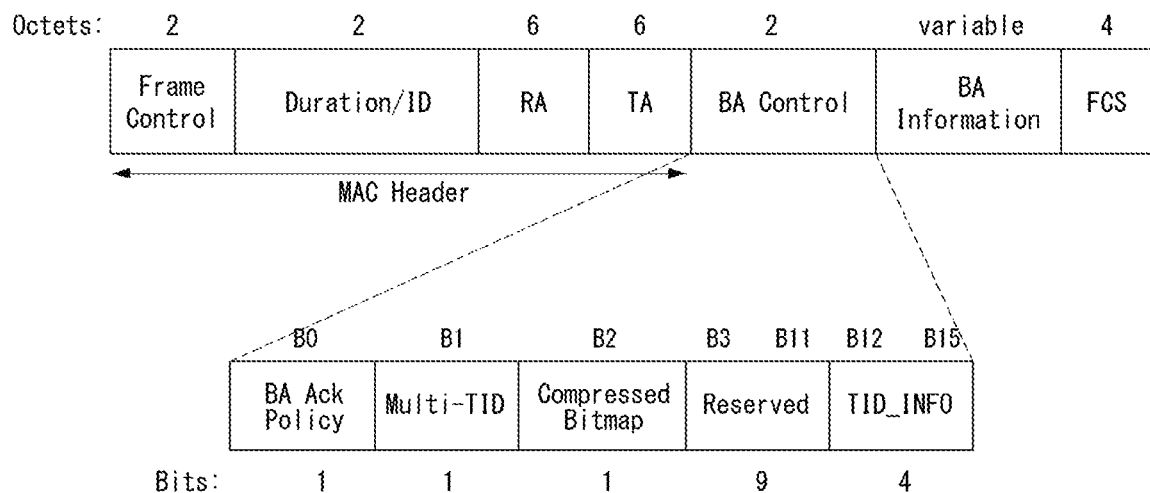
[FIG. 20]
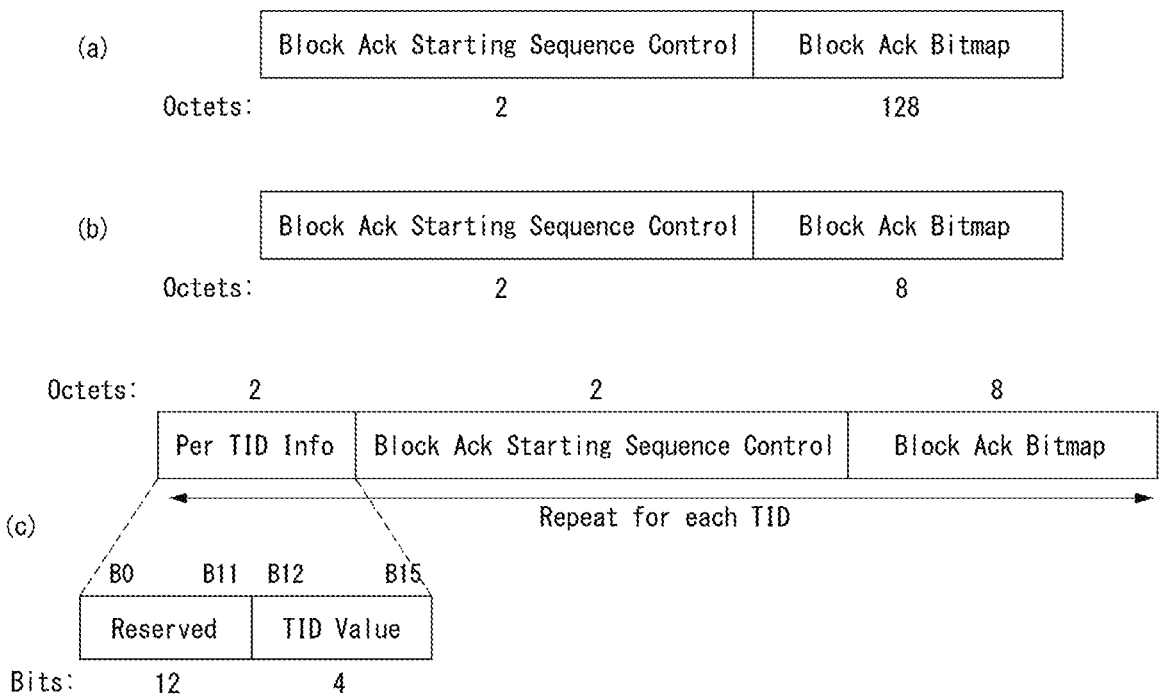

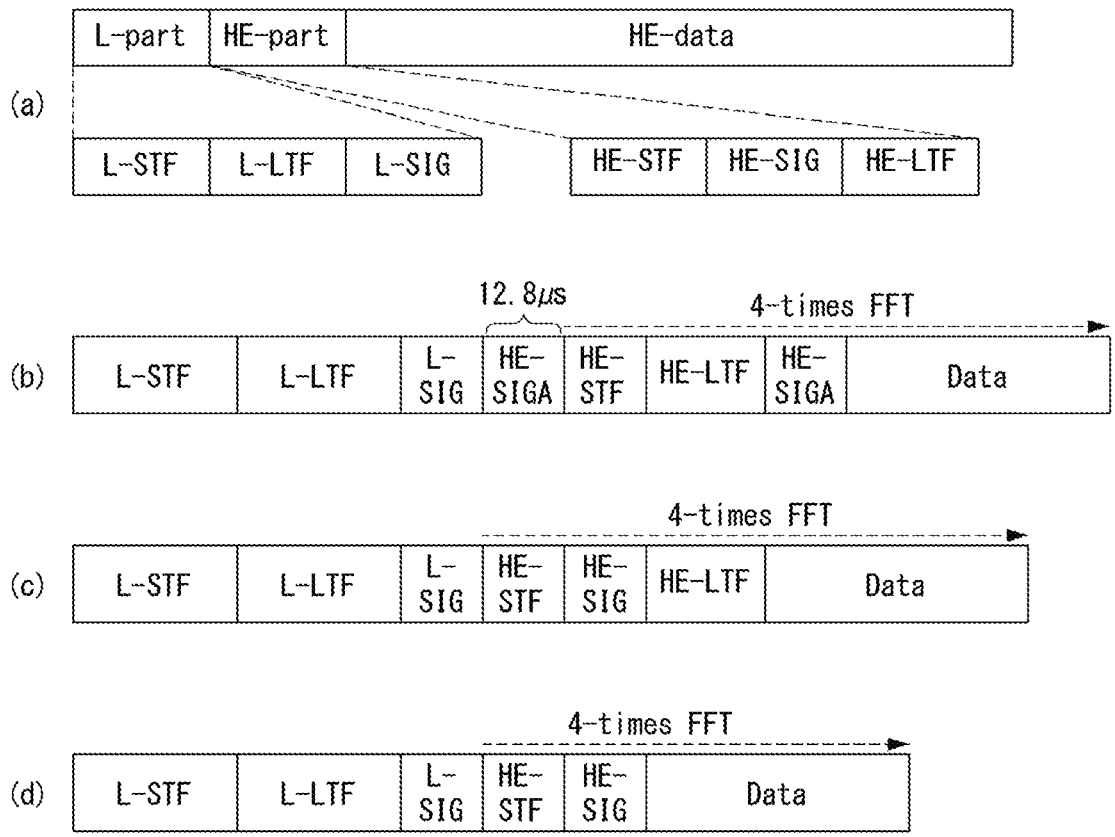
[FIG. 21]
[FIG. 22]

[FIG. 23]

| L-STF | L-LTF | L-SIG | HE-SIG A | | HE-STF | HE-LTF | Data for STA1 |
|---|---|---|---|---|---|---|---|
| L-STF | L-LTF | L-SIG | HE-SIG A | HE-SIG B | HE-STF | HE-LTF | Data for STA2 |
| L-STF | L-LTF | L-SIG | HE-SIG A | | HE-STF | HE-LTF | Data for STA3 |
| L-STF | L-LTF | L-SIG | HE-SIG A | | HE-STF | HE-LTF | Data for STA4 |

[FIG. 24]

| L-STF | L-LTF | L-SIG | HE-SIG A | HE-SIG B | HE-STF | HE-LTF | Data for STA1 |
|---|---|---|---|---|---|---|---|
| L-STF | L-LTF | L-SIG | HE-SIG A | HE-SIG B | HE-STF | HE-LTF | Data for STA2 |
| L-STF | L-LTF | L-SIG | HE-SIG A | HE-SIG B | HE-STF | HE-LTF | Data for STA3 |
| L-STF | L-LTF | L-SIG | HE-SIG A | HE-SIG B | HE-STF | HE-LTF | Data for STA4 |

[FIG. 25]

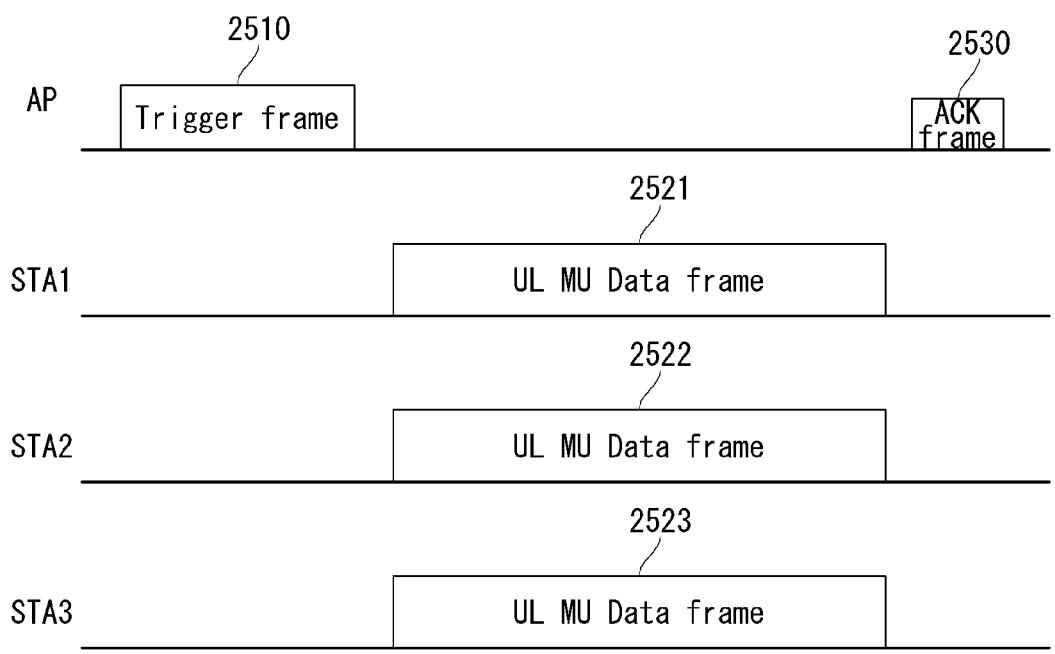

【FIG. 26】
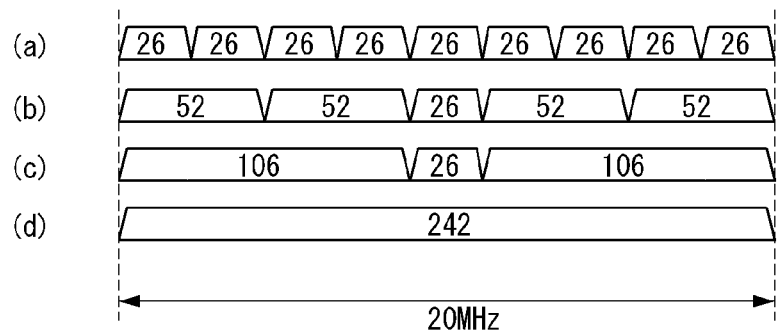
【FIG. 27】
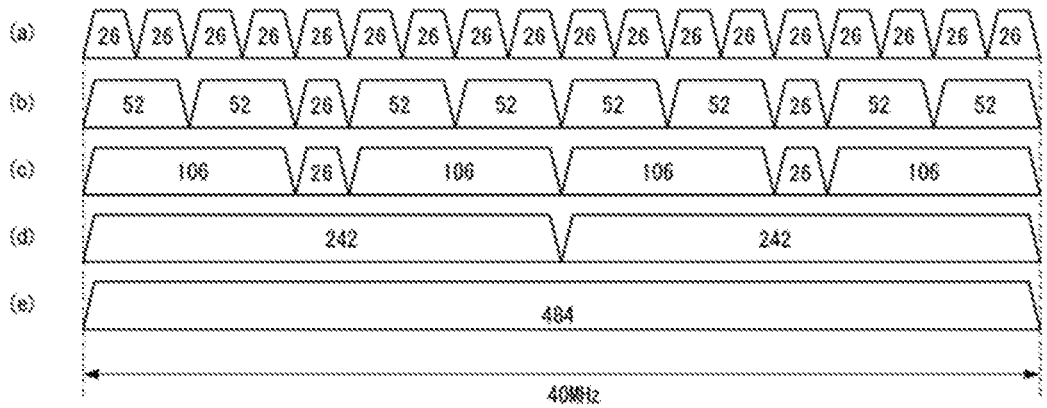

[FIG. 28]
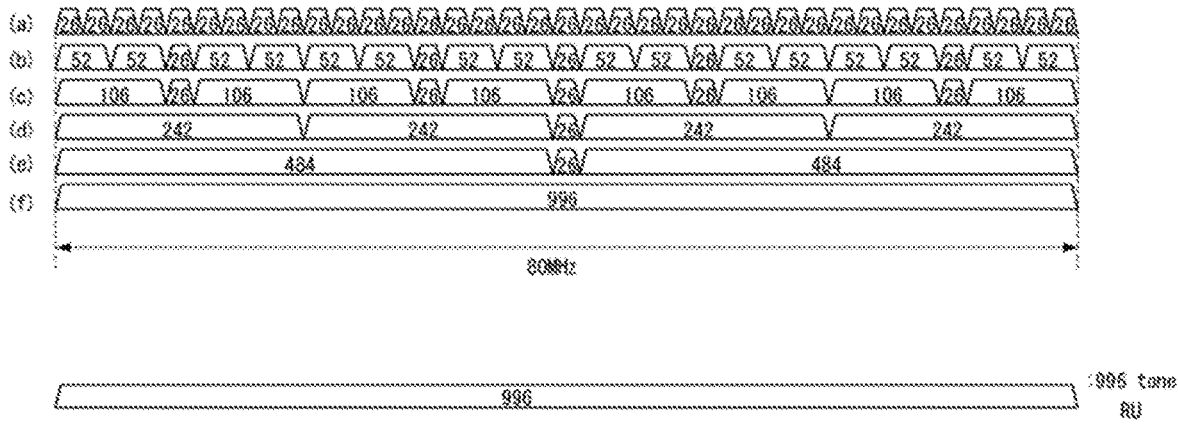
[FIG. 29]
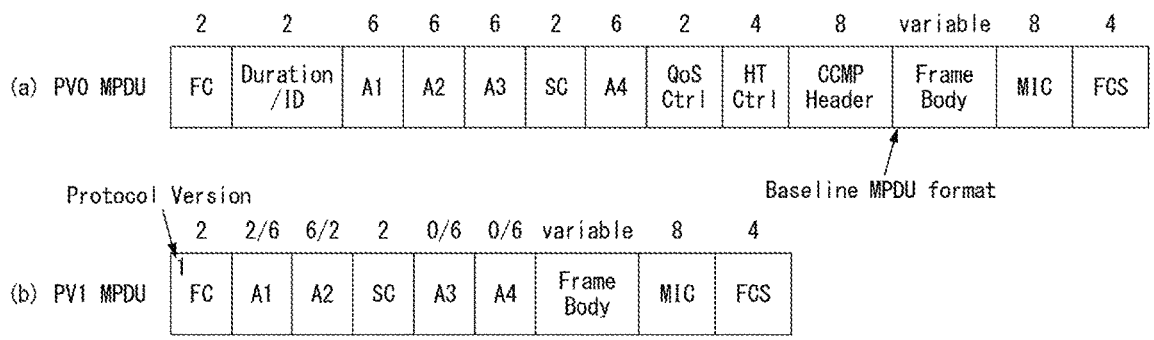
[FIG. 30]
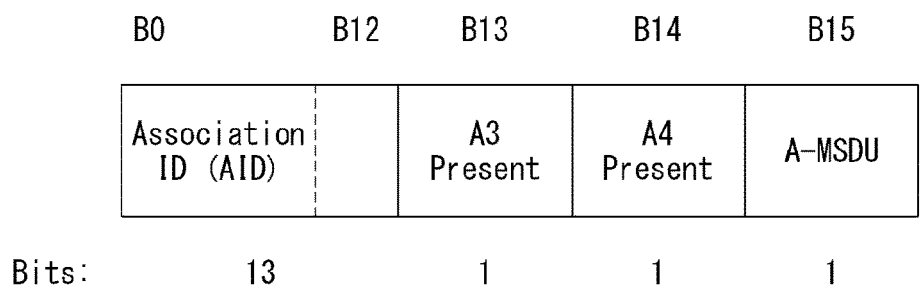
[FIG. 31]
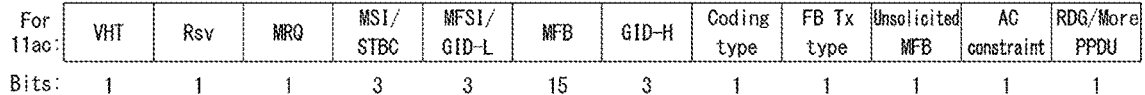

【FIG. 32】

(a) | HE Ctrl | EoC | HE Ctrl | EoC | QoS Ctrl | EoC | ...

(b) | VHT | HE | Control type | Contents | EoC | Control type | Contents | EoC | ...

(c) | VHT | HE | Control type | length | Contents | Control type | length | Contents | ...

| Control ID field: 1byte ||||
|---|---|---|---|
| VHT:1bit(set to '1') | HE:1bit(set to '1') | Control ID: 5bits | EoC: 1bit |

(b)

| Control ID field: 1byte ||||
|---|---|---|---|
| For 1st Ctrl ID:<br>  VHT:1bit(set to '1')<br>From 2nd Ctrl ID:<br>  EoC or Rsv: 1bit | For 1st Ctrl ID:<br>  HE:1bit(set to '1')<br>From 2nd Ctrl ID:<br>  Rsv: 1bit | Control ID: 5~6bits | Rsv or EoC:1~0bit |

【FIG. 34】

| | | | |
|---|---|---|---|
| BAR control | BAR Ack policy | 1 | Immediate Ack/no ack |
| | Multi-TID | 1 | 0x00: Basic BlockAckReq |
| | Compressed bitmap | 1 | 0x01: Compressed BlockAckReq |
| | | | 0x10: Rsv |
| | | | 0x11: Multi-TID BlockAckReq |
| | Last TID indication | 1 | 0x0: a TID or last TID |
| | | | 0x1: TID follows |
| | TID_INFO | 4 | TID |
| BAR information | Block Ack Starting Sequence Control | 2oct | Fragment number (4bits): 0x00 |
| | | | Start Seq Number (12bits): of the 1st A-MSDU |

【FIG. 35】

(a)
| Control ID field(1byte): Control ID = QoS Control | QoS Control field(2bytes) |
|---|---|

(b)
| Control ID field(1byte): Control ID = Buffer Status response | Buffer status response contents (3 bytes) | | |
|---|---|---|---|
| | AC info (4bits bitmap) | Scaling factor (4bits) | Queue size or TXOP duration requested per AC (total 2 bytes) |

【FIG. 36】

(a)
| Control ID field (1byte): Control ID = Buffer Status response for AC1 (BE) | Buffer status response contents (1 byte) | |
|---|---|---|
| | Scaling factor (2 bits) | Queue size or TXOP duration requested (6bits) |

(b)
| Control ID field (1byte): Control ID = Buffer Status response for AC2 (BK) | Buffer status response contents (1 byte) | |
|---|---|---|
| | Scaling factor (2 bits) | Queue size or TXOP duration requested (6bits) |

(c)
| Control ID field (1byte): Control ID = Buffer Status response for AC3 (VI) | Buffer status response contents (1 byte) | |
|---|---|---|
| | Scaling factor (2 bits) | Queue size or TXOP duration requested (6bits) |

(d)
| Control ID field (1byte): Control ID = Buffer Status response for AC4 (VO) | Buffer status response contents (1 byte) | |
|---|---|---|
| | Scaling factor (2 bits) | Queue size or TXOP duration requested (6bits) |

【FIG. 37】

(a)
| Control ID field (1byte): CSI Feedback request | CSI Feedback request<br>- Trigger information: information about feedback transmission region such as UL PPDU length + RU allocation information + MCS<br>- Feedback request information: MSI(3), MFB(15), STBC(1), Coding type(1), FB type(1), etc |
|---|---|

(b)
| Control ID field (1byte): CSI Feedback response | CSI Feedback response<br>- Unsolicited MFB(1), MFSI/Rsv(3), MFB(15), STBC(1), Coding type(1), FB type(1), etc |
|---|---|

(c)
| Control ID field (1byte): CSI Feedback request/response | CSI Feedback response<br>- Unsolicited MFB(1), MSI/STBC(3), MFSI/Rsv(3), MFB(15), Coding type(1), FB type(1), etc |
|---|---|

【FIG. 38】

|   | Control ID field (1byte): | Trigger information |
|---|---|---|
| (a) | UL Trigger | - UL PPDU length (6~9bits), RU allocation information (8bits), MCS (2~4bits), Coding type(1), BF(1), Nsts(3), GI type(1), STBC(1), etc |

|   | Control ID field (1byte): | Trigger information |
|---|---|---|
| (b) | compressed UL Trigger | - UL PPDU length (6~9bits), RU allocation information (8bits), MCS (0~2bits) |

|   | Control ID field (1byte): | Ack/BA request (2bytes): | Control ID 2 (1bytes): |
|---|---|---|---|
| (c) | Ack/BA reqeust | UL PPDU length + RU allocation information + (differential )MCS | Buffer Status request |

|   | Control ID field (1byte): | Buffer status response contents (1 byte) | Control ID field (1byte): | Buffer status response contents (1 byte) |
|---|---|---|---|---|
| (d) | Control ID = Buffer Status response for AC1 (BE) | | Control ID = Buffer Status response for AC2 (BK) | |

【FIG. 39】

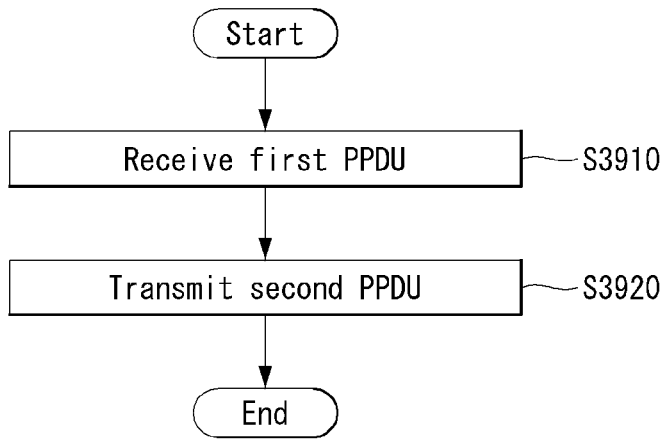

[FIG. 40]
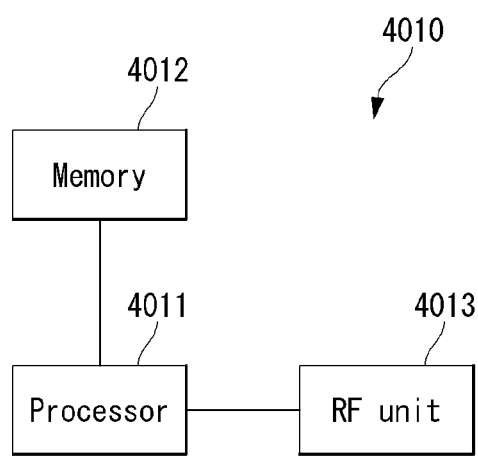

METHOD FOR TRANSMITTING DATA IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2016/011946, filed on Oct. 24, 2016, which claims the benefit of U.S. Provisional Applications No. 62/245,298, filed on Oct. 23, 2015 and 62/249,902, filed on Nov. 2, 2015, the contents of which are all hereby incorporated by reference herein in their entirety.

TECHNICAL FIELD

The present invention relates to a wireless communication system and, more specifically, to a data transmission method for supporting data transmission in a new format applicable to a next-generation system and a device supporting the same.

BACKGROUND ART

Wi-Fi is a wireless local area network (WLAN) technology which enables a device to access the Internet in a frequency band of 2.4 GHz, 5 GHz or 60 GHz.

A WLAN is based on the institute of electrical and electronic engineers (IEEE) 802.11 standard. The wireless next generation standing committee (WNG SC) of IEEE 802.11 is an ad-hoc committee which is worried about the next-generation wireless local area network (WLAN) in the medium to longer term.

IEEE 802.11n has an object of increasing the speed and reliability of a network and extending the coverage of a wireless network. More specifically, IEEE 802.11n supports a high throughput (HT) providing a maximum data rate of 600 Mbps. Furthermore, in order to minimize a transfer error and to optimize a data rate, IEEE 802.11n is based on a multiple inputs and multiple outputs (MIMO) technology in which multiple antennas are used at both ends of a transmission unit and a reception unit.

As the spread of a WLAN is activated and applications using the WLAN are diversified, in the next-generation WLAN system supporting a very high throughput (VHT), IEEE 802.11ac has been newly enacted as the next version of an IEEE 802.11n WLAN system. IEEE 802.11ac supports a data rate of 1 Gbps or more through 80 MHz bandwidth transmission and/or higher bandwidth transmission (e.g., 160 MHz), and chiefly operates in a 5 GHz band.

Recently, a need for a new WLAN system for supporting a higher throughput than a data rate supported by IEEE 802.11ac comes to the fore.

The scope of IEEE 802.11ax chiefly discussed in the next-generation WLAN task group called a so-called IEEE 802.11ax or high efficiency (HEW) WLAN includes 1) the improvement of an 802.11 physical (PHY) layer and medium access control (MAC) layer in bands of 2.4 GHz, 5 GHz, etc., 2) the improvement of spectrum efficiency and area throughput, 3) the improvement of performance in actual indoor and outdoor environments, such as an environment in which an interference source is present, a dense heterogeneous network environment, and an environment in which a high user load is present and so on.

A scenario chiefly taken into consideration in IEEE 802.11ax is a dense environment in which many access points (APs) and many stations (STAs) are present. In IEEE 802.11ax, the improvement of spectrum efficiency and area throughput is discussed in such a situation. More specifically, there is an interest in the improvement of substantial performance in outdoor environments not greatly taken into consideration in existing WLANs in addition to indoor environments.

In IEEE 802.11ax, there is a great interest in scenarios, such as wireless offices, smart homes, stadiums, hotspots, and buildings/apartments. The improvement of system performance in a dense environment in which many APs and many STAs are present is discussed based on the corresponding scenarios.

In the future, it is expected in IEEE 802.11ax that the improvement of system performance in an overlapping basic service set (OBSS) environment, the improvement of an outdoor environment, cellular offloading, and so on rather than single link performance improvement in a single basic service set (BSS) will be actively discussed. The directivity of such IEEE 802.11ax means that the next-generation WLAN will have a technical scope gradually similar to that of mobile communication. Recently, when considering a situation in which mobile communication and a WLAN technology are discussed together in small cells and direct-to-direct (D2D) communication coverage, it is expected that the technological and business convergence of the next-generation WLAN based on IEEE 802.11ax and mobile communication will be further activated.

DISCLOSURE

Technical Problem

An object of the present invention is to provide a MAC header structure in a new format applicable to a next-generation wireless communication system.

Further, an object of the present invention is to provide an HE control field structure in a new format applicable to the next-generation wireless communication system.

The objects of the present invention are not limited to the technical objects described above, and other technical that are objects not mentioned herein may be understood to those skilled in the art from the description below.

Technical Solution

To accomplish the objects of the present invention, an operation method for a station (STA) in a wireless LAN (WLAN) system according to an embodiment of the present invention includes: receiving a first physical protocol data unit (PPDU); and transmitting a second PPDU as a response to the first PPDU, wherein the first or second PPDU includes at least one MAC protocol data unit (MPDU) and a MAC header of the MPDU includes a high-efficiency (HE) control field, wherein the HE control field is an HT control field in which values of a very high throughput (VHT) subfield indicating a VHT format and an HE subfield indicating an HE format are set to "1", and includes one or more control subfields, and wherein the one or more control subfields are fixed to a preset length and included in the HE control field by being aggregated for each control identifier (ID).

Each of the plurality of control subfields may include a control content field including control information and a control ID field indicating a type of the control information.

The control ID field may include an end-of-control (EoC) field indicating whether the control ID field corresponds to the last control ID field among control ID fields included in the HE control field.

The control ID may correspond to an acknowledgement (ACK) or block ACK (BA) request type, an ACK or BA response type, a buffer status request type, a buffer status response type, a channel state information (CSI) feedback request type, a CSI feedback response type or an uplink (UL) trigger type.

When the control ID field indicates the control ID corresponding to the ACK or BA request type, a control content field corresponding to the control ID field may include trigger information about transmission of an ACK or BA response to the ACK or BA request.

When the control ID field indicates the control ID corresponding to the buffer status request type, a control content field corresponding to the control ID field may include trigger information about transmission of a buffer status response to the buffer status request.

The control ID field may be configured to indicate a buffer status request type for a specific access category (AC).

When the control ID field indicates the control ID corresponding to the buffer status response type or a legacy QoS control type, a control content field corresponding to the control ID field may include a legacy QoS control field.

When the control ID field indicates the control ID corresponding to the buffer status response type, a control content field corresponding to the control ID field may include buffer status response information.

The buffer status response information may include an AC field, a scaling factor field, a queue size field and/or a TXOP duration field.

The AC field may indicate an AC corresponding to the buffer status response information in the form of a bitmap.

The scaling factor field may indicate a scaling factor common for all ACs indicated by the AC field.

When the control ID field indicates the control ID corresponding to the CSI feedback request type, a control content field corresponding to the control ID field may include trigger information about transmission of a CSI feedback in response to the CSI feedback request and feedback request information.

The feedback request information may include MRQ sequence identifier (MSI) information, MCS feedback (MFB) information, space-time block coding (STBC) information, coding type information and/or feedback type information.

When the control ID field indicates the control ID corresponding to the CSI feedback response type, a control content field corresponding to the control ID field may include CSI feedback response information.

The CSI feedback response information may include unsolicited MFB indication information, MAC feedback sequence identifier (MFSI) information, MFB information, STBC information, coding type information and/or FB type information.

When the control ID field indicates the control ID corresponding to the UL trigger type, a control content field corresponding to the control ID field may include trigger information for triggering UL multi-user (MU) transmission.

The trigger information may include UL PPDU length information, resource unit allocation information, modulation and coding scheme (MCS) information, coding type information, information on the number of streams, beamforming information, STBC information and/or guard interval (GI) type information.

The MAC header may be configured by reusing a legacy MAC header in such a manner that a MAC address is replaced by an STA ID or basic service set (BSS) ID in the legacy MAC header.

The MAC header may include an indicator indicating that the plurality of control subfields have been aggregated in the HE control field included in the MAC header.

A station (STA) device in a wireless LAN (WLAN) system according to another embodiment of the present invention includes: a radio frequency (RF) unit configured to transmit and receive RF signals; and a processor configured to control the RF unit, wherein the STA device is configured to receive a first physical protocol data unit (PPDU) and transmit a second PPDU as a response to the first PPDU, wherein the first or second PPDU includes at least one MAC protocol data unit (MPDU) and a MAC header of the MPDU includes a high-efficiency (HE) control field, wherein the HE control field is an HT control field in which values of a very high throughput (VHT) subfield indicating a VHT format and an HE subfield indicating an HE format are set to "1" and includes one or more control subfields, and wherein the one or more control subfields are included in the HE control field by being aggregated for each control identifier (ID).

Advantageous Effects

According to an embodiment of the present invention, a new format of a MAC header efficiently applicable to next-generation WLAN systems to which OFDMA is applied is proposed.

In addition, according to an embodiment of the present invention, it is possible to provide a larger amount of information compared to the legacy MAC header and/or information more suitable for next-generation WLAN systems because a compressed MAC header structure is used.

Further, according to an embodiment of the present invention, pieces of control content/information with respect to a plurality of control types are aggregated and transmitted in one HE control field, and thus transmission resources can be efficiently used.

Other effects of the present invention will be additionally described in the following embodiments.

DESCRIPTION OF DRAWINGS

The accompany drawings, which are included to provide a further understanding of this document and are incorporated on and constitute a part of this specification illustrate embodiments of this document and together with the description serve to explain the principles of this document.

FIG. 1 is a diagram showing an example of an IEEE 802.11 system to which an embodiment of the present invention may be applied.

FIG. 2 is a diagram illustrating the structure of layer architecture of the IEEE 802.11 system to which an embodiment of the present invention may be applied.

FIG. 3 illustrates a non-HT format PPDU and HT format PPDU of a wireless communication system to which an embodiment of the present invention may be applied.

FIG. 4 illustrates a VHT format PPDU format of a wireless communication system to which an embodiment of the present invention may be applied.

FIG. 5 illustrates an MAC frame format of an IEEE 802.11 system to which an embodiment of the present invention may be applied.

FIG. 6 is a diagram illustrating a frame control field within an MAC frame in a wireless communication system to which an embodiment of the present invention may be applied.

FIG. 7 illustrates the VHT format of an HT control field in a wireless communication system to which an embodiment of the present invention may be applied.

FIG. 8 is a diagram conceptually illustrating a channel sounding method in a wireless communication system to which an embodiment of the present invention may be applied.

FIG. 9 is a diagram illustrating a VHT NDPA frame in a wireless communication system to which an embodiment of the present invention may be applied.

FIG. 10 is a diagram illustrating an NDP PPDU in a wireless communication system to which an embodiment of the present invention may be applied.

FIG. 11 is a diagram illustrating the format of a VHT compressed beamforming frame in a wireless communication system to which an embodiment of the present invention may be applied.

FIG. 12 is a diagram illustrating the format of a beamforming report poll frame in a wireless communication system to which an embodiment of the present invention may be applied.

FIG. 13 is a diagram illustrating a downlink multi-user (DL MU) PPDU format in a wireless communication system to which an embodiment of the present invention may be applied.

FIG. 14 is a diagram illustrating a downlink multi-user PPDU format in a wireless communication system to which an embodiment of the present invention may be applied.

FIG. 15 is a diagram illustrating a DL MU-MIMO transmission process in a wireless communication system to which an embodiment of the present invention may be applied.

FIG. 16 is a diagram illustrating an ACK frame in a wireless communication system to which an embodiment of the present invention may be applied.

FIG. 17 is a diagram illustrating a block ACK request frame in a wireless communication system to which an embodiment of the present invention may be applied.

FIG. 18 is a diagram illustrating the BAR information field of a block ACK request frame in a wireless communication system to which an embodiment of the present invention may be applied.

FIG. 19 is a diagram illustrating a block ACK frame in a wireless communication system to which an embodiment of the present invention may be applied.

FIG. 20 is a diagram illustrating the BA information field of a block ACK frame in a wireless communication system to which an embodiment of the present invention may be applied.

FIG. 21 is a diagram illustrating a high efficiency (HE) format PPDU according to an embodiment of the present invention.

FIGS. 22 to 24 are diagrams illustrating HE format PPDUs according to embodiments of the present invention.

FIG. 25 is a diagram illustrating an uplink multi-user (UL MU) transmission procedure according to an embodiment of the present invention.

FIGS. 26 to 28 are diagrams illustrating resource allocation units in an OFDMA multi-user transmission method according to an embodiment of the present invention.

FIG. 29 illustrates MPDUs according to an embodiment of the present invention.

FIG. 30 is a diagram illustrating a compressed A1 field according to an embodiment of the present invention.

FIG. 31 is a diagram illustrating a configuration of a VHT control field according to an embodiment of the present invention.

FIG. 32(a) is a diagram illustrating a format of a plurality of HE control fields according to an embodiment of the present invention.

FIGS. 32(b) and 32(c) are diagrams illustrating HE control frames according to an embodiment of the present invention.

FIG. 33 is a diagram illustrating a configuration of a control ID field according to an embodiment of the present invention.

FIG. 34 is a diagram illustrating configurations of a compressed BAR control field and BAR information field according to an embodiment of the present invention.

FIGS. 35 and 36 are diagrams illustrating HE control field configurations for a buffer status response according to an embodiment of the present invention.

FIG. 37(a) is a diagram illustrating an HE control field configuration for a CSI feedback request according to an embodiment of the present invention.

FIG. 37(b) is a diagram illustrating an HE control field configuration for a CSI feedback response according to an embodiment of the present invention.

FIG. 37(c) is a diagram illustrating an HE control field configuration for a CSI feedback request/response according to an embodiment of the present invention.

FIG. 38 is a diagram illustrating HE control field configurations for UL trigger (or UL MU response scheduling) according to an embodiment of the present invention.

FIG. 39 is a flowchart illustrating a method of transmitting an HE control field according to an embodiment of the present invention.

FIG. 40 is a block diagram of an STA device according to an embodiment of the present invention.

MODE FOR INVENTION

Terms used in the present invention are common terms now widely used by taking into consideration functions in the present invention, but the terms may be changed depending on intentions or use practices of those skilled in the art or the appearance of a new technology. Furthermore, in a specific case, some terms are randomly selected by the applicant. In this case, the detailed meaning of a corresponding term will be described in the corresponding part of the description of the present invention. Accordingly, the terms used in the present invention should not be understood simply based on their names, but should be understood based on their substantial meanings and contents over this specification.

Furthermore, embodiments of the present invention are described in detail below with reference to the accompanying drawings and contents described in the drawings, but the present invention is not limited or restricted by the embodiments.

Some embodiments of the present invention are described in detail below with reference to the accompanying drawings.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC- FDMA), and non-orthogonal multiple access (NOMA). CDMA may be implemented using a radio technology, such as universal terrestrial radio access (UTRA) or CDMA2000. TDMA may be implemented using a radio technology, such as global system for Mobile communications (GSM)/general packet radio service (GPRS)/enhanced data rates for GSM evolution (EDGE). OFDMA may be implemented using a radio technology, such as institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System

FIG. 1 is a diagram showing an example of an IEEE 802.11 system to which an embodiment of the present invention may be applied.

The IEEE 802.11 configuration may include a plurality of elements. There may be provided a wireless communication system supporting transparent station (STA) mobility for a higher layer through an interaction between the elements. A basic service set (BSS) may correspond to a basic configuration block in an IEEE 802.11 system.

FIG. 1 illustrates that three BSSs BSS 1 to BSS 3 are present and two STAs (e.g., an STA 1 and an STA 2 are included in the BSS 1, an STA 3 and an STA 4 are included in the BSS 2, and an STA 5 and an STA 6 are included in the BSS 3) are included as the members of each BSS.

In FIG. 1, an ellipse indicative of a BSS may be interpreted as being indicative of a coverage area in which STAs included in the corresponding BSS maintain communication. Such an area may be called a basic service area (BSA). When an STA moves outside the BSA, it is unable to directly communicate with other STAs within the corresponding BSA.

In the IEEE 802.11 system, the most basic type of a BSS is an independent a BSS (IBSS). For example, an IBSS may have a minimum form including only two STAs. Furthermore, the BSS 3 of FIG. 1 which is the simplest form and from which other elements have been omitted may correspond to a representative example of the IBSS. Such a configuration may be possible if STAs can directly communicate with each other. Furthermore, a LAN of such a form is not previously planned and configured, but may be configured when it is necessary. This may also be called an ad-hoc network.

When an STA is powered off or on or an STA enters into or exits from a BSS area, the membership of the STA in the BSS may be dynamically changed. In order to become a member of a BSS, an STA may join the BSS using a synchronization process. In order to access all of services in a BSS-based configuration, an STA needs to be associated with the BSS. Such association may be dynamically configured, and may include the use of a distribution system service (DSS).

In an 802.11 system, the distance of a direct STA-to-STA may be constrained by physical layer (PHY) performance. In any case, the limit of such a distance may be sufficient, but communication between STAs in a longer distance may be required, if necessary. In order to support extended coverage, a distribution system (DS) may be configured.

The DS means a configuration in which BSSs are interconnected. More specifically, a BSS may be present as an element of an extended form of a network including a plurality of BSSs instead of an independent BSS as in FIG. 1.

The DS is a logical concept and may be specified by the characteristics of a distribution system medium (DSM). In the IEEE 802.11 standard, a wireless medium (WM) and a distribution system medium (DSM) are logically divided. Each logical medium is used for a different purpose and used by a different element. In the definition of the IEEE 802.11 standard, such media are not limited to the same one and are also not limited to different ones. The flexibility of the configuration (i.e., a DS configuration or another network configuration) of an IEEE 802.11 system may be described in that a plurality of media is logically different as described above. That is, an IEEE 802.11 system configuration may be implemented in various ways, and a corresponding system configuration may be independently specified by the physical characteristics of each implementation example.

The DS can support a mobile device by providing the seamless integration of a plurality of BSSs and providing logical services required to handle an address to a destination.

An AP means an entity which enables access to a DS through a WM with respect to associated STAs and has the STA functionality. The movement of data between a BSS and the DS can be performed through an AP. For example, each of the STA 2 and the STA 3 of FIG. 1 has the functionality of an STA and provides a function which enables associated STAs (e.g., the STA 1 and the STA 4) to access the DS. Furthermore, all of APs basically correspond to an STA, and thus all of the APs are entities capable of being addressed. An address used by an AP for communication on a WM and an address used by an AP for communication on a DSM may not need to be necessarily the same.

Data transmitted from one of STAs, associated with an AP, to the STA address of the AP may be always received by an uncontrolled port and processed by an IEEE 802.1X port access entity. Furthermore, when a controlled port is authenticated, transmission data (or frame) may be delivered to a DS.

A wireless network having an arbitrary size and complexity may include a DS and BSSs. In an IEEE 802.11 system, a network of such a method is called an extended service set (ESS) network. The ESS may correspond to a set of BSSs connected to a single DS. However, the ESS does not include a DS. The ESS network is characterized in that it looks like an IBSS network in a logical link control (LLC) layer. STAs included in the ESS may communicate with each other. Mobile STAs may move from one BSS to the other BSS (within the same ESS) in a manner transparent to the LLC layer.

In an IEEE 802.11 system, the relative physical positions of BSSs in FIG. 1 are not assumed, and the following forms are all possible.

More specifically, BSSs may partially overlap, which is a form commonly used to provide consecutive coverage. Furthermore, BSSs may not be physically connected, and logically there is no limit to the distance between BSSs. Furthermore, BSSs may be placed in the same position physically and may be used to provide redundancy. Furthermore, one (or one or more) IBSS or ESS networks may be physically present in the same space as one or more ESS networks. This may correspond to an ESS network form if an ad-hoc network operates at the position in which an ESS network is present, if IEEE 802.11 networks that physically overlap are configured by different organizations, or if two or more different access and security policies are required at the same position.

In a WLAN system, an STA is an apparatus operating in accordance with the medium access control (MAC)/PHY regulations of IEEE 802.11. An STA may include an AP STA and a non-AP STA unless the functionality of the STA is not individually different from that of an AP. In this case, assuming that communication is performed between an STA and an AP, the STA may be interpreted as being a non-AP STA. In the example of FIG. 1, the STA 1, the STA 4, the STA 5, and the STA 6 correspond to non-AP STAs, and the STA 2 and the STA 3 correspond to AP STAs.

A non-AP STA corresponds to an apparatus directly handled by a user, such as a laptop computer or a mobile phone. In the following description, a non-AP STA may also be called a wireless device, a terminal, user equipment (UE), a mobile station (MS), a mobile terminal, a wireless terminal, a wireless transmit/receive unit (WTRU), a network interface device, a machine-type communication (MTC) device, a machine-to-machine (M2M) device or the like.

Furthermore, an AP is a concept corresponding to a base station (BS), a node-B, an evolved Node-B (eNB), a base transceiver system (BTS), a femto BS or the like in other wireless communication fields.

Hereinafter, in this specification, downlink (DL) means communication from an AP to a non-AP STA. Uplink (UL) means communication from a non-AP STA to an AP. In DL, a transmitter may be part of an AP, and a receiver may be part of a non-AP STA. In UL, a transmitter may be part of a non-AP STA, and a receiver may be part of an AP.

FIG. 2 is a diagram illustrating the configuration of layer architecture of an IEEE 802.11 system to which an embodiment of the present invention may be applied.

Referring to FIG. 2, the layer architecture of the IEEE 802.11 system may include an MAC sublayer and a PHY sublayer.

The PHY sublayer may be divided into a physical layer convergence procedure (PLCP) entity and a physical medium dependent (PMD) entity. In this case, the PLCP entity functions to connect the MAC sublayer and a data frame, and the PMD entity functions to wirelessly transmit and receive data to and from two or more STAs.

The MAC sublayer and the PHY sublayer may include respective management entities, which may be referred to as an MAC sublayer management entity (MLME) and a PHY sublayer management entity (PLME), respectively. The management entities provide a layer management service interface through the operation of a layer management function. The MLME is connected to the PLME and may perform the management operation of the MAC sublayer. Likewise, the PLME is also connected to the MLME and may perform the management operation of the PHY sublayer.

In order to provide a precise MAC operation, a station management entity (SME) may be present in each STA. The SME is a management entity independent of each layer, and collects layer-based state information from the MLME and the PLME or sets the values of layer-specific parameters. The SME may perform such a function instead of common system management entities and may implement a standard management protocol.

The MLME, the PLME, and the SME may interact with each other using various methods based on primitives. More specifically, an XX-GET.request primitive is used to request the value of a management information base (MIB) attribute. An XX-GET.confirm primitive returns the value of a corresponding MIB attribute if the state is "SUCCESS", and indicates an error in the state field and returns the value in other cases. An XX-SET.request primitive is used to make a request so that a designated MIB attribute is set as a given value. If an MIB attribute means a specific operation, such a request requests the execution of the specific operation. Furthermore, an XX-SET.confirm primitive means that a designated MIB attribute has been set as a requested value if the state is "SUCCESS." In other cases, the XX-SET.confirm primitive indicates that the state field is an error situation. If an MIB attribute means a specific operation, the primitive may confirm that a corresponding operation has been performed.

An operation in each sublayer is described in brief as follows.

The MAC sublayer generates one or more MAC protocol data units (MPDUs) by attaching an MAC header and a frame check sequence (FCS) to a MAC service data unit (MSDU) received from a higher layer (e.g., an LLC layer) or the fragment of the MSDU. The generated MPDU is delivered to the PHY sublayer.

If an aggregated MSDU (A-MSDU) scheme is used, a plurality of MSDUs may be aggregated into a single aggregated MSDU (A-MSDU). The MSDU aggregation operation may be performed in an MAC higher layer. The A-MSDU is delivered to the PHY sublayer as a single MPDU (if it is not fragmented).

The PHY sublayer generates a physical protocol data unit (PPDU) by attaching an additional field, including information for a PHY transceiver, to a physical service data unit (PSDU) received from the MAC sublayer. The PPDU is transmitted through a wireless medium.

The PSDU has been received by the PHY sublayer from the MAC sublayer, and the MPDU has been transmitted from the MAC sublayer to the PHY sublayer. Accordingly, the PSDU is substantially the same as the MPDU.

If an aggregated MPDU (A-MPDU) scheme is used, a plurality of MPDUs (in this case, each MPDU may carry an A-MSDU) may be aggregated in a single A-MPDU. The MPDU aggregation operation may be performed in an MAC lower layer. The A-MPDU may include an aggregation of various types of MPDUs (e.g., QoS data, acknowledge (ACK), and a block ACK (BlockAck)). The PHY sublayer receives an A-MPDU, that is, a single PSDU, from the MAC sublayer. That is, the PSDU includes a plurality of MPDUs. Accordingly, the A-MPDU is transmitted through a wireless medium within a single PPDU.

Physical Protocol Data Unit (PPDU) Format

A PPDU means a data block generated in the physical layer. A PPDU format is described below based on an IEEE 802.11 a WLAN system to which an embodiment of the present invention may be applied.

FIG. 3 illustrating a non-HT format PPDU and an HT format PPDU in a wireless communication system to which an embodiment of the present invention may be applied.

FIG. 3(a) illustrates a non-HT format PPDU for supporting IEEE 802.11a/g systems. The non-HT PPDU may also be called a legacy PPDU.

Referring to FIG. 3(a), the format of a non-HT PPDU is composed of a legacy format preamble, including a legacy (or non-HT) short training field (L-STF), a legacy (or non-HT) long training field (L-LTF), and a legacy (or non-HT) SIGNAL (L-SIG) field, and a data field.

The L-STF may include a short training orthogonal frequency division multiplexing symbol (OFDM). The L-STF may be used for frame timing acquisition, automatic gain control (AGC), diversity detection, and coarse frequency/time synchronization.

The L-LTF may include a long training OFDM symbol. The L-LTF may be used for fine frequency/time synchronization and channel estimation.

The L-SIG field may be used to send control information for the demodulation and decoding of the data field.

The L-SIG field includes a rate field of 4 bits, a reserved field of 1 bit, a length field of 12 bits, a parity field of 1 bit, and a signal tail field of 6 bits.

The rate field includes transfer rate information, and the length field indicates the number of octets of a PSDU.

FIG. 3(b) illustrates an HT mixed format PPDU for supporting both an IEEE 802.11n system and IEEE 802.11a/g system.

Referring to FIG. 3(b), the HT mixed format PPDU is configured to include a legacy format preamble including an L-STF, an L-LTF, and an L-SIG field, an HT format preamble including an HT-signal (HT-SIG) field, a HT short training field (HT-STF), and a HT long training field (HT-LTF), and a data field.

The L-STF, the L-LTF, and the L-SIG field mean legacy fields for backward compatibility and are the same as those of the non-HT format from the L-STF to the L-SIG field. An L-STA may interpret a data field through an L-LTF, an L-LTF, and an L-SIG field although it receives an HT mixed PPDU. In this case, the L-LTF may further include information for channel estimation to be performed by an HT-STA in order to receive the HT mixed PPDU and to demodulate the L-SIG field and the HT-SIG field.

An HT-STA may be aware of an HT mixed format PPDU using the HT-SIG field subsequent to the legacy fields, and may decode the data field based on the HT mixed format PPDU.

The HT-LTF may be used for channel estimation for the demodulation of the data field. IEEE 802.11n supports single user multi-input and multi-output (SU-MIMO) and thus may include a plurality of HT-LTFs for channel estimation with respect to each of data fields transmitted in a plurality of spatial streams.

The HT-LTF may include a data HT-LTF used for channel estimation for a spatial stream and an extension HT-LTF additionally used for full channel sounding. Accordingly, a plurality of HT-LTFs may be the same as or greater than the number of transmitted spatial streams.

In the HT mixed format PPDU, the L-STF, the L-LTF, and the L-SIG fields are first transmitted so that an L-STA can receive the L-STF, the L-LTF, and the L-SIG fields and obtain data. Thereafter, the HT-SIG field is transmitted for the demodulation and decoding of data transmitted for an HT-STA.

An L-STF, an L-LTF, and L-SIG fields are transmitted without performing beamforming up to an HT-SIG field so that an L-STA and an HT-STA can receive a corresponding PPDU and obtain data. In an HT-STF, an HT-LTF, and a data field that are subsequently transmitted, radio signals are transmitted through precoding. In this case, an HT-STF is transmitted so that an STA receiving a corresponding PPDU by performing precoding may take into considerate a portion whose power is varied by precoding, and a plurality of HT-LTFs and a data field are subsequently transmitted.

Table 1 below illustrates the HT-SIG field.

TABLE 1

| FIELD | BIT | DESCRIPTION |
|---|---|---|
| MCS | 7 | Indicate a modulation and coding scheme |
| CBW 20/40 | 1 | Set to "0" if a CBW is 20 MHz or 40 MHz or upper/lower<br>Set to "1" if a CBW is 40 MHz |
| HT length | 16 | Indicate the number of data octets within a PSDU |
| Smoothing | 1 | Set to "1" if channel smoothing is recommended<br>Set to "0" if channel estimation is recommended unsmoothingly for each carrier |
| Not-sounding | 1 | Set to "0" if a PPDU is a sounding PPDU<br>Set to "1" if a PPDU is not a sounding PPDU |
| Reserved | 1 | Set to "1" |
| Aggregation | 1 | Set to "1" if a PPDU includes an A-MPDU<br>Set to "0" if not |
| Space-time block coding (STBC) | 2 | Indicate a difference between the number of space-time streams (NSTS) and the number of spatial streams (NSS) indicated by an MCS<br>Set to "00" if an STBC is not used |
| FEC coding | 1 | Set to "1" if low-density parity check (LDPC) is used<br>Set to "0" if binary convolutional code (BCC) is used |
| Short GI | 1 | Set to "1" if a short guard interval (GI) is used after HT training<br>Set to "0" if not |
| Number of extension spatial streams | 2 | Indicate the number of extension spatial streams (NESSs)<br>Set to "0" if there is no NESS<br>Set to "1" if the number of NESSs is 1<br>Set to "2" if the number of NESSs is 2<br>Set to "3" if the number of NESSs is 3 |
| CRC | 8 | Include CRS for detecting an error of a PPDU on the receiver side |
| Tail bits | 6 | Used to terminate the trellis of a convolutional decoder<br>Set to "0" |

FIG. 3(c) illustrates an HT-green field format PPDU (HT-GF format PPDU) for supporting only an IEEE 802.11n system.

Referring to FIG. 3(c), the HT-GF format PPDU includes an HT-GF-STF, an HT-LTF1, an HT-SIG field, a plurality of HT-LTF2s, and a data field.

The HT-GF-STF is used for frame timing acquisition and AGC.

The HT-LTF1 is used for channel estimation.

The HT-SIG field is used for the demodulation and decoding of the data field.

The HT-LTF2 is used for channel estimation for the demodulation of the data field. Likewise, an HT-STA uses SU-MIMO. Accordingly, a plurality of the HT-LTF2s may be configured because channel estimation is necessary for each of data fields transmitted in a plurality of spatial streams.

The plurality of HT-LTF2s may include a plurality of data HT-LTFs and a plurality of extension HT-LTFs like the HT-LTF of the HT mixed PPDU.

In FIGS. 3(a) to 3(c), the data field is a payload and may include a service field, a scrambled PSDU (PSDU) field, tail bits, and padding bits. All of the bits of the data field are scrambled.

FIG. 3(d) illustrates a service field included in the data field. The service field has 16 bits. The 16 bits are assigned No. 0 to No. 15 and are sequentially transmitted from the No. 0 bit. The No. 0 bit to the No. 6 bit are set to 0 and are used to synchronize a descrambler within a reception stage.

An IEEE 802.11ac WLAN system supports the transmission of a DL multi-user multiple input multiple output (MU-MIMO) method in which a plurality of STAs accesses a channel at the same time in order to efficiently use a radio channel. In accordance with the MU-MIMO transmission method, an AP may simultaneously transmit a packet to one or more STAs that have been subjected to MIMO pairing.

Downlink multi-user transmission (DL MU transmission) means a technology in which an AP transmits a PPDU to a plurality of non-AP STAs through the same time resources using one or more antennas.

Hereinafter, an MU PPDU means a PPDU which delivers one or more PSDUs for one or more STAs using the MU-MIMO technology or the OFDMA technology. Furthermore, an SU PPDU means a PPDU having a format in which only one PSDU can be delivered or which does not have a PSDU.

For MU-MIMO transmission, the size of control information transmitted to an STA may be relatively larger than the size of 802.11n control information. Control information additionally required to support MU-MIMO may include information indicating the number of spatial streams received by each STA and information related to the modulation and coding of data transmitted to each STA may correspond to the control information, for example.

Accordingly, when MU-MIMO transmission is performed to provide a plurality of STAs with a data service at the same time, the size of transmitted control information may be increased according to the number of STAs which receive the control information.

In order to efficiently transmit the control information whose size is increased as described above, a plurality of pieces of control information required for MU-MIMO transmission may be divided into two types of control information: common control information that is required for all of STAs in common and dedicated control information individually required for a specific STA, and may be transmitted.

FIG. 4 illustrates a VHT format PPDU in a wireless communication system to which an embodiment of the present invention may be applied.

FIG. 4(a) illustrates a VHT format PPDU for supporting an IEEE 802.11ac system.

Referring to FIG. 4(a), the VHT format PPDU is configured to include a legacy format preamble including an L-STF, an L-LTF, and an L-SIG field, a VHT format preamble including a VHT-signal-A (VHT-SIG-A) field, a VHT short training field (VHT-STF), a VHT long training field (VHT-LTF), and a VHT-signal-B (VHT-SIG-B) field, and a data field.

The L-STF, the L-LTF, and the L-SIG field mean legacy fields for backward compatibility and have the same formats as those of the non-HT format. In this case, the L-LTF may further include information for channel estimation which will be performed in order to demodulate the L-SIG field and the VHT-SIG-A field.

The L-STF, the L-LTF, the L-SIG field, and the VHT-SIG-A field may be repeated in a 20 MHz channel unit and transmitted. For example, when a PPDU is transmitted through four 20 MHz channels (i.e., an 80 MHz bandwidth), the L-STF, the L-LTF, the L-SIG field, and the VHT-SIG-A field may be repeated every 20 MHz channel and transmitted.

A VHT-STA may be aware of the VHT format PPDU using the VHT-SIG-A field subsequent to the legacy fields, and may decode the data field based on the VHT-SIG-A field.

In the VHT format PPDU, the L-STF, the L-LTF, and the L-SIG field are first transmitted so that even an L-STA can receive the VHT format PPDU and obtain data. Thereafter, the VHT-SIG-A field is transmitted for the demodulation and decoding of data transmitted for a VHT-STA.

The VHT-SIG-A field is a field for the transmission of control information that is common to a VHT STAs that are MIMO-paired with an AP, and includes control information for interpreting the received VHT format PPDU.

The VHT-SIG-A field may include a VHT-SIG-A1 field and a VHT-SIG-A2 field.

The VHT-SIG-A1 field may include information about a channel bandwidth (BW) used, information about whether space time block coding (STBC) is applied or not, a group identifier (ID) for indicating a group of grouped STAs in MU-MIMO, information about the number of streams used (the number of space-time streams (NSTS)/part association identifier (AID), and transmit power save forbidden information. In this case, the group ID means an identifier assigned to a target transmission STA group in order to support MU-MIMO transmission, and may indicate whether the present MIMO transmission method is MU-MIMO or SU-MIMO.

Table 2 illustrates the VHT-SIG-A1 field.

TABLE 2

| FIELD | BIT | DESCRIPTION |
|---|---|---|
| BW | 2 | Set to "0" if a BW is 20 MHz<br>Set to "1" if a BW is 40 MHz<br>Set to "2" if a BW is 80 MHz<br>Set to "3" if a BW is 160 MHz or 80 + 80 MHz |

TABLE 2-continued

| FIELD | BIT | DESCRIPTION |
|---|---|---|
| Reserved | 1 | |
| STBC | 1 | In the case of a VHT SU PPDU:<br>Set to "1" if STBC is used<br>Set to "0" if not<br>In the case of a VHT MU PPDU:<br>Set to "0" |
| group ID | 6 | Indicate a group ID<br>"0" or "63" indicates a VHT SU PPDU, but indicates a VHT MU PPDU if not |
| NSTS/Partial AID | 12 | In the case of a VHT MU PPDU, divide into 4 user positions "p" each having three bits<br>"0" if a space-time stream is 0<br>"1" if a space-time stream is 1<br>"2" if a space-time stream is 2<br>"3" if a space-time stream is 3<br>"4" if a space-time stream is 4<br>In the case of a VHT SU PPDU,<br>Upper 3 bits are set as follows:<br>"0" if a space-time stream is 1<br>"1" if a space-time stream is 2<br>"2" if a space-time stream is 3<br>"3" if a space-time stream is 4<br>"4" if a space-time stream is 5<br>"5" if a space-time stream is 6<br>"6" if a space-time stream is 7<br>"7" if a space-time stream is 8<br>Lower 9 bits indicate a partial AID. |
| TXOP_PS_NOT_ALLOWED | 1 | Set to "0" if a VHT AP permits a non-AP VHT STA to switch to power save mode during transmission opportunity (TXOP)<br>Set to "1" if not<br>In the case of a VHT PPDU transmitted by a non-AP VHT STA<br>Set to "1" |
| Reserved | 1 | |

The VHT-SIG-A2 field may include information about whether a short guard interval (GI) is used or not, forward error correction (FEC) information, information about a modulation and coding scheme (MCS) for a single user, information about the type of channel coding for multiple users, beamforming-related information, redundancy bits for cyclic redundancy checking (CRC), the tail bits of a convolutional decoder and so on.

Table 3 illustrates the VHT-SIG-A2 field.

TABLE 3

| FIELD | BIT | DESCRIPTION |
|---|---|---|
| Short GI | 1 | Set to "0" if a short GI is not used in a data field<br>Set to "1" if a short GI is used in a data field |
| Short GI disambiguation | 1 | Set to "1" if a short GI is used and an extra symbol is required for the payload of a PPDU<br>Set to "0" if an extra symbol is not required |
| SU/MU coding | 1 | In the case of a VHT SU PPDU:<br>Set to "0" in the case of binary convolutional code (BCC)<br>Set to "1" in the case of low-density parity check (LDPC)<br>In the case of a VHT MU PPDU:<br>Indicate coding used if the NSTS field of a user whose user position is "0" is not "0"<br>Set to "0" in the case of BCC<br>Set to "1" in the case of PDPC<br>Set to "1" as a reserved field if the NSTS field of a user whose user position is "0" is "0" |
| LDPC Extra OFDM symbol | 1 | Set to "1" if an extra OFDM symbol is required due to an PDPC PPDU encoding procedure (in the case of a SU PPDU) or the PPDU encoding procedure of at least one PDPC user (in the case of a VHT MU PPDU)<br>Set to "0" if not |
| SU VHT MCS/MU coding | 4 | In the case of a VHT SU PPDU:<br>Indicate a VHT-MCS index<br>In the case of a VHT MU PPDU:<br>Indicate coding for user positions "1" to "3" sequentially from upper bits<br>Indicate coding used if the NSTS field of each user is not "1"<br>Set to "0" in the case of BCC<br>Set to "1" in the case of LDPC<br>Set to "1" as a reserved field if the NSTS field of each user is "0" |

TABLE 3-continued

| FIELD | BIT | DESCRIPTION |
| --- | --- | --- |
| Beamformed | 1 | In the case of a VHT SU PPDU:<br>Set to "1" if a beamforming steering matrix is applied to SU transmission<br>Set to "0" if not<br>In the case of a VHT MU PPDU:<br>Set to "1" as a reserved field |
| Reserved | 1 | |
| CRC | 8 | Include CRS for detecting an error of a PPDU on the receiver side |
| Tail | 6 | Used to terminate the trellis of a convolutional decoder<br>Set to "0" |

The VHT-STF is used to improve AGC estimation performance in MIMO transmission.

The VHT-LTF is used for a VHT-STA to estimate an MIMO channel. Since a VHT WLAN system supports MU-MIMO, the VHT-LTF may be configured by the number of spatial streams through which a PPDU is transmitted. Additionally, if full channel sounding is supported, the number of VHT-LTFs may be increased.

The VHT-SIG-B field includes dedicated control information which is necessary for a plurality of MU-MIMO-paired VHT-STAs to receive a PPDU and to obtain data. Accordingly, only when common control information included in the VHT-SIG-A field indicates that a received PPDU is for MU-MIMO transmission, a VHT-STA may be designed to decode the VHT-SIG-B field. In contrast, if common control information indicates that a received PPDU is for a single VHT-STA (including SU-MIMO), an STA may be designed to not decode the VHT-SIG-B field.

The VHT-SIG-B field includes a VHT-SIG-B length field, a VHT-MCS field, a reserved field, and a tail field.

The VHT-SIG-B length field indicates the length of an A-MPDU (prior to end-of-frame (EOF) padding). The VHT-MCS field includes information about the modulation, encoding, and rate-matching of each VHT-STA.

The size of the VHT-SIG-B field may be different depending on the type (MU-MIMO or SU-MIMO) of MIMO transmission and a channel bandwidth used for PPDU transmission.

FIG. 4(b) illustrates a VHT-SIG-B field according to a PPDU transmission bandwidth.

Referring to FIG. 4(b), in 40 MHz transmission, VHT-SIG-B bits are repeated twice. In 80 MHz transmission, VHT-SIG-B bits are repeated four times, and padding bits set to 0 are attached.

In 160 MHz transmission and 80+80 MHz transmission, first, VHT-SIG-B bits are repeated four times as in the 80 MHz transmission, and padding bits set to 0 are attached. Furthermore, a total of the 117 bits is repeated again.

In a system supporting MU-MIMO, in order to transmit PPDUs having the same size to STAs paired with an AP, information indicating the size of the bits of a data field forming the PPDU and/or information indicating the size of bit streams forming a specific field may be included in the VHT-SIG-A field.

In this case, an L-SIG field may be used to effectively use a PPDU format. A length field and a rate field which are included in the L-SIG field and transmitted so that PPDUs having the same size are transmitted to all of STAs may be used to provide required information. In this case, additional padding may be required in the physical layer because an MAC protocol data unit (MPDU) and/or an aggregate MAC PDU (A-MPDU) are set based on the bytes (or octets) of the MAC layer.

In FIG. 4, the data field is a payload and may include a service field, a scrambled PSDU, tail bits, and padding bits.

An STA needs to determine the format of a received PPDU because several formats of PPDUs are mixed and used as described above.

In this case, the meaning that a PPDU (or a PPDU format) is determined may be various. For example, the meaning that a PPDU is determined may include determining whether a received PPDU is a PPDU capable of being decoded (or interpreted) by an STA. Furthermore, the meaning that a PPDU is determined may include determining whether a received PPDU is a PPDU capable of being supported by an STA. Furthermore, the meaning that a PPDU is determined may include determining that information transmitted through a received PPDU is which information.

More detail is described referring to below figure.

MAC Frame Format

FIG. 5 illustrates the format of an MAC frame for an IEEE 802.11 system to which an embodiment of the present invention may be applied.

Referring to FIG. 5, the MAC frame (i.e., an MPDU) includes an MAC header, a frame body, and a frame check sequence (FCS).

The MAC Header is defined as an area, including a frame control field, a duration/ID field, an address 1 field, an address 2 field, an address 3 field, a sequence control field, an address 4 field, a QoS control field, and an HT control field.

The frame control field includes information about the characteristics of a corresponding MAC frame.

The duration/ID field may be implemented to have a different value depending on the type and subtype of a corresponding MAC frame.

If the type and subtype of a corresponding MAC frame is a PS-poll frame for a power save (PS) operation, the duration/ID field may be configured to include the association identifier (AID) of an STA that has transmitted the frame. In the remaining cases, the duration/ID field may be configured to have a specific duration value depending on the type and subtype of a corresponding MAC frame. Furthermore, if a frame is an MPDU included in an aggregate-MPDU (A-MPDU) format, the duration/ID field included in an MAC header may be configured to have the same value.

The address 1 field to the address 4 field are used to indicate a BSSID, a source address (SA), a destination address (DA), a transmitting address (TA) indicating the address of a transmitting STA, and a receiving address (RA) indicating the address of a receiving STA.

An address field implemented as a TA field may be set as a bandwidth signaling TA value. In this case, the TA field may indicate that a corresponding MAC frame includes additional information in a scrambling sequence. The bandwidth signaling TA may be represented as the MAC address of an STA that sends a corresponding MAC frame, but individual/group bits included in the MAC address may be set as a specific value (e.g., "1").

The sequence control field is configured to include a sequence number and a fragment number. The sequence number may indicate a sequence number assigned to a corresponding MAC frame. The fragment number may indicate the number of each fragment of a corresponding MAC frame.

The QoS control field includes information related to QoS. The QoS control field may be included if it indicates a QoS data frame in a subtype subfield.

The HT control field includes control information related to an HT and/or VHT transmission/reception scheme. The HT control field is included in a control wrapper frame. Furthermore, the HT control field is present in a QoS data frame having an order subfield value of 1 and a management frame.

The frame body is defined as an MAC payload. Data to be transmitted in a higher layer is placed in the frame body. The frame body has a varying size. For example, a maximum size of an MPDU may be 11454 octets, and a maximum size of a PPDU may be 5.484 ms.

The FCS is defined as a MAC footer and used for the error search of an MAC frame.

The first three fields (i.e., the frame control field, the duration/ID field, and Address 1 field) and the last field (i.e., the FCS field) form a minimum frame format and are present in all of frames. The remaining fields may be present only in a specific frame type.

FIG. 6 is a diagram illustrating a frame control field within an MAC frame in a wireless communication system to which an embodiment of the present invention may be applied.

Referring to FIG. 6, the frame control field includes a protocol version subfield, a type subfield, a subtype subfield, a To DS subfield, a From DS subfield, a more fragments subfield, a retry subfield, a power management subfield, a more data subfield, a protected frame subfield, and an order subfield.

The protocol version subfield may indicate the version of a WLAN protocol applied to a corresponding MAC frame.

The type subfield and the subtype subfield may be configured to indicate information to identify the function of a corresponding MAC frame.

The type of an MAC frame may include three frame types: a management frame, a control frame, and a data frame.

Furthermore, each of the frame types may be divided into subtypes.

For example, the control frames may include a request to send (RTS) frame, a clear-to-send (CTS) frame, an acknowledgment (ACK) frame, a PS-poll frame, a contention free (CF)-end frame, a CF-end+CF-ACK frame, a block acknowledgment (ACK) request (BAR) frame, a block acknowledgment (ACK) (BA) frame, a control wrapper (control+HT control) frame, a VHT null data packet announcement (NDPA) frame, and a beamforming report poll frame.

The management frames may include a beacon frame, an announcement traffic indication message (ATIM) frame, a disassociation frame, an association request/response frame, a reassociation request/response frame, a probe request/response frame, an authentication frame, a deauthentication frame, an action frame, an action no ACK frame, and a timing advertisement frame.

The To DS subfield and the From DS subfield may include information required to interpret an Address 1 field to an Address 4 field included in the header of a corresponding MAC frame. In the case of a control frame, both the To DS subfield and the From DS subfield are set to "0." In the case of the management frame, the To DS subfield and the From DS subfield may be sequentially set to "1" and "0" if a corresponding frame is a QoS management frame (QMF), and may be sequentially set to "0" and "0" if a corresponding frame is not a QMF.

The More Fragments subfield may indicate whether a fragment to be transmitted after a corresponding MAC frame is present. The More Fragments subfield may be set to "1" if another fragment of a current MSDU or MMPDU is present, and may be set to "0" if another fragment of a current MSDU or MMPDU is not present.

The retry subfield may indicate whether a corresponding MAC frame is based on the retransmission of a previous MAC frame. The retry subfield may be set to "1" if a corresponding MAC frame is based on the retransmission of a previous MAC frame, and may be set to "0" if a corresponding MAC frame is not based on the retransmission of a previous MAC frame.

The power management subfield may indicate power management mode of an STA. If the value of the power management subfield is "1", it may indicate that an STA should switch to power save mode.

The more data subfield may indicate whether an MAC frame to be additionally transmitted is present. The more data subfield may be set to "1" if an MAC frame to be additionally transmitted is present, and may be set to "0" if an MAC frame to be additionally transmitted is not present.

The protected frame subfield may indicate whether a frame body field has been encrypted. The protected frame subfield may be set to "1" if the frame body field includes information processed by a cryptographic encapsulation algorithm, and may be set to "0" if the frame body field does not include information processed by a cryptographic encapsulation algorithm.

The pieces of information included in each of the aforementioned fields may comply with the definition of the IEEE 802.11 system. Furthermore, each of the aforementioned fields corresponds to an example of fields which may be included in an MAC frame, but the present invention is not limited thereto. That is, each of the aforementioned fields may be substituted with another field or may further include an additional field, and all of the fields may not be essentially included.

FIG. 7 illustrates the VHT format of an HT control field in a wireless communication system to which an embodiment of the present invention may be applied.

Referring to FIG. 7, the HT control field may include a VHT subfield, an HT control middle subfield, an AC constraint subfield, and a reverse direction grant (RDG)/more PPDU subfield.

The VHT subfield indicates whether an HT control field has the format of the HT control field for a VHT (VHT=1) or the format of the HT control field for an HT (VHT=0). In FIG. 8, an HT control field for a VHT (i.e., VHT=1) is assumed and described. An HT control field for a VHT may also be called a VHT control subfield.

The HT control middle subfield may be implemented to a different format depending on the indication of a VHT subfield. The HT control middle subfield is described in detail later.

The AC constraint subfield indicates whether the mapped access category (AC) of a reverse direction (RD) data frame is constrained to a single AC.

The RDG/more PPDU subfield may be differently interpreted depending on whether a corresponding field is transmitted by an RD initiator or an RD responder.

Assuming that a corresponding field is transmitted by an RD initiator, the RDG/more PPDU subfield is set to "1" if an RDG is present, and the RDG/more PPDU subfield is set to "0" if an RDG is not present. Assuming that a corresponding field is transmitted by an RD responder, the RDG/more PPDU subfield is set to "1" if a PPDU including the corresponding subfield is the last frame transmitted by the RD responder, and the RDG/more PPDU subfield is set to "0" if another PPDU is transmitted.

As described above, the HT control middle subfield may be implemented to a different format depending on the indication of a VHT subfield.

The HT control middle subfield of an HT control field for VHT may include a reserved bit subfield, a modulation and coding scheme (MCS) feedback request (MRQ) subfield, an MRQ sequence identifier (MSI)/space-time block coding (STBC) subfield, an MCS feedback sequence identifier (MFSI)/least significant bit (LSB) of group ID (GID-L) subfield, an MCS feedback (MFB) subfield, a most significant Bit (MSB) of group ID (GID-H) subfield, a coding type subfield, a feedback transmission type (FB Tx type) subfield, and an unsolicited MFB subfield.

Table 4 illustrates a description of each subfield included in the HT control middle subfield of the VHT format.

Furthermore, the MFB subfield may include the number of VHT space time streams (NUM_STS) subfield, a VHT-MCS subfield, a bandwidth (BW) subfield, and a signal to noise ratio (SNR) subfield.

The NUM_STS subfield indicates the number of recommended spatial streams. The VHT-MCS subfield indicates a recommended MCS. The BW subfield indicates bandwidth information related to a recommended MCS. The SNR subfield indicates an average SNR value of data subcarriers and spatial streams.

The information included in each of the aforementioned fields may comply with the definition of an IEEE 802.11 system. Furthermore, each of the aforementioned fields corresponds to an example of fields which may be included in an MAC frame and is not limited thereto. That is, each of the aforementioned fields may be substituted with another field, additional fields may be further included, and all of the fields may not be essentially included.

Channel State Information (CSI) Feedback Method

An SU-MIMO technology in which a beamformer allocates all of antennas to a single beamformee and performs communication increases a channel capacity through a diversity gain and stream multi-transmission using the space-time. The SU-MIMO technology can contribute to the improvement of performance of the physical layer by extending the degree of space freedom in such a way as to increase the number of antennas compared to a case where an MIMO technology is not applied.

Furthermore, the MU-MIMO technology in which a beamformer allocates an antenna to a plurality of beamformees can improve performance of an MIMO antenna by increasing the transfer rate per beamformee or the reliability

TABLE 4

| SUBFIELD | MEANING | DEFINITION |
| --- | --- | --- |
| MRQ | MCS request | Set to "1" if MCS feedback (solicited MFB) is not requested<br>Set to "0" if not |
| MSI | MRQ sequence identifier | An MSI subfield includes a sequence number within a range of 0 to 6 to identify a specific request if an unsolicited MFB subfield is set to "0" and an MRQ subfield is set to "1."<br>Include a compressed MSI subfield (2 bits) and an STBC indication subfield (1 bit) if an unsolicited MFB subfield is "1." |
| MFSI/GID-L | MFB sequence identifier/LSB of group ID | An MFSI/GID-L subfield includes the received value of an MSI included within a frame related to MFB information if an unsolicited MFB subfield is set to "0."<br>An MFSI/GID-L subfield includes the lowest three bits of a group ID of a PPDU estimated by an MFB if an MFB is estimated from an MU PPDU. |
| MFB | VHT N_STS, MCS, BW, SNR feedback | An MFB subfield includes recommended MFB.<br>VHT-MCS = 15, NUM_STS = 7 indicates that feedback is not present. |
| GID-H | MSB of group ID | A GID-H subfield includes the most significant bit 3 bits of a group ID of a PPDU whose solicited MFB has been estimated if an unsolicited MFB field is set to "1" and MFB has been estimated from a VHT MU PPDU.<br>All of GID-H subfields are set to "1" if MFB is estimated from an SU PPDU. |
| Coding Type | Coding type or MFB response | If an unsolicited MFB subfield is set to "1", a coding type subfield includes the coding type (binary convolutional code (BCC) includes 0 and low-density parity check (LDPC) includes 1) of a frame whose solicited MFB has been estimated |
| FB Tx Type | Transmission type of MFB response | An FB Tx Type subfield is set to "0" if an unsolicited MFB subfield is set to "1" and MFB has been estimated from an unbeamformed VHT PPDU.<br>An FB Tx Type subfield is set to "1" if an unsolicited MFB subfield is set to "1" and MFB has been estimated from a beamformed VHT PPDU. |
| Unsolicited MFB | Unsolicited MCS feedback indicator | Set to "1" if MFB is a response to MRQ<br>Set to "0" if MFB is not a response to MRQ | of a channel through a link layer protocol for the multi-access of a plurality of beamformees which have accessed a beamformer.

In an MIMO environment, there is a need for a feedback procedure for obtaining channel information because performance may be greatly influenced depending on how accurately is a beamformer aware of channel information.

Two methods may be basically supported for the feedback procedure for obtaining channel information. One method is a method using a control frame, and the other method is a method using a channel sounding procedure not including a data field. Sounding means that a corresponding field is used in order to measure a channel for purposes other than the data demodulation of a PPDU including a preamble training field.

Hereinafter, a channel information feedback method using a control frame and a channel information feedback method using a null data packet (NDP) are described in more detail.

1) A Feedback Method Using a Control Frame

In an MIMO environment, a beamformer may indicate the feedback of channel state information through an HT control field included in an MAC header, or a beamformee may report channel state information through an HT control field included in an MAC frame header (see FIG. 8). The channel state information included in the HT control field may include signal to noise (SNR) information about all of transfer channels (or the full transmission bandwidth) in which an UL/DL PPDU is transmitted. An MCS feedback (MFB) field included in the HT control field may include a Num_STS field (3 bits), a VHT-MCS field (4 bits), a BW field (2 bits), and an SNR field (6 bits).

The Num_STS field indicates the number of streams recommended by an STA depending on the results of the measurement of a channel state. The VHT-MCS field indicates an MCS level recommended by an STA depending on the results of the measurement of a channel state. The BW field indicates a bandwidth recommended by an STA for an MCS level indicated by a VHT-MCS field if an unsolicited MFB field for an HT control field is "1", and is used as reserved bits if the unsolicited MFB field is "0." The SNR field indicates an average SNR for data tones and time-space streams.

The HT control field may be included in a control wrapper frame or a QoS data frame in which the order subfield of an MAC header has been set to 1 or a management frame.

2) A Feedback Method Using Channel Sounding

FIG. 8 is a diagram conceptually illustrating a channel sounding method in a wireless communication system to which an embodiment of the present invention may be applied.

FIG. 8 illustrates a method for feeding back channel state information between a beamformer (e.g., an AP) and a beamformee (e.g., a non-AP STA) based on a sounding protocol. The sounding protocol may mean a procedure for receiving information about channel state information through feedback.

A channel state information sounding method between a beamformer and a beamformee based on the sounding protocol may be performed according to the following steps.

(1) A beamformer sends a VHT null data packet announcement (VHT NDPA) frame for providing notification of sounding transmission for the feedback of a beamformee.

The VHT NDPA frame refers to a control frame which is used to provide notification that channel sounding is initiated and a null data packet (NDP) will be transmitted. In other words, by sending the VHT NDPA frame prior to the transmission of the NDP frame, a beamformee may be prepared for the feedback of channel state information before receiving the NDP frame.

The VHT NDPA frame may include association identifier (AID) information, feedback type information, etc. about a beamformee which will send an NDP. The VHT NDPA frame will be described in more detail later.

The VHT NDPA frame may be transmitted using different methods if data is transmitted using MU-MIMO and if data is transmitted using SU-MIMO. For example, if channel sounding for MU-MIMO is performed, the VHT NDPA frame may be transmitted using a broadcast method. In contrast, if channel sounding for SU-MIMO is performed, the VHT NDPA frame may be transmitted to a single target STA using a unicast method.

(2) A beamformer sends an NDP after an SIFS time after sending a VHT NDPA frame. The NDP has a VHT PPDU structure other than a data field.

Beamformees that have received the VHT NDPA frame may check the value of an AID12 subfield included in an STA information field and check whether each of the beamformees is a sounding target STA.

Furthermore, the beamformees may be aware of a feedback sequence through the sequence of an STA Info field included in NDPA. FIG. 8 illustrates a case where a feedback sequence is performed in order of a beamformee 1, a beamformee 2, and a beamformee 3.

(3) The beamformee 1 obtains DL channel state information based on a training field included in an NDP and generates feedback information to be transmitted to a beamformer.

After receiving the NDP frame, the beamformee 1 sends a VHT compressed beamforming frame, including feedback information, to the beamformer after an SIFS.

The VHT compressed beamforming frame may include the SNR value of a space-time stream, information about the compressed beamforming feedback matrix of a subcarrier, etc. The VHT compressed beamforming frame is described in more detail later.

(4) After receiving the VHT compressed beamforming frame from the beamformee 1, the beamformer sends a beamforming report poll frame to the beamformee 2 after an SIFS in order to obtain channel information from the beamformee 2.

The beamforming report poll frame plays the same role as the NDP frame. The beamformee 2 may measure a channel state based on the transmitted beamforming report poll frame.

The beamforming report poll frame is described in more detail later.

(5) The beamformee 2 that has received the beamforming report poll frame sends a VHT compressed beamforming frame, including feedback information, to the beamformer after an SIFS.

(6) After receiving the VHT compressed beamforming frame from the beamformee 2, the beamformer sends a beamforming report poll frame to the beamformee 3 in order to obtain channel information from the beamformee 3 after an SIFS.

(7) The beamformee 3 that has received the beamforming report poll frame sends a VHT compressed beamforming frame, including feedback information, to the beamformer after an SIFS.

A frame used in the above-described channel sounding procedure is described below.

FIG. 9 is a diagram illustrating a VHT NDPA frame in a wireless communication system to which an embodiment of the present invention may be applied.

Referring to FIG. 9, the VHT NDPA frame may include a frame control field, a duration field, a receiving address (RA) field, a transmitting address (TA) field, a sounding dialog token field, an STA information 1 (STA Info 1) field to an STA information n (STA Info n) field, and FCS.

The value of the RA field indicates the address of a recipient or STA which receives a VHT NDPA frame.

If the VHT NDPA frame includes a single STA Info field, the value of the RA field has the address of an STA identified by an AID within the STA Info field. For example, if the VHT NDPA frame is transmitted to a single target STA for SU-MIMO channel sounding, an AP sends the VHT NDPA frame to a target STA in a unicast manner.

In contrast, if the VHT NDPA frame includes one or more STA Info fields, the value of the RA field has a broadcast address. For example, if the VHT NDPA frame is transmitted to one or more target STAs for MU-MIMO channel sounding, an AP broadcasts the VHT NDPA frame.

The value of the TA field indicates the address of a transmitter which sends the VHT NDPA frame, the address of an STA which sends the VHT NDPA frame, or a bandwidth which signalizes TA.

The sounding dialog token field may also be called a sounding sequence field. A sounding dialog token number subfield within the sounding dialog token field includes a value selected by a beamformer in order to identify the VHT NDPA frame.

The VHT NDPA frame includes at least one STA Info field. That is, the VHT NDPA frame includes an STA Info field including information about a sounding target STA. One STA Info field may be included in each sounding target STA.

Each STA Info field may include an AID12 subfield, a feedback type subfield, and an Nc index subfield.

Table 5 shows the subfields of the STA Info field included in the VHT NDPA frame.

TABLE 5

| Subfield | Description |
|---|---|
| AID12 | Include the AID of an STA, that is, the subject of sounding feedback. If a target STA is an AP, a mesh STA or an STA, that is, a member of an IBSS, the value of the AID12 subfield is set to "0". |
| Feedback Type | Indicate a feedback request type for a sounding target STA. "0" in the case of SU-MIMO "1" in the case of MU-MIMO |
| Nc Index | If feedback type subfield indicates MU-MIMO, indicates a value obtained by subtracting 1 from the column number Nc of a compressed beamforming feedback matrix. "0" if Nc = 1, "1" if Nc = 2, ... "7" if Nc = 8, Set as a reserved subfield in the case of SU-MIMO. |

The pieces of information included in each of the above-described fields may comply with the definition of an IEEE 802.11 system. Furthermore, the above-described fields may correspond to an example of fields which may be included in an MAC frame, may be replaced with other fields, or may further include an additional field.

FIG. 10 is a diagram illustrating an NDP PPDU in a wireless communication system to which an embodiment of the present invention may be applied.

Referring to FIG. 10, an NDP may have a format from which a data field has been omitted in the same VHT PPDU format as that of FIG. 4. The NDP may be precoded based on a specific precoding matrix and transmitted to a sounding target STA.

In the L-SIG field of the NDP, a length field indicating the length of a PSDU included in a data field is set to "0."

In the VHT-SIG-A field of the NDP, a Group ID field indicating whether a transmission scheme used for NDP transmission is MU-MIMO or SU-MIMO is set as a value indicating SU-MIMO transmission.

The data bit of the VHT-SIG-B field of the NDP is set in a bit pattern fixed for each bandwidth.

When a sounding target STA receives an NDP, it estimates a channel and obtains channel state information based on the VHT-LTF field of the NDP.

FIG. 11 is a diagram illustrating the format of a VHT compressed beamforming frame in a wireless communication system to which an embodiment of the present invention may be applied.

Referring to FIG. 11, the VHT compressed beamforming frame is a VHT action frame for supporting a VHT function and includes an action field in a frame body. The action field is included in the frame body of an MAC frame, and provides a mechanism for specifying extended management actions.

The action field is composed of a category field, a VHT action field, a VHT MIMO control field, a VHT compressed beamforming report field, and an MU exclusive beamforming report field.

The category field is set as a value indicating a VHT category (i.e., a VHT Action frame). The VHT action field is set as a value indicating a VHT compressed beamforming frame.

The VHT MIMO control field is used to feed back control information related to beamforming feedback. The VHT MIMO control field may be always present in the VHT compressed beamforming frame.

The VHT compressed beamforming report field is used to feed back information about beamforming metric including SNR information about a space-time stream which is used to send data.

The MU exclusive beamforming report field is used to feed back SNR information about a spatial stream if MU-MIMO transmission is performed.

Whether the VHT compressed beamforming report field and the MU exclusive beamforming report field are present or not and the contents thereof may be determined based on the values of the feedback type subfield, remaining feedback segments subfield, and first feedback segment subfield of the VHT MIMO control field.

The VHT MIMO control field, the VHT compressed beamforming report field, and the MU exclusive beamforming report field are described in more detail below.

1) The VHT MIMO control field is composed of an Nc index subfield, an Nr index subfield, a channel width subfield, a grouping subfield, a codebook information subfield, a feedback type subfield, a remaining feedback segments subfield, a first feedback segment subfield, a reserved subfield, and a sounding dialog token number subfield.

Table 6 shows the subfields of the VHT MIMO control field.

TABLE 6

| Subfield | number of bits | description |
| --- | --- | --- |
| Nc Index | 3 | Indicate a value obtained by subtracting 1 from the column number Nc of a compressed beamforming feedback matrix. "0" if Nc = 1, "1" if Nc = 2, . . . "7" if Nc = 8 |
| Nr Index | 3 | Indicate a value obtained by subtracting 1 from the row number Nr of a compressed beamforming feedback matrix. "0" if Nr = 1, "1" if Nr = 2, . . . "7" if Nr = 8 |
| Channel Width | 2 | Indicate the bandwidth of a channel measured in order to generate a compressed beamforming feedback matrix. "0" in the case of 20 MHz, "1" in the case of 40 MHz, "2" in the case of 80 MHz, and "3" in the case of 160 MHz or 80 + 80 MHz |
| Grouping | 2 | Indicate subcarrier grouping Ng used in a compressed beamforming feedback matrix. "0" if Ng = 1 (no grouping), "1" if Ng = 2, "2" if Ng = 4, and a value "3" is set as a reserved value |
| Codebook Information | 1 | Indicate the size of codebook entries. If a feedback type is SU-MIMO, "0" if $b\psi$ = 2, $b\Phi$ = 4, "1" if $b\psi$ = 4, $b\Phi$ = 6, If a feedback type is MU-MIMO, "0" if $b\psi$ = 5, $b\Phi$ = 7, "1" if $b\psi$ = 7, $b\Phi$ = 9, In this case, $b\psi$ and $b\Phi$ refer to the number of quantized bits. |
| Feedback Type | 1 | Indicate a feedback type. "0" in the case of SU-MIMO, "1" in the case of MU-MIMO |
| Remaining Feedback Segments | 3 | Indicate the number of remaining feedback segments of a related VHT compressed beamforming frame. Set to "0" in the case of the last feedback segment of a segmented report or a segment of an unsegmented report. Set as a value from "1" to "6" not in the case of the first or last feedback segment of a segmented report. Set as a value from "1" to "6" in the case of a feedback segment other than the last segment of a segmented report. In the case of a retransmission feedback segment, a field is set as the same value as a related segment of the original transmission. |
| First Feedback Segments | 1 | Set to "1" in the case of the first feedback segment of a segmented report or the feedback segment of an unsegmented report. Set to "0" not in the case of the first feedback segment or if a VHT compressed beamforming report field or an MU exclusive beamforming report field is not present in a frame. The field is set as the same value as a related segment of the original transmission |
| Sounding Dialog Token Number | 6 | Set as the value of the sounding dialog token of an NDPA frame |

If the VHT compressed beamforming frame does not transfer some or all of the VHT compressed beamforming report field, the Nc Index subfield, the channel width subfield, the grouping subfield, the codebook information subfield, the feedback type subfield, and the sounding dialog token number subfield are set as reserved fields, the first feedback segment subfield is set to "0", and the remaining feedback segments subfield is set to "7."

The sounding dialog token number subfield may also be called a sounding sequence number subfield.

2) The VHT compressed beamforming report field is used to transfer explicit feedback information that expresses a compressed beamforming feedback matrix "V", used by a transmitting beamformer to determine a steering matrix "Q", in an angle form.

Table 7 shows the subfields of the VHT compressed beamforming report field.

TABLE 7

| Subfield | number of bits | description |
| --- | --- | --- |
| Average SNR of space-time stream 1 | 8 | Average SNR on all of subcarriers for a space-time stream 1 in a beamformee |
| . . . | . . . | . . . |
| Average SNR of space-time stream Nc | 8 | Average SNR on all of subcarriers for a space-time stream Nc in a beamformee |
| Compressed beamforming feedback matrix V for subcarrier k = scidx (o) | Na * ($b\psi$ + $b\Phi$)/2 | Sequence of the angle of a compressed beamforming feedback matrix for a corresponding subcarrier |
| Compressed beamforming feedback matrix V for subcarrier k = scidx (1) | Na * ($b\psi$ + $b\Phi$)/2 | Sequence of the angle of a compressed beamforming feedback matrix for a corresponding subcarrier |
| . . . | | . . . |
| Compressed beamforming feedback matrix V for subcarrier k = scidx (Ns−1) | Na * ($b\psi$ + $b\Phi$)/2 | Sequence of the angle of a compressed beamforming feedback matrix for a corresponding subcarrier |

Referring to Table 7, the VHT compressed beamforming report field may include an average SNR of space-time streams and the compressed beamforming feedback matrix "V" of each subcarrier. The compressed beamforming feedback matrix is a matrix including information about a channel situation, and is used to calculate a channel matrix (i.e., a steering matrix "Q") in a transmission method using MIMO.

scidx( ) means a subcarrier in which a compressed beamforming feedback matrix subfield is transmitted. Na is fixed by an Nr×Nc value (e.g., if Nr×Nc=2×1, Φ11, Ψ21, . . . ).

Ns refers to the number of subcarriers in which a compressed beamforming feedback matrix is transmitted to a beamformer. A beamformee may reduce the number of subcarriers Ns in which a compressed beamforming feedback matrix is transmitted using a grouping method. For example, the number of feedback compressed beamforming feedback matrices can be reduced by grouping a plurality of subcarriers into a single group (or grouping a plurality of subcarriers in an Ng unit) and transmitting compressed beamforming feedback matrices for each corresponding group. Ns may be calculated from a channel width subfield and a grouping subfield included in the VHT MIMO control field.

Table 8 illustrates an average SNR subfield of a space-time stream.

TABLE 8

| Average SNR of Space-Time i subfield | AvgSNR i |
|---|---|
| −128 | ≤−10 dB |
| −127 | −9.75 dB |
| −126 | −9.5 dB |
| . . . | . . . |
| +126 | 53.5 dB |
| +127 | ≥53.75 dB |

Referring to Table 8, an average SNR of each of space-time streams is calculated by calculating an average SNR value of all of subcarriers included in a channel and mapping the calculated average SNR value in a range of −128~+128.

3) The MU exclusive beamforming report field is used to transfer explicit feedback information expressed in the form of a delta( ) SNR. Information within the VHT compressed beamforming report field and the MU exclusive beamforming report field may be used for an MU beamformer to determine a steering matrix "Q."

Table 9 shows the subfields of the MU exclusive beamforming report field included in the VHT compressed beamforming frame.

TABLE 9

| Subfield | Number of Bits | Description |
|---|---|---|
| A delta SNR for a space-time stream 1 for a subcarrier k = sscidx (0) | 4 | A deviation between the SNR of a corresponding subcarrier and an average SNR of all the subcarriers of a corresponding space-time stream |
| . . . | | |
| A delta SNR for a space-time stream Nc for a subcarrier k = sscidx (0) | 4 | A deviation between the SNR of a corresponding subcarrier and an average SNR of all the subcarriers of a corresponding space-time stream |
| . . . | | |
| A delta SNR for a space-time stream 1 for a subcarrier k = sscidx (1) | 4 | A deviation between the SNR of a corresponding subcarrier and an average SNR of all the subcarriers of a corresponding space-time stream |
| . . . | | |
| A delta SNR for a space-time stream Nc for a subcarrier k = sscidx (1) | 4 | A deviation between the SNR of a corresponding subcarrier and an average SNR of all the subcarriers of a corresponding space-time stream |
| . . . | | |
| A delta SNR for a space-time stream 1 for a subcarrier k = sscidx (Ns'−1) | 4 | A deviation between the SNR of a corresponding subcarrier and an average SNR of all the subcarriers of a corresponding space-time stream |
| . . . | | |
| A delta SNR for a space-time stream Nc for a subcarrier k = sscidx (Ns'−1) | 4 | A deviation between the SNR of a corresponding subcarrier and an average SNR of all the subcarriers of a corresponding space-time stream |

Referring to Table 9, the MU exclusive beamforming report field may include an SNR per space-time stream for each subcarrier.

Each delta SNR subfield has a value that increases at an interval of 1 dB between −8 dB and 7 dB.

scidx( ) refers to a subcarrier(s) in which a delta SNR subfield is transmitted, and Ns refers to the number of subcarriers in which a delta SNR subfield is transmitted to a beamformer.

FIG. 12 is a diagram illustrating the format of a beamforming report poll frame in a wireless communication system to which an embodiment of the present invention may be applied.

Referring to FIG. 12, the beamforming report poll frame is composed of a frame control field, a duration field, a receiving address (RA) field, a transmitting address (TA) field, a feedback segment retransmission bitmap field, and an FCS.

The value of the RA field indicates the address of an intended recipient.

The value of the TA field indicates the address of an STA that sends the beamforming report poll frame or a bandwidth which signals a TA.

The feedback segment retransmission bitmap field indicates a feedback segment that is requested in a VHT compressed beamforming report.

In the value of the feedback segment retransmission bitmap field, if the bit of a location n is "1", (n=0 in the case of the LSB and n=7 in the case of the MSB), a feedback segment corresponding to "n" in the remaining feedback segments subfield within the VHT MIMO control field of a VHT compressed beamforming frame is requested. In contrast, if the bit of the location n is "0", a feedback segment corresponding to "n" in the remaining feedback segments subfield within the VHT MIMO control field is not requested.

DL MU-MIMO Frame

FIG. 13 is a diagram illustrating a downlink multi-user (DL MU) PPDU format in a wireless communication system to which an embodiment of the present invention may be applied.

Referring to FIG. 13, the PPDU is configured to include a preamble and a data field. The data field may include a service field, a scrambled PSDU field, tail bits, and padding bits.

An AP may aggregate MPDUs and transmit a data frame using an aggregated MPDU (A-MPDU) format. In this case, a scrambled PSDU field may include the A-MPDU.

The A-MPDU includes a sequence of one or more A-MPDU subframes.

In the case of a VHT PPDU, the length of each A-MPDU subframe is a multiple of 4 octets. Accordingly, an A-MPDU may include an end-of-frame (EOF) pad of 0 to 3 octets after the last A-MPDU subframe in order to match the A-MPDU up with the last octet of a PSDU.

The A-MPDU subframe includes an MPDU delimiter, and an MPDU may be optionally included after the MPDU delimiter. Furthermore, a pad octet is attached to the MPDU in order to make the length of each A-MPDU subframe in a multiple of 4 octets other than the last A-MPDU subframe within one A-MPDU.

The MPDU delimiter includes a reserved field, an MPDU length field, a cyclic redundancy check (CRC) field, and a delimiter signature field.

In the case of a VHT PPDU, the MPDU delimiter may further include an end-of-frame (EOF) field. If an MPDU length field is 0 and an A-MPDU subframe or A-MPDU used for padding includes only one MPDU, in the case of an A-MPDU subframe on which a corresponding MPDU is carried, the EOF field is set to "1." If not, the EOF field is set to "0."

The MPDU length field includes information about the length of the MPDU.

If an MPDU is not present in a corresponding A-MPDU subframe, the MPDU length field is set to "0." An A-MPDU subframe in which an MPDU length field has a value of "0" is used to be padded to a corresponding A-MPDU in order to match the A-MPDU up with available octets within a VHT PPDU.

The CRC field includes CRC information for an error check. The delimiter signature field includes pattern information used to search for an MPDU delimiter.

Furthermore, the MPDU includes an MAC header, a frame body, and a frame check sequence (FCS).

FIG. 14 is a diagram illustrating a DL multi-user (MU) PPDU format in a wireless communication system to which an embodiment of the present invention may be applied.

In FIG. 14, the number of STAs receiving a corresponding PPDU is assumed to be 3 and the number of spatial streams allocated to each STA is assumed to be 1, but the number of STAs paired with an AP and the number of spatial streams allocated to each STA are not limited thereto.

Referring to FIG. 14, the MU PPDU is configured to include L-TFs (i.e., an L-STF and an L-LTF), an L-SIG field, a VHT-SIG-A field, a VHT-TFs (i.e., a VHT-STF and a VHT-LTF), a VHT-SIG-B field, a service field, one or more PSDUs, a padding field, and a tail bit. The L-TFs, the L-SIG field, the VHT-SIG-A field, the VHT-TFs, and the VHT-SIG-B field are the same as those of FIG. 4, and a detailed description thereof is omitted.

Information for indicating PPDU duration may be included in the L-SIG field. In the PPDU, PPDU duration indicated by the L-SIG field includes a symbol to which the VHT-SIG-A field has been allocated, a symbol to which the VHT-TFs have been allocated, a field to which the VHT-SIG-B field has been allocated, bits forming the service field, bits forming a PSDU, bits forming the padding field, and bits forming the tail field. An STA receiving the PPDU may obtain information about the duration of the PPDU through information indicating the duration of the PPDU included in the L-SIG field.

As described above, group ID information and time and spatial stream number information for each user are transmitted through the VHT-SIG-A, and a coding method and MCS information are transmitted through the VHT-SIG-B. Accordingly, beamformees may check the VHT-SIG-A and the VHT-SIG-B and may be aware whether a frame is an MU MIMO frame to which the beamformee belongs. Accordingly, an STA which is not a member STA of a corresponding group ID or which is a member of a corresponding group ID, but in which the number of streams allocated to the STA is "0" is configured to stop the reception of the physical layer to the end of the PPDU from the VHT-SIG-A field, thereby being capable of reducing power consumption.

In the group ID, an STA can be aware that a beamformee belongs to which MU group and it is a user who belongs to the users of a group to which the STA belongs and who is placed at what place, that is, that a PPDU is received through which stream by previously receiving a group ID management frame transmitted by a beamformer.

All of MPDUs transmitted within the VHT MU PPDU based on 802.11ac are included in the A-MPDU. In the data field of FIG. 10, each VHT A-MPDU may be transmitted in a different stream.

In FIG. 14, the A-MPDUs may have different bit sizes because the size of data transmitted to each STA may be different.

In this case, null padding may be performed so that the time when the transmission of a plurality of data frames transmitted by a beamformer is ended is the same as the time when the transmission of a maximum interval transmission data frame is ended. The maximum interval transmission data frame may be a frame in which valid downlink data is transmitted by a beamformer for the longest time. The valid downlink data may be downlink data that has not been null padded. For example, the valid downlink data may be included in the A-MPDU and transmitted. Null padding may be performed on the remaining data frames other than the maximum interval transmission data frame of the plurality of data frames.

For the null padding, a beamformer may fill one or more A-MPDU subframes, temporally placed in the latter part of a plurality of A-MPDU subframes within an A-MPDU frame, with only an MPDU delimiter field through encoding. An A-MPDU subframe having an MPDU length of 0 may be called a null subframe.

As described above, in the null subframe, the EOF field of the MPDU delimiter is set to "1." Accordingly, when the EOF field set to 1 is detected in the MAC layer of an STA on the receiving side, the reception of the physical layer is stopped, thereby being capable of reducing power consumption.

Block ACK Procedure

FIG. 15 is a diagram illustrating a DL MU-MIMO transmission process in a wireless communication system to which an embodiment of the present invention may be applied.

In 802.11ac, MU-MIMO is defined in DL from an AP toward a client (i.e., a non-AP STA). In this case, a multi-user is simultaneously transmitted to a multi-recipient, but acknowledgement may be individually transmitted in UL.

All of MPDUs transmitted within a VHT MU PPDU based on 802.11ac are included in an A-MPDU. A response to an A-MPDU within a VHT MU PPDU other than an instant response to a VHT MU PPDU is transmitted as a response to a block ACK request (BAR) frame by an AP.

First, an AP sends a VHT MU PPDU (i.e., a preamble and data) to all of recipients (i.e., an STA 1, an STA 2, and an STA 3). The VHT MU PPDU includes a VHT A-MPDU transmitted to each STA.

The STA 1 that has received the VHT MU PPDU from the AP sends a block ACK (BA) frame to the AP after an SIFS. The BA frame is described in more detail later.

The AP that has received the BA from the STA 1 sends a block acknowledgement request (BAR) frame to the next STA 2 after an SIFS. The STA 2 sends a BA frame to the AP after an SIFS. The AP that has received the BA frame from the STA 2 sends a BAR frame to the STA 3 after an SIFS. The STA 3 sends a BA frame to the AP after an SIFS.

If such a process is performed on all of the STAs, the AP sends a next MU PPDU to all of the STAs.

Acknowledgement (ACK)/Block ACK Frame

In general, an ACK frame is used as a response to an MPDU, and a block ACK frame is used as a response to an A-MPDU.

FIG. 16 is a diagram illustrating an ACK frame in a wireless communication system to which an embodiment of the present invention may be applied.

Referring to FIG. 16, the ACK frame is composed of a frame control field, a duration field, an RA field, and an FCS.

The RA field is set as the value of the second address (Address 2) field of a data frame, a management frame, a block ACK request frame, a block ACK frame or a PS-Poll frame that has been received right before.

When an ACK frame is transmitted by a non-QoS STA, if a more fragments subfield within the frame control field of a data frame or a management frame that has been received right before is "0", a duration value is set to "0."

In an ACK frame not transmitted by a non-QoS STA, a duration value is set as a value (ms) obtained by subtracting the time required to send the ACK frame and an SIFS interval from the duration/ID field of a data frame, a management frame, a block ACK request frame, a block ACK frame or a PS-Poll frame that has been received right before. If the calculated duration value is not an integer value, it is rounded off to the nearest whole number.

Hereinafter, a block ACK (request) frame is described.

FIG. 17 is a diagram illustrating a block ACK request frame in a wireless communication system to which an embodiment of the present invention may be applied.

Referring to FIG. 17, the block ACK request (BAR) frame is composed of a frame control field, a duration/ID field, a reception address (RA) field, a transmission address (TA) field, a BAR control field, a BAR information field, and a frame check sequence (FCS).

The RA field may be set as the address of an STA that receives the BAR frame.

The TA field may be set as the address of an STA that sends the BAR frame.

The BAR control field includes a BAR ACK policy subfield, a multi-TID subfield, a compressed bitmap subfield, a reserved subfield, and a TID information (TID_Info) subfield.

Table 10 illustrates the BAR control field.

TABLE 10

| subfield | bit | description |
|---|---|---|
| BAR ACK policy | 1 | Set to "0" when a sender requests an immediate ACK for data transmission. Set to "1" when a sender does not request an immediate ACK for data transmission. |
| Multi-TID Compressed bitmap | 1 1 | Indicate the type of BAR frame depending on the values of a multi-TID subfield and a compressed bitmap subfield. 00: Basic BAR 01: Compressed BAR 10: Reserved value 11: Multi-TID BAR |
| Reserved | 9 | |
| TID_Info | 4 | The meaning of a TID_Info field is determined by the type of BAR frame. Include TID that requests a BA frame in the case of a basic BAR frame, a compressed BAR frame. Include the number of TIDs in the case of a multi-TID BAR frame |

The BAR Information field includes different information depending on the type of BAR frame. This is described with reference to FIG. 18.

FIG. 18 is a diagram illustrating the BAR information field of a block ACK request frame in a wireless communication system to which an embodiment of the present invention may be applied.

FIG. 18(a) illustrates the BAR Information field of a basic BAR frame and a compressed BAR frame, and FIG. 18(b) illustrates the BAR Information field of a multi-TID BAR frame.

Referring to FIG. 18(a), in the case of the basic BAR frame and the compressed BAR frame, the BAR information field includes a block ACK starting sequence control subfield.

Furthermore, the block ACK starting sequence control subfield includes a fragment number subfield and a starting sequence number subfield.

The fragment number field is set to 0.

In the case of the basic BAR frame, the starting sequence number subfield includes the sequence number of the first MSDU in which a corresponding BAR frame is transmitted. In the case of the compressed BAR frame, the starting sequence control subfield includes the sequence number of the first MSDU or A-MSDU for transmitting a corresponding BAR frame.

Referring to FIG. 18(b), in the case of the multi-TID BAR frame, the BAR Information field is configured in such a manner that a Per TID Info subfield and a block ACK starting sequence control subfield are repeated for one or more TIDs.

The Per TID Info subfield includes a reserved subfield and a TID value subfield. The TID value subfield includes a TID value.

The block ACK starting sequence control subfield, as described above, includes a fragment number and a starting sequence number subfield. The fragment number field is set to 0. The starting sequence control subfield includes the sequence number of the first MSDU or A-MSDU for transmitting a corresponding BAR frame.

FIG. 19 is a diagram illustrating a block ACK frame in a wireless communication system to which an embodiment of the present invention may be applied.

Referring to FIG. 19, the block ACK (BA) frame is composed of a frame control field, a duration/ID field, a reception address (RA) field, a transmission address (TA) field, a BA control field, a BA information field, and a frame check sequence (FCS).

The RA field may be set as the address of an STA that has requested a block ACK.

The TA field may be set as the address of an STA that sends a BA frame.

The BA control field includes a BA ACK policy subfield, a multi-TID subfield, a compressed bitmap subfield, a reserved subfield, and a TID information (TID_Info) subfield.

Table 11 illustrates the BA control field.

TABLE 11

| subfield | bit | description |
| --- | --- | --- |
| BA ACK policy | 1 | Set to "0" when a sender requests an immediate ACK for data transmission. Set to "1" when a sender does not request an immediate ACK for data transmission. |
| Multi-TID | 1 | Indicate the type of BA frame depending on the values of a multi-TID subfield and a compressed bitmap subfield. 00: Basic BA 01: Compressed BA 10: Reserved value 11: Multi-TID BA |
| Compressed bitmap | 1 | |
| Reserved | 9 | |
| TID_Info | 4 | The meaning of a TID_Info field is determined by the type of BA frame. Include TID that requests a BA frame in the case of a basic BA frame, a compressed BA frame. Include the number of TIDs in the case of a multi-TID BA frame |

The BA information field includes different information depending on the type of BA frame. This is described below with reference to FIG. 20.

FIG. 20 is a diagram illustrating the BA information field of a block ACK frame in a wireless communication system to which an embodiment of the present invention may be applied.

FIG. 20(a) illustrates the BA information field of a basic BA frame, FIG. 20(b) illustrates the BA information field of a compressed BA frame, and FIG. 20(c) illustrates the BA information field of a multi-TID BA frame.

Referring to FIG. 20(a), in the case of the basic BA frame, the BA information field includes a block ACK starting sequence control subfield and a block ACK bitmap subfield.

The block ACK starting sequence control subfield includes a fragment number field and a starting sequence number subfield as described above.

The fragment number field is set to 0.

The starting sequence number subfield includes the sequence number of the first MSDU for transmitting a corresponding BA frame, and is set as the same value as the basic BAR frame that has been received right before.

The block ACK bitmap subfield has a length of 128 octets and is used to indicate the reception state of a maximum of 64 MSDUs. In the block ACK bitmap subfield, a value "1" indicates that an MPDU corresponding to a corresponding bit location has been successfully received. A value "0" indicates that an MPDU corresponding to a corresponding bit location has not been successfully received.

Referring to FIG. 20(b), in the case of the compressed BA frame, the BA information field includes a block ACK starting sequence control subfield and a block ACK bitmap subfield.

The block ACK starting sequence control subfield includes a fragment number field and a starting sequence number subfield as described above.

The fragment number field is set to 0.

The starting sequence number subfield includes the sequence number of the first MSDU or A-MSDU for transmitting a corresponding BA frame, and is set as the same value as the basic BAR frame that has been received right before.

The block ACK bitmap subfield has a length of 8 octets and is used to indicate the reception state a maximum of 64 MSDUs and A-MSDUs. In the block ACK bitmap subfield, a value "1" indicates that a single MSDU or A-MSDU corresponding to a corresponding bit location has been successfully received. A value "0" indicates that a single MSDU or A-MSDU corresponding to a corresponding bit location has not been successfully received.

Referring to FIG. 20(c), in the case of the multi-TID BA frame, the BA information field is configured in such a manner that a Per TID_Info subfield, a block ACK starting sequence control subfield, and a block ACK bitmap subfield are repeated for one or more TIDs and is configured in order of an increasing TID.

The Per TID_Info subfield includes a reserved subfield and a TID value subfield. The TID value subfield includes a TID value.

The block ACK starting sequence control subfield includes a fragment number and a starting sequence number subfield as described above. The fragment number field is set to 0. The starting sequence control subfield includes the sequence number of the first MSDU or A-MSDU for transmitting a corresponding BA frame.

The block ACK bitmap subfield has a length of 8 octets. In the block ACK bitmap subfield, a value "1" indicates that a single MSDU or A-MSDU corresponding to a corresponding bit location has been successfully received. A value "0" indicates that a single MSDU or A-MSDU corresponding to a corresponding bit location has not been successfully received.

UL Multiple User (MU) Transmission Method

A new frame format and numerology for an 802.11ax system, that is, the next-generation WLAN system, are actively discussed in the situation in which vendors of various fields have lots of interests in the next-generation Wi-Fi and a demand for high throughput and quality of experience (QoE) performance improvement are increased after 802.11ac.

IEEE 802.11ax is one of WLAN systems recently and newly proposed as the next-generation WLAN systems for supporting a higher data rate and processing a higher user load, and is also called a so-called high efficiency WLAN (HEW).

An IEEE 802.11ax WLAN system may operate in a 2.4 GHz frequency band and a 5 GHz frequency band like the existing WLAN systems. Furthermore, the IEEE 802.11ax WLAN system may also operate in a higher 60 GHz frequency band.

In the IEEE 802.11ax system, an FFT size four times larger than that of the existing IEEE 802.11 OFDM systems (e.g., IEEE 802.11a, 802.11n, and 802.11ac) may be used in each bandwidth for average throughput enhancement and outdoor robust transmission for inter-symbol interference. This is described below with reference to related drawings.

Hereinafter, in a description of an HE format PPDU according to an embodiment of the present invention, the descriptions of the aforementioned non-HT format PPDU, HT mixed format PPDU, HT-green field format PPDU and/or VHT format PPDU may be reflected into the description of the HE format PPDU although they are not described otherwise.

FIG. 21 is a diagram illustrating a high efficiency (HE) format PPDU according to an embodiment of the present invention.

FIG. 21(a) illustrates a schematic configuration of the HE format PPDU, and FIGS. 21(b) to 21(d) illustrate more detailed configurations of the HE format PPDU.

Referring to FIG. 21(a), the HE format PPDU for an HEW may basically include a legacy part (L-part), an HE-part, and an HE-data field.

The L-part includes an L-STF, an L-LTF, and an L-SIG field as in a form maintained in the existing WLAN system. The L-STF, the L-LTF, and the L-SIG field may be called a legacy preamble.

The HE-part is a part newly defined for the 802.11ax standard and may include an HE-STF, an HE-SIG field, and an HE-LTF. In FIG. 21(a), the sequence of the HE-STF, the HE-SIG field, and the HE-LTF is illustrated, but the HE-STF, the HE-SIG field, and the HE-LTF may be configured in a different sequence. Furthermore, the HE-LTF may be omitted. Not only the HE-STF and the HE-LTF, but the HE-SIG field may be commonly called an HE-preamble ("preamble").

Furthermore, the L-part and the HE-part (or HE-preamble) may be commonly called a physical (PHY) preamble.

The HE-SIG may include information (e.g., OFDMA, UL MU MIMO, and improved MCS) for decoding the HE-data field.

The L-part and the HE-part may have different fast Fourier transform (FFT) sizes (i.e., different subcarrier spacing) and use different cyclic prefixes (CPs).

In an 802.11ax system, an FFT size four times (4×) larger than that of a legacy WLAN system may be used. That is, the L-part may have a 1× symbol structure, and the HE-part (more specifically, HE-preamble and HE-data) may have a 4× symbol structure. In this case, the FFT of a 1×, 2×, or 4× size means a relative size for a legacy WLAN system (e.g., IEEE 802.11a, 802.11n, and 802.11ac).

For example, if the sizes of FFTs used in the L-part are 64, 128, 256, and 512 in 20 MHz, 40 MHz, 80 MHz, and 160 MHz, respectively, the sizes of FFTs used in the HE-part may be 256, 512, 1024, and 2048 in 20 MHz, 40 MHz, 80 MHz, and 160 MHz, respectively.

If an FFT size is larger than that of a legacy WLAN system as described above, subcarrier frequency spacing is reduced. Accordingly, the number of subcarriers per unit frequency is increased, but the length of an OFDM symbol is increased.

That is, if a larger FFT size is used, it means that subcarrier spacing is narrowed. Likewise, it means that an inverse discrete Fourier transform (IDFT)/discrete Fourier transform (DFT) period is increased. In this case, the IDFT/DFT period may mean a symbol length other than a guard interval (GI) in an OFDM symbol.

Accordingly, if an FFT size four times larger than that of the L-part is used in the HE-part (more specifically, the HE-preamble and the HE-data field), the subcarrier spacing of the HE-part becomes ¼ times the subcarrier spacing of the L-part, and the IDFT/DFT period of the HE-part is four times the IDFT/DFT period of the L-part. For example, if the subcarrier spacing of the L-part is 312.5 kHz (=20 MHz/64, 40 MHz/128, 80 MHz/256 and/or 160 MHz/512), the subcarrier spacing of the HE-part may be 78.125 kHz (=20 MHz/256, 40 MHz/512, 80 MHz/1024 and/or 160 MHz/2048). Furthermore, if the IDFT/DFT period of the L-part is 3.2 μs (=1/312.5 kHz), the IDFT/DFT period of the HE-part may be 12.8 μs (=1/78.125 kHz).

In this case, since one of 0.8 μs, 1.6 μs, and 3.2 μs may be used as a GI, the OFDM symbol length (or symbol interval) of the HE-part including the GI may be 13.6 μs, 14.4 μs, or 16 μs depending on the GI.

Referring to FIG. 21 (b), the HE-SIG field may be divided into an HE-SIG-A field and an HE-SIG-B field.

For example, the HE-part of the HE format PPDU may include an HE-SIG-A field having a length of 12.8 μs, an HE-STF of 1 OFDM symbol, one or more HE-LTFs, and an HE-SIG-B field of 1 OFDM symbol.

Furthermore, in the HE-part, an FFT size four times larger than that of the existing PPDU may be applied from the HE-STF other than the HE-SIG-A field. That is, FFTs having 256, 512, 1024, and 2048 sizes may be applied from the HE-STFs of the HE format PPDUs of 20 MHz, 40 MHz, 80 MHz, and 160 MHz, respectively.

In this case, if the HE-SIG field is divided into the HE-SIG-A field and the HE-SIG-B field as in FIG. 21(b), the positions of the HE-SIG-A field and the HE-SIG-B field may be different from those of FIG. 21(a). For example, the HE-SIG-B field may be transmitted after the HE-SIG-A field, and the HE-STF and the HE-LTF may be transmitted after the HE-SIG-B field. In this case, an FFT size four times larger than that of the existing PPDU may be applied from the HE-STF.

Referring to FIG. 21(c), the HE-SIG field may not be divided into an HE-SIG-A field and an HE-SIG-B field.

For example, the HE-part of the HE format PPDU may include an HE-STF of 1 OFDM symbol, an HE-SIG field of 1 OFDM symbol, and one or more HE-LTFs.

In the manner similar to that described above, an FFT size four times larger than that of the existing PPDU may be applied to the HE-part. That is, FFT sizes of 256, 512, 1024, and 2048 may be applied from the HE-STF of the HE format PPDU of 20 MHz, 40 MHz, 80 MHz, and 160 MHz, respectively.

Referring to FIG. 21(d), the HE-SIG field is not divided into an HE-SIG-A field and an HE-SIG-B field, and the HE-LTF may be omitted.

For example, the HE-part of the HE format PPDU may include an HE-STF of 1 OFDM symbol and an HE-SIG field of 1 OFDM symbol.

In the manner similar to that described above, an FFT size four times larger than that of the existing PPDU may be applied to the HE-part. That is, FFT sizes of 256, 512, 1024, and 2048 may be applied from the HE-STF of the HE format PPDU of 20 MHz, 40 MHz, 80 MHz, and 160 MHz, respectively.

The HE format PPDU for a WLAN system according to an embodiment of the present invention may be transmitted through at least one 20 MHz channel. For example, the HE format PPDU may be transmitted in a 40 MHz, 80 MHz or 160 MHz frequency band through a total of four 20 MHz channels. This is described in more detail.

FIG. 22 is a diagram illustrating HE format PPDUs according to embodiment of the present invention.

FIG. 22 illustrates a PPDU format if 80 MHz has been allocated to a single STA (or if an OFDMA resource unit has been allocated to a plurality of STAs within 80 MHz) or if different streams of 80 MHz have been allocated to a plurality of STAs, respectively.

Referring to FIG. 22, an L-STF, an L-LTF, and an L-SIG field may be transmitted in an OFDM symbol generated based on 64 FFT points (or 64 subcarriers) in each 20 MHz channel.

Furthermore, an HE-SIG B field may be located after an HE-SIG A field. In this case, an FFT size per unit frequency may be further increased after the HE-STF (or HE-SIG B field). For example, from the HE-STF (or HE-SIG B field), 256 FFT may be used in a 20 MHz channel, 512 FFT may be used in a 40 MHz channel, and 1024 FFT may be used in a 80 MHz channel.

The HE-SIG A field may include common control information (common field), transmitted to STAs which receive a PPDU, in common. The HE-SIG A field may be transmitted in 1 to 3 OFDM symbols. The HE-SIG A field is duplicated in a 20 MHz unit and includes the same information. Furthermore, the HE-SIG A field provides notification of information about the entire bandwidth of a system.

Table 12 illustrates information included in the HE-SIG A field.

TABLE 12

| field | bit | description |
|---|---|---|
| Bandwidth | 2 | Indicate a bandwidth in which a PPDU is transmitted. For example, 20 MHz, 40 MHz, 80 MHz or 160 MHz |
| Group_ID | 6 | Indicate an STA or a group of STAs which will receive a PPDU |
| Stream information | 12 | Indicate the location or number of a spatial stream for each STA or indicate the location or number of a spatial stream for a group of STAs |
| UL indication | 1 | Indicate whether a PPDU is directed toward an AP (uplink) or is directed toward an STA (downlink) |
| MU indication | 1 | Indicate whether a PPDU is an SU-MIMO PPDU or an MU-MIMO PPDU |
| GI indication | 1 | Indicate whether a short GI is used or a long GI is used |
| Allocation information | 12 | Indicate a band or channel (a subchannel index or a subband index) allocated to each STA in a band in which a PPDU is transmitted |
| Transmission power | 12 | Indicate transmission power for each channel or each STA |

The information included in each of the fields illustrated in Table 12 may comply with the definition of an IEEE 802.11 system. Furthermore, the above-described fields correspond to an example of fields which may be included in a PPDU, but are not limited thereto. That is, the fields may be replaced with other fields and may further include an additional field. All of the fields may not be essentially included. Another embodiment of information included in the HE-SIG A field is described later with reference to FIG. 23.

The HE-STF is used to improve performance of AGC estimation in MIMO transmission.

The HE-SIG B field may include user-specific information that is necessary for each STA to its own data (e.g., a PSDU). The HE-SIG B field may be transmitted in one or two OFDM symbols. For example, the HE-SIG B field may include information about the modulation and coding scheme (MCS) of a corresponding PSDU and the length of the corresponding PSDU.

The L-STF, the L-LTF, the L-SIG field, and the HE-SIG A field may be repeated and transmitted in a 20 MHz channel. For example, when a PPDU is transmitted through four 20 MHz channels (i.e., an 80 MHz band), the L-STF, the L-LTF, the L-SIG field, and the HE-SIG A field may be repeated and transmitted every 20 MHz channel.

If an FFT size increases, a legacy STA supporting the existing IEEE 802.11a/g/n/ac may not decode a corresponding HE PPDU. For the coexistence of a legacy STA and an HE STA, the L-STF, the L-LTF, and the L-SIG field are transmitted through a 64 FFT in a 20 MHz channel so that the legacy STA can receive them. For example, the L-SIG field may occupy a single OFDM symbol, a single OFDM symbol time may be 4 μs, and a GI may be 0.8 μs.

An FFT size for each frequency unit may be further increased from the HE-STF (or the HE-SIG A field). For example, 256 FFT may be used in a 20 MHz channel, 512 FFT may be used in a 40 MHz channel, and 1024 FFT may be used in a 80 MHz channel. If an FFT size increases, the number of OFDM subcarriers per a unit frequency is increased because an interval between the OFDM subcarriers is reduced, but the OFDM symbol time is increased. In order to improve efficiency of a system, the length of a GI after the HE-STF may be set to be the same as that of the GI of the HE-SIG A field.

The HE-SIG A field may include information that is necessary for an HE STA to decode an HE PPDU. However, the HE-SIG A field may be transmitted through 64 FFT in a 20 MHz channel so that both a legacy STA and an HE STA can receive the HE-SIG A field. The reason for this is that the HE STA can receive the existing HT/VHT format PPDU in addition to an HE format PPDU and the legacy STA and the HE STA have to distinguish the HT/VHT format PPDUs and the HE format PPDU from each other.

FIG. 23 is a diagram illustrating an HE format PPDU according to an embodiment of the present invention.

In FIG. 23, it is assumed that 20 MHz channels are respectively allocated to different STAs (e.g., an STA 1, an STA 2, an STA 3, and an STA 4).

Referring to FIG. 23, an FFT size per unit frequency may be further increased from an HE-STF (or an HE-SIG B field). For example, from the HE-STF (or the HE-SIG B field), 256 FFT may be used in a 20 MHz channel, 512 FFT may be used in a 40 MHz channel, and 1024 FFT may be used in a 80 MHz channel.

Information transmitted in each field included in a PPDU is the same as that of the example of FIG. 26, and thus a description thereof is omitted.

The HE-SIG B field may include information specific to each STA, but may be encoded in the full band (i.e., indicated in an HE-SIG A field). That is, the HE-SIG B field includes information about all of STAs, and all of the STAs receive the HE-SIG B field.

The HE-SIG B field may provide notification of information about a frequency bandwidth allocated to each STA and/or information about a stream in a corresponding frequency band. For example, in FIG. 27, in the HE-SIG B field, 20 MHz may be allocated to the STA 1, next 20 MHz may be allocated to the STA 2, next 20 MHz may be allocated to the STA 3, and next 20 MHz may be allocated to the STA 4. Furthermore, 40 MHz may be allocated to the STA 1 and the STA 2, and next 40 MHz may be allocated to the STA 3 and the STA 4. In this case, different streams may be allocated to the STA 1 and the STA 2, and different streams may be allocated to the STA 3 and the STA 4.

Furthermore, an HE-SIG-C field may be defined and added to the example of FIG. 27. In this case, in the HE-SIG B field, information about all of STAs may be transmitted over the full band, and control information specific to each STA may be transmitted through the HE-SIG-C field in a 20 MHz unit.

Furthermore, unlike in the examples of FIGS. 22 and 23, the HE-SIG B field is not transmitted over the full band, but may be transmitted in a 20 MHz unit like the HE-SIG A field. This is described with reference to FIG. 24.

FIG. 24 is a diagram illustrating an HE format PPDU according to an embodiment of the present invention.

In FIG. 24, it is assumed that 20 MHz channels are respectively allocated to different STAs (e.g., an STA 1, an STA 2, an STA 3, and an STA 4).

Referring to FIG. 24, an HE-SIG B field is not transmitted over a full band, but is transmitted in a 20 MHz unit like an HE-SIG A field. In this case, however, the HE-SIG B field is encoded and transmitted in a 20 MHz unit unlike in the HE-SIG A field, but may not be duplicated in a 20 MHz unit and transmitted.

In this case, an FFT size per unit frequency may be further increased from an HE-STF (or the HE-SIG B field). For example, from the HE-STF (or the HE-SIG B field), 256 FFT may be used in a 20 MHz channel, 512 FFT may be used in a 40 MHz channel, and 1024 FFT may be used in a 80 MHz channel.

Information transmitted in each field included in a PPDU is the same as that of the example of FIG. 26, and thus a description thereof is omitted.

The HE-SIG A field is duplicated in a 20 MHz unit and transmitted.

The HE-SIG B field may provide notification of information about a frequency bandwidth allocated to each STA and/or information about a stream in a corresponding frequency band. The HE-SIG B field may include information about each STA for each HE-SIG B field of a 20 MHz unit because it includes information about each STA. In this case, the example of FIG. 23 illustrates a case where 20 MHz is allocated to each STA. For example, if 40 MHz is allocated to an STA, the HE-SIG B field may be duplicated in a 20 MHz unit and transmitted.

In a situation in which a different bandwidth is supported for each BSS, if some bandwidths having a small interference level from a neighbor BSS is allocated to an STA, the HE-SIG B field may not be transmitted over a full band as described above.

For example, the HE format PPDU of FIG. 23 is described as a basis, for convenience of description.

In FIGS. 22 to 24, a data field is payload and may include a service field, a scrambled PSDU, tail bits, and padding bits.

An HE format PPDU, such as that of FIGS. 22 to 24, may be determined through a repeated L-SIG (RL-SIG) field, that is, the repeated symbol of an L-SIG field. The RL-SIG field is inserted in front of the HE SIG-A field, and each STA may determine the format of a received PPDU to be an HE format PPDU using the RL-SIG field.

A multi-user UL transmission method in a WLAN system is described below.

A method of transmitting, by an AP operating in a WLAN system, data to a plurality of STAs on the same time resource may be called downlink multi-user (DL MU) transmission. In contrast, a method of transmitting, by a plurality of STAs operating in a WLAN system, data to an AP on the same time resource may be called uplink multi-user (UL MU) transmission.

Such DL MU transmission or UL MU transmission may be multiplexed on a frequency domain or a space domain.

If DL MU transmission or UL MU transmission is multiplexed on the frequency domain, different frequency resources (e.g., subcarriers or tones) may be allocated to each of a plurality of STAs as DL or UL resources based on orthogonal frequency division multiplexing (OFDMA). A transmission method through different frequency resources in such the same time resources may be called "DL/UL MU OFDMA transmission."

If DL MU transmission or UL MU transmission is multiplexed on the space domain, different spatial streams may be allocated to each of a plurality of STAs as DL or UL resources. A transmission method through different spatial streams on such the same time resources may be called "DL/UL MU MIMO transmission."

Current WLAN systems do not support UL MU transmission due to the following constraints.

Current WLAN systems do not support synchronization for the transmission timing of UL data transmitted by a plurality of STAs. For example, assuming that a plurality of STAs transmits UL data through the same time resources in the existing WLAN system, in the present WLAN systems, each of a plurality of STAs is unaware of the transmission timing of UL data of another STA. Accordingly, an AP may not receive UL data from each of a plurality of STAs on the same time resource.

Furthermore, in the present WLAN systems, overlap may occur between frequency resources used by a plurality of STAs in order to transmit UL data. For example, if a plurality of STAs has different oscillators, frequency offsets may be different. If a plurality of STAs having different frequency offsets performs UL transmission at the same time through different frequency resources, frequency regions used by a plurality of STAs may partially overlap.

Furthermore, in existing WLAN systems, power control is not performed on each of a plurality of STAs. An AP dependent on the distance between each of a plurality of STAs and the AP and a channel environment may receive signals of different power from a plurality of STAs. In this case, a signal having weak power may not be relatively detected by the AP compared to a signal having strong power.

Accordingly, an embodiment of the present invention proposes an UL MU transmission method in a WLAN system.

FIG. 25 is a diagram illustrating an UL multi-user (UL MU) transmission procedure according to an embodiment of the present invention.

Referring to FIG. 25, an AP commands STAs participating in UL MU transmission to prepare UL MU transmission, receives UL MU data frames from the corresponding STAs, and transmits an ACK frame (or a block ACK (BA) frame) as a response to the UL MU data frames.

First, the AP instructs STAS which will send UL MU data to prepare UL MU transmission by sending an UL MU trigger frame 2510. In this case, the UL MU trigger frame may also be called an "UL MU scheduling frame."

In this case, the UL MU trigger frame 2510 may include information about an STA identifier (ID)/address, information about the allocation of resources to be used by each STA, and control information (or trigger information), such as duration information.

The STA ID/address information means information about an identifier or address for specifying each STA which transmits UL data.

The resource allocation information means information about UL transmission resource (e.g., information about a frequency/subcarrier allocated to each STA in the case of UL MU OFDMA transmission and the index of a stream allocated to each STA in the case of UL MU MIMO transmission) allocated to each STA.

The duration information means information for determining time resources for transmitting an UL data frame transmitted by each of a plurality of STAs.

For example, the duration information may include information about the interval of a transmit opportunity (TXOP) allocated for the UL transmission of each STA or information (e.g., a bit or symbol) about the length of an UL frame.

Furthermore, the UL MU trigger frame 2510 may further include control information (or trigger information), such as MCS information and coding information to be used when an UL MU data frame is transmitted to each STA.

Such control information (or trigger information) may be transmitted in the HE-part (e.g., the HE-SIG A field or the HE-SIG B field) of a PPDU in which the UL MU trigger frame 2510 is transmitted or in the control field (e.g., the frame control field of an MAC frame) of the UL MU trigger frame 2510.

The UL MU trigger frame 2510 is delivered has a structure that starts from an L-part (e.g., an L-STF, an L-LTF, and an L-SIG field). Accordingly, legacy STAs may perform network allocation vector (NAV) setting through L-SIG protection from the L-SIG field. For example, the legacy STAs may calculate an interval for the NAV setting (hereinafter referred to as an "L-SIG guard interval") based on a data length and data rate information in the L-SIG field. Furthermore, the legacy STAs may determine that there is no data to be transmitted thereto during the calculated L-SIG guard interval.

For example, the L-SIG guard period may be determined to be the sum of the value of the MAC duration field of the UL MU trigger frame 2510 and the remaining interval after the L-SIG field of a PPDU in which the UL MU trigger frame 2510 is carried. Accordingly, the L-SIG guard period may be set as a value up to the interval in which an ACK frame 2530 (or an BA frame) transmitted to each STA is transmitted based on the value of MAC duration of the UL MU trigger frame 2510.

Hereinafter, a method for allocating resources for UL MU transmission to each STA is described in more detail. Fields including control information are divided and described, for convenience of description, but the present invention is not limited thereto.

A first field may divide transmission into UL MU OFDMA transmission and UL MU MIMO transmission and indicate them. For example, if the first field is "0", it may indicate UL MU OFDMA transmission. If the first field is "1", it may indicate UL MU MIMO transmission. The size of the first field may include 1 bit.

A second field (e.g., an STA ID/address field) provides notification of the IDs or addresses of STAs which will participate in UL MU transmission. The size of the second field may be composed of the number of bits for providing notification of the ID of an STA×the number of STAs which will participate in UL MU. For example, if the second field is composed of 12 bits, it may indicate the ID/address of each STA every 4 bits.

A third field (e.g., a resource allocation field) indicates a resource region allocated to each STA for UL MU transmission. In this case, the resource regions allocated to respective STAs may be sequentially indicated in the sequence of the second field.

If the value of the first field is "0", it indicates frequency information (e.g., a frequency index and a subcarrier index) for UL MU transmission in the sequence of the IDs/addresses of STAs included in the second field. If the value of the first field is "1", it indicates MIMO information (e.g., a stream index, etc.) for UL MU transmission in the sequence of the IDs/addresses of STAs included in the second field.

In this case, since a single STA may be notified of several indices (i.e., a frequency/subcarrier index or stream index), the size of the third field may have a plurality of bits (or may have a bitmap format)×the number of STAs which will participate in UL MU transmission.

For example, it is assumed that the second field is configured in the sequence of an "STA 1" and an "STA 2" and the third field is configured in the sequence of "2" and "2."

In this case, if the first field is "0", frequency resources may be allocated to the STA 1 from a higher (or lower) frequency domain, and next frequency resources may be sequentially allocated to the STA 2. For example, if OFDMA of a 20 MHz unit is supported in an 80 MHz band, the STA 1 may use a higher (or lower) 40 MHz band, and the STA 2 may use a next 40 MHz band.

In contrast, if the first field is "1", a higher (or lower) stream may be allocated to the STA 1, and next streams may be sequentially allocated to the STA 2. In this case, a beamforming method according to each stream may have been previously designated, or the third field or the fourth field may include more detailed information about a beamforming method according to streams.

The STAs transmit respective UL MU data frames 2521, 2522, and 2523 to the AP based on the UL MU trigger frame 2510 transmitted by the AP. In this case, the STAs may receive the UL MU trigger frame 2510 from the AP and then transmit the UL MU data frames 2521, 2522, and 2523 to the AP after an SIFS.

Each of the STAs may determine a specific frequency resource for UL MU OFDMA transmission or a spatial stream for UL MU MIMO transmission based on the resource allocation information of the UL MU trigger frame 2510.

More specifically, in the case of UL MU OFDMA transmission, each STA may transmit the UL MU data frame on the same time resource through a different frequency resource.

In this case, different frequency resources for the UL data frame transmission may be allocated to the STA 1 to the STA 3 based on the STA ID/address information and resource allocation information included in the UL MU trigger frame 2510. For example, the STA ID/address information may sequentially indicate the STA 1 to the STA 3, and the resource allocation information may sequentially indicate a frequency resource 1, a frequency resource 2, and a frequency resource 3. In this case, the frequency resource 1, the frequency resource 2, and the frequency resource 3 sequentially indicated based on the resource allocation information may be allocated to the STA 1 to the STA 3 sequentially indicated based on the STA ID/address information. That is, the STA 1, the STA 2, and the STA 3 may transmit the respective UL data frames 2521, 2522, and 2523 to the AP through the frequency resource 1, the frequency resource 2, and the frequency resource 3, respectively.

Furthermore, in the case of UL MU MIMO transmission, each STA may transmit the UL data frame on the same time resource through at least one different of a plurality of spatial streams.

In this case, a spatial stream for the UL data frame transmission may be allocated to each of the STA 1 to the STA 3 based on the STA ID/address information and resource allocation information included in the UL MU trigger frame 2510. For example, the STA ID/address information may sequentially indicate the STA 1 to the STA 3, and the resource allocation information may sequentially indicate a spatial stream 1, a spatial stream 2, and a spatial stream 3. In this case, the spatial stream 1, the spatial stream 2, and the spatial stream 3 sequentially indicated based on the resource allocation information may be respectively allocated to the STA 1 to the STA 3 sequentially indicated based on the STA ID/address information. That is, the STA 1, the STA 2, and the STA 3 may transmit the respective UL data frames 2521, 2522, and 2523 to the AP through the spatial stream 1, the spatial stream 2, and the spatial stream 3, respectively.

The PPDU in which the UL data frames 2521, 2522, and 2523 are delivered may be configured to have a new structure even without an L-part.

Furthermore, in the case of UL MU MIMO transmission or UL MU OFDMA transmission having a subband form of less than 20 MHz, the L-part of the PPDU in which the UL data frames 2521, 2522, and 2523 are delivered may be transmitted in an SFN form (i.e., all of STAs transmit the same L-part configuration and contents at the same time). In contrast, in the case of UL MU OFDMA transmission having a subband form of 20 MHz or more, the L-part of the PPDU in which the UL data frames 2521, 2522, and 2523 are delivered may be transmitted in a 20 MHz unit in a band allocated to each STA.

If the UL data frame can be sufficiently configured based on the information of the UL MU trigger frame 2510, there may be no need for an HE-SIG field (i.e., an area in which control information for a method for configuring a data frame is transmitted) within the PPDU in which the UL data frames 2521, 2522, and 2523 are delivered. For example, the HE-SIG-A field and/or the HE-SIG-B may not be transmitted. Furthermore, the HE-SIG-A field and the HE-SIG-C field may be transmitted, but the HE-SIG-B field may not be transmitted.

The AP may transmit the ACK frame 2530 (or the BA frame) as a response to the UL data frames 2521, 2522, and 2523 received from the respective STAs. In this case, the AP may receive the UL data frames 2521, 2522, and 2523 from the respective STAs and then transmit the ACK frame 2530 to each of the STAs after an SIFS.

If the structure of the existing ACK frame is identically used, the existing ACK frame may be configured to include the AIDs (or part AIDs) of STAs participating in UL MU transmission in an RA field having a size of 6 octets.

Alternatively, if an ACK frame of a new structure is configured, the ACK frame may be configured in a form for DL SU transmission or DL MU transmission.

The AP may transmit only the ACK frame 2530 for an UL MU data frame that has been successfully received to a corresponding STA. Furthermore, the AP may provide notification of whether an UL MU data frame has been successfully received through the ACK frame 2530 using ACK or NACK. If the ACK frame 2530 includes NACK information, the ACK frame may include a reason of NACK or information for a subsequent procedure (e.g., UL MU scheduling information).

Alternatively, the PPDU in which the ACK frame 2530 is delivered may be configured to have a new structure without the L-part.

The ACK frame 2530 may include STA ID or address information, but STA ID or address information may be omitted if the sequence of STAs indicated in the UL MU trigger frame 2510 is identically applied.

Furthermore, the TXOP (i.e., the L-SIG guard interval) of the ACK frame 2530 may be extended so that a frame for next UL MU scheduling or a control frame including adjustment information for next UL MU transmission can be included in the TXOP.

For the UL MU transmission, an adjustment process for synchronizing the STAs may be added.

FIGS. 26 to 28 are diagrams illustrating resource allocation units in an OFDMA multi-user transmission method according to an embodiment of the present invention.

When a DL/UL OFDMA transmission method is used, a plurality of resource units may be defined in an n-tone (or subcarrier) unit within a PPDU bandwidth.

The resource unit refers to the allocation unit of a frequency resource for DL/UL OFDMA transmission.

One or more resource units may be allocated to a single STA as DL/UL frequency resources, and different resource units may be allocated to a plurality of STA, respectively.

FIG. 26 illustrates a case where a PPDU bandwidth is 20 MHz.

7 DC tones may be located in the center frequency domain of the 20 MHz PPDU bandwidth. Furthermore, 6 left guard tones and 5 right guard tones may be located on both sides of the 20 MHz PPDU bandwidth, respectively.

In accordance with a resource unit configuration method, such as that of FIG. 26(a), a single resource unit may be composed of 26 tones. Furthermore, in accordance with a resource unit configuration method, such as that of FIG. 26(b), a single resource unit may be composed of 52 tones or 26 tones. Furthermore, in accordance with a resource unit configuration method, such as that of FIG. 26(c), a single resource unit may be composed of 106 tones or 26 tones. Furthermore, in accordance with a resource unit configuration method, such as that of FIG. 26(d), a single resource unit may be composed of 242 tones.

The resource unit composed of 26 tones may include 2 pilot tones. The resource unit composed of 52 tones may include 4 pilot tones. The resource unit composed of 106 tones may include 4 pilot tones.

If a resource unit is composed as in FIG. 26(a), a 20 MH band may support a maximum of 9 STAs for DL/UL OFDMA transmission. Furthermore, if a resource unit is composed as in FIG. 26(b), a 20 MH band may support a maximum of 5 STAs for DL/UL OFDMA transmission. Furthermore, if a resource unit is composed as in FIG. 26(c), a 20 MH band may support a maximum of 3 STAs for DL/UL OFDMA transmission. Furthermore, if a resource unit is composed as in FIG. 26(d), a 20 MHz band may be allocated to a single STA.

Any one of the resource unit configuration methods of FIGS. 26(a) to 26(d) may be applied or a resource unit configuration method of a combination of FIGS. 26(a) to 26(d) may be alternatively applied based on the number of STAs participating in DL/UL OFDMA transmission and/or the amount of data transmitted or received by a corresponding STA.

FIG. 27 illustrates a case where a PPDU bandwidth is 40 MHz.

5 DC tones may be located in the center frequency domain of the 40 MHz PPDU bandwidth. Furthermore, 12 left guard tones and 11 right guard tones may be located on both sides of the 40 MHz PPDU bandwidth, respectively.

In accordance with a resource unit configuration method, such as that of FIG. 27(a), a single resource unit may be composed of 26 tones. Furthermore, in accordance with a resource unit configuration method, such as that of FIG. 27(b), a single resource unit may be composed of 52 tones or 26 tones. Furthermore, in accordance with a resource unit configuration method, such as that of FIG. 27(c), a single resource unit may be composed of 106 tones or 26 tones. Furthermore, in accordance with a resource unit configuration method, such as that of FIG. 27(d), a single resource unit may be composed of 242 tones. Furthermore, in accordance with a resource unit configuration method, such as that of FIG. 27(e), a single resource unit may be composed of 484 tones.

The resource unit composed of 26 tones may include 2 pilot tones. The resource unit composed of 52 tones may include 4 pilot tones. The resource unit composed of 106 tones may include 4 pilot tones. The resource unit composed of 242 tones may include 8 pilot tones. The resource unit composed of 484 tones may include 16 pilot tones.

If a resource unit is configured as in FIG. 27(a), a 40 MHz band may support a maximum of 18 STAs for DL/UL OFDMA transmission. Furthermore, if a resource unit is configured as in FIG. 27(b), a 40 MHz band may support a maximum of 10 STAs for DL/UL OFDMA transmission. Furthermore, if a resource unit is configured as in FIG. 27(c), a 40 MHz band may support a maximum of 6 STAs for DL/UL OFDMA transmission. Furthermore, if a resource unit is configured as in FIG. 27(d), a 40 MHz band may support a maximum of 2 STAs for DL/UL OFDMA transmission. Furthermore, if a resource unit is configured as in FIG. 27(e), a corresponding resource unit may be allocated to a single STA for SU DL/UL transmission in a 40 MHz band.

Any one of the resource unit configuration methods of FIGS. 27(a) to 27(e) may be applied or a resource unit configuration method of a combination of FIGS. 27(a) to 27(e) may be alternatively applied based on the number of STAs participating in DL/UL OFDMA transmission and/or the amount of data transmitted or received by a corresponding STA.

FIG. 28 illustrates a case where a PPDU bandwidth is 80 MHz.

7 DC tones may be located in the center frequency domain of the 80 MHz PPDU bandwidth. In this case, if the 80 MHz PPDU bandwidth is allocated to a single STA (i.e., if a resource unit composed of 996 tones is allocated to a single STA), 5 DC tones may be located in the center frequency domain. Furthermore, 12 left guard tones and 11 right guard tones may be located on both sides of the 80 MHz PPDU bandwidth, respectively.

In accordance with a resource unit configuration method, such as that of FIG. 28(a), a single resource unit may be composed of 26 tones. Furthermore, in accordance with a resource unit configuration method, such as that of FIG. 28(b), a single resource unit may be composed of 52 tones or 26 tones. Furthermore, in accordance with a resource unit configuration method, such as that of FIG. 28(c), a single resource unit may be composed of 106 tones or 26 tones. Furthermore, in accordance with a resource unit configuration method, such as that of FIG. 28(d), a single resource unit may be composed of 242 tones or 26 tones. In accordance with a resource unit configuration method, such as that of FIG. 28(e), a single resource unit may be composed of 484 tones or 26 tones. In accordance with a resource unit configuration method, such as that of FIG. 28(f), a single resource unit may be composed of 996 tones.

The resource unit composed of 26 tones may include 2 pilot tones. The resource unit composed of 52 tones may include 4 pilot tones. The resource unit composed of 106 tones may include 4 pilot tones. The resource unit composed of 242 tones may include 8 pilot tones. The resource unit composed of 484 tones may include 16 pilot tones. The resource unit composed of 996 tones may include 16 pilot tones.

If a resource unit is configured as in FIG. 28(a), an 80 MHz band may support a maximum of 37 STAs for DL/UL OFDMA transmission. Furthermore, if a resource unit is configured as in FIG. 28(b), an 80 MHz band may support a maximum of 21 STAs for DL/UL OFDMA transmission. Furthermore, if a resource unit is configured as in FIG. 28(c), an 80 MHz band may support a maximum of 13 STAs for DL/UL OFDMA transmission. Furthermore, if a resource unit is configured as in FIG. 28(d), an 80 MHz band may support a maximum of 5 STAs for DL/UL OFDMA transmission. Furthermore, if a resource unit is configured as in FIG. 28(e), an 80 MHz band may support a maximum of 3 STAs for DL/UL OFDMA transmission. Furthermore, if a resource unit is configured as in FIG. 28(f), a corresponding resource unit may be allocated to a single STA for SU DL/UL transmission in an 80 MHz band.

Any one of the resource unit configuration methods of FIGS. 28(a) to 28(f) may be applied or a resource unit configuration method of a combination of FIGS. 28(a) to 28(f) may be alternatively applied based on the number of STAs participating in DL/UL OFDMA transmission and/or the amount of data transmitted or received by a corresponding STA.

Although not shown, a method for configuring a resource unit if a PPDU bandwidth is 160 MHz may also be proposed. In this case, a 160 MHz PPDU bandwidth may have a structure in which the 80 MHz PPDU bandwidth described with reference to FIG. 32 has been repeated twice.

Only some resource units that belong to all of the resource units determined according to the above-described resource unit configuration methods and that are used for DL/UL OFDMA transmission may be used. For example, if a resource unit is configured as in FIG. 26(a) in 20 MHz, one resource unit may be allocated to each of less than 9 STAs, and the remaining resource units may not be allocated to any STA.

In the case of DL OFDMA transmission, the data field of a PPDU may be multiplexed and transmitted in a frequency domain in a unit of a resource unit allocated to each STA.

In contrast, in the case of UL OFDMA transmission, STAs may configure the respective data fields of PPDUs in a unit of a resource unit allocated thereto and may simultaneously the PPDUs to an AP. As described above, since STAs send PPDUs simultaneously, an AP, that is, a receiving stage, may recognize that the data fields of the PPDUs transmitted by the respective STAs are multiplexed and transmitted in a frequency domain.

Furthermore, if DL/UL OFDMA transmission and DL/UL MU-MIMO transmission are simultaneously supported, a single resource unit may be composed of a plurality of streams in a spatial domain. Furthermore, one or more streams may be allocated to a single STA as DL/UL spatial resource, and different streams may be allocated to a plurality of STAs.

For example, a resource unit composed of 106 tones in FIG. 25(c) may be composed of a plurality of streams in a spatial domain and can support DL/UL OFDMA and DL/UL MU-MIMO at the same time.

Method of Configuring HE Control Field

In next-generation wireless communication systems, an HE control field may be newly defined through the following two methods.

1. A new HE control field for next-generation systems is defined by reusing the legacy (or conventional) HT/VHT control field.

2. A control frame of a new subtype (e.g., "control type") including the He control field is defined.

Here, types of control information included in the HE control field are as follows.

Feedback request/response, ACK request/response, BA request/response, BAR request/response, buffer status request/response, etc.

Such control information may be defined as HE control fields of different types (or included in HE control fields of different types) or may be defined as control information of different types and included in one HE control field. In the present description, different types may be identified by different IDs. That is, corresponding to different types can be interpreted as having different IDs.

To reduce overhead of an MAC header including an HE control field, a compressed MAC header format may be proposed and an example of the compressed MAC header format is shown in FIG. 29(b).

FIG. 29 illustrates MPDUs according to an embodiment of the present invention. More specifically, FIG. 29(a) illustrates an MPDU of protocol version "0" and FIG. 29(b) illustrates an MPDU of protocol version "1".

Referring to FIG. 29, the MPDU of protocol version "1", newly defined in next-generation systems may include a "compressed MAC header" included in the legacy MPDU of protocol version "1".

Such a compressed MAC header may be defined as a format in which the size of the address field in the legacy MAC header is reduced. More specifically, the compressed MAC header may be defined as a format in which A1 field corresponding to TA field or RA field includes a smaller BSS ID or STA ID instead of a MAC address. For example, in the case of a packet transmitted from an AP to an STA, address 1 field (A1 field) may include the ID (e.g., AID (12 bits)) of the STA instead of RA (6 octets) that is the MAC address of the STA. In this manner, a compressed MAC header format can be generated by using a smaller ID instead of a MAC address.

In this case, the size of A1 field can be reduced from 6 octets to 2 octets, and an example with respect to such size reduction is shown in FIG. 30.

FIG. 30 is a diagram illustrating a compressed A1 field according to an embodiment of the present invention.

Referring to FIG. 30, if A1 field includes the ID or BSS ID of an STA instead of a MAC address thereof, as described above, the size of A1 field can be reduced from 6 octets to 2 octets. Here, 4 remaining bits are generated when 12 bits indicating the STA ID are excluded from the A1 field.

As shown, 3 bits (B13 to B15) among the remaining bits (4 bits) may be used to indicate whether A3/A4 field is present (1 bit) and whether A-MSDU is present (1 bit). However, the present invention is not limited thereto and the 3 bits may be used to indicate various types of control information. An embodiment of using the last bit among the remaining bits (4 bits) will be described in detail below.

To indicate the aforementioned compressed MAC header format, the following three methods may be proposed.

1. Whether a compressed MAC header is used/included is indicated using a reserved bit (1 bit) included in a delimiter field.

2. Whether a compressed MAC header is used/included is indicated using a protocol version field. For example, the protocol version field indicates that the compressed MAC header is used/included when set to '1'.

3. A new type or subtype is defined and a frame of such type or subtype is defined as using/including a compressed MAC header.

Hereinafter, the aforementioned embodiment of using the last bit (B12) of the A1 field will be described in detail. B12 of the A1 field may be used in the two manners below.

1. Indicating Buffer Status Request

In an embodiment, the reserved bit (1 bit) (e.g., B12) of the address field may be used for buffer status request. That is, when an AP requests buffer status report transmission from an STA, the bit B12 can be set to "1" (or "0"). In this case, the STA can transmit a buffer status report to the AP irrespective of DL data included in a MAC payload of a received frame.

Here, buffer status information may be transmitted by being included as one control type/ID in an HE control field, being included in the QoS control field or being included in the MAC payload.

2. Indicating Inclusion of Multiple/Variable Control Fields

In an embodiment, the reserved bit (1 bit) (e.g., B12) of the address field may be used to indicate whether multiple control fields are present/included. Prior to description of the above embodiment, a method of indicating an HE control field will be described first.

FIG. 31 is a diagram illustrating a configuration of a VHT control field according to an embodiment of the present invention.

Whether an HE format (i.e., HT/VHT) control field of a (HT/VHT) control field corresponds to the HE control field may be indicated using a reserved bit included in the (HT/VHT) control field as shown in FIG. 31.

If whether the HE control field is included can be known when a control wrapper frame or an order subfield is set to "1", similarly to the legacy HT/VHT control field, both a VHT indication bit of the control field and a reserved bit following the VHT indication bit may be set to "1" to indicate that the corresponding control field is the HE control field, as shown in FIG. 31.

Alternatively, an "HE" control field may be configured/defined as being included as a control field all the time when the PPDU format is 1 lax.

In this case, if only one or limited specific control information is included per HE control field (e.g., in a case of a size fixed to 4 octets such as the HT control field), multiple HE control fields may be defined and at least one of the multiple HE control fields defined in this manner may be included in a MAC header. Here, the reserved bit (1 bit) (e.g., B12 mentioned above) of the address field can be used to indicate whether the corresponding MAC header includes multiple HE control fields. For example, when the bit B12 is set to "0", an STA can recognize that the corresponding MAC header includes only one HE control field. On the contrary, when the bit B12 is set to "1", the STA can recognize that the corresponding MAC header includes multiple HE control fields.

Furthermore, the reserved bit (1 bit) (e.g., B12) of the address field may be used to indicate whether multiple control fields including not only multiple HE control fields but also other control fields (e.g., QoS control field) are included. In this case, the STA needs to know the last control field, and thus the last bit of each control field can be set to an End of Control (EoC) field.

FIG. 32(a) is a diagram illustrating a format of multiple HE control fields according to an embodiment of the present invention.

Referring to FIG. 32(a), when multiple HE control fields are included in one MAC header, an EoC field may be inserted into the end of each HE control field. The EoC field can indicate whether the corresponding control field is the last field or whether an additional control field following the control field is present. This can be useful when only one control information type and/or one control information content are included in the HE control field. Alternatively, the conventional HT control field or QoS control field may be applied.

Or, it may be assumed that multiple HE control fields are included all the time and have a fixed length. Here, when a VHT subfield and a reserved bit in the HE control field are set to "11", it is possible to indicate whether multiple HE control fields are included by including the EoC field at the end of each HE control field all the time. In this case, the reserved bit (1 bit) (e.g., B12) of the address field may not be additionally used to indicate whether multiple HE control fields are included. This is an advantage because a compressed MAC header needs to be used all the time in order to use the address field.

As another method for including multiple HE control fields, an HE control field may be configured as 4 octets like the conventional HE control field and the same or different HE control fields/information may be included in MPDUs included in A-MPDU. Here, the fact that different fields/information (or the same field/information) are included in MPDUs may be indicated using the reserved bit (1 bit) (e.g., B12) of the address field.

As another embodiment, the reserved bit (1 bit) (e.g., B12) of the address field may be used to indicate whether a variable control field is present/included. Here, the variable control field may refer to an HE control field having an unfixed length (i.e., variable length) and/or an HE control field including one or more control information types and content as described in the above examples.

That is, the MAC header may include one HE control field, the length of the HE control field is not fixed but is variable, and presence of the HE control field having a variable length may be indicated using the reserved bit (1 bit) (e.g., B12) of the address field in the present embodiment.

For example, the reserved bit (1 bit) (e.g., B12) of the address field may indicate that an HE control field having a fixed length (e.g., 4 octets like a conventional HE control field) is included when set to "0" and indicate that an HE control field having a variable length is included when set to "1". Alternatively, the reserved bit (1 bit) (e.g., B12) of the address field may indicate that an HT/VHT control field having a length of 4 octets is included when set to "0" and indicate that an HE control field having a length of specific octets is included when set to "1".

Here, the HE control field may include one or more control information types and content with respect to each type as described above, and an HE control frame may be configured differently depending on whether the length of content per type is fixed or variable, as shown in embodiments of FIGS. 31(b) and 31(c).

FIGS. 32(b) and 32(c) are diagrams illustrating HE control frames according to an embodiment of the present invention.

Referring to FIG. 32(b), if the length of content per control type/ID is fixed to a specific length, content for multiple control types/IDs may be identified by including the EoC field (1 bit) after content per type/ID. However, when the reserved bit (e.g., B12) of the address field (e.g., A1) is "0" (i.e., when the length of the He control field is fixed), as in the above-described embodiment, the EoC field may not be additionally required.

Referring to FIG. 32(c), when the length of content per control type/ID is variable, a length field indicating the length of content per type/ID may be included in order to identify content per control type/ID. Here, the VHT subfield and the reserved bit of the HT/VHT control field may be set to "11" to indicate that the corresponding HT/VHT control field is the HE control field, which will be described in detail below. However, the aforementioned bit setting may not be necessary if the HE control field is indicated by changing the protocol version or defining a new subtype as described above.

In the embodiments of FIGS. 32(a) to 32(c), the position of each bit is not limited to those shown in the figures and may be changed. For example, the EoC field may be positioned after the control type for byte alignment.

Although the embodiments in which buffer status request and multiple/variable control fields are indicated using B12 of the address field included in the compressed MAC header have been described above, the present invention is not limited thereto and the above-described functions/embodiments may be executed using a specific bit/field included in a (compressed or non-compressed) MAC header instead of B12.

Methods of configuring a control content field including control content (or control information) included in the HE control field and a control ID field indicating a control content (or information) type will be proposed hereinafter. Embodiments which will be described below may be applied to HE control fields included in a non-compressed MAC header as well as the aforementioned compressed MAC header. In addition, although the following description is based on an HE control field having a size fixed to 4 octets for convenience of description, the present invention is not limited thereto and embodiments below may be equally applied to an HE control field having a variable length.

1. Configuration of Control ID Field

FIG. 33 is a diagram illustrating a configuration of a control ID field according to an embodiment of the present invention.

Referring to FIG. 33(a), the control ID field may include a VHT subfield and a reserved bit (or HE variant field) for indicating an HE control field, as described above, and the subfield and the bit are set to "11" in an embodiment. In addition, the control ID field may include an EoC field (1 bit) indicating that the corresponding control ID is the last control ID among control IDs included in the MAC header (indicating that the corresponding control ID corresponds to last control information among control information included in the MAC header). When control ID information is indicated by 5 bits, the control ID field is configured in a size of 1 byte.

Referring to FIG. 33(b), as another embodiment, the first control ID field of an HE control field may include a VHT subfield and a reserved bit (or HE variant field) for indicating the HE control field and the subfield and the bit are set to "11". Additionally, the first control ID field may include control ID information (5 to 6 bits) and a reserved bit or an EoC field (0 to 1 bit).

If a specific bit (e.g., B12 of the A1 field) included in the MAC header indicates inclusion of multiple control IDs, the second and following control ID fields included in the HE control field may include an EoC field (1 bit) and a reserved bit (1 to 2 bits) and the HE control field may be configured in a size of 1 byte.

Types of control IDs (i.e., control (content/information) types) indicated in the control ID field may include ACK/BA request/response, buffer status request/response, channel state information (CSI) feedback request/response, UL resource trigger, etc.

In the present description, the control ID field and a control content field corresponding thereto may be grouped and defined as a "control subfield".

2. Configuration of control content field per control ID (or type)

(1) Configuration of Control Content Field when Control ID (or Type) Corresponds to ACK/BA Request As a first embodiment, additional control content field signaling is not necessary in the case of an implicit immediate ACK/BA request.

As a second embodiment, it is necessary to signal information about a resource region in which an ACK/BA frame will be transmitted and/or a transmission scheme to an STA which will transmit the ACK/BA frame in the case of an explicit immediate ACK/BA request. In this case, the control content field may include information on the length of a UL PPDU, resource unit allocation information and/or differential MCS information as trigger information, for example. Here, the control content field may be configured in a size of 2 to 3 bytes. If the corresponding STA separately receives trigger information for transmission of different UL data, the STA may transmit the ACK/BA frame along with the UL data. Accordingly, control content may not be additionally signaled.

When the STA transmits ACK/BA (or response) through a (MAC) header, additional trigger information is not necessary, and thus control content may not be additionally signaled in this case.

Here, different control IDs/types may be respectively configured for a case in which trigger information for ACK/BA transmission is necessary and a case in which the trigger information is not necessary. This may be interpreted as a case in which ACK/BA is transmitted through a (MAC) header and a case in which ACK/BA is transmitted through a PPDU.

As a third embodiment, the control content field needs to additionally include a BAR control field and a BAR information field in addition to the trigger information in the second embodiment in the case of explicit delayed ACK/BA request (i.e., BAR transmission). Even if a compression method (e.g., compressed BAR control field) which will be described below is used, 4 bytes or more including the control ID field are required in order to configure an HE control field. Accordingly, the control content field for explicit delayed ACK/BA (or BAR) request may be included in an HE control field having a variable length or may be included/configured in an additional MPDU and transmitted through a payload. When a unicast trigger frame including trigger information is transmitted, only a compressed BAR control field and a BAR information field except the trigger information may be included in the control content field and transmitted. Here, the compressed BAR control field and the BAR information field may be configured as shown in the example of FIG. 34.

FIG. 34 is a diagram illustrating configurations of the compressed BAR control field and BAR information field according to an embodiment of the present invention.

In the case of multi-traffic identifier (TID), multiple HE control fields may be received. This may be performed by using the aforementioned multiple/variable HE control fields or including different HE control fields in MPDUs of A-MPDU.

Alternatively, a BAR (or BA response) may be configured as an MPDU and transmitted in a payload without using a compression method. Alternatively, a BAR (or BA response) may be configured as an MPDU and transmitted in a payload only in the case of multi-TID. In this case, a multi-TID related field may remain as a reserved bit.

If an additional QoS control field is transmitted for all the above-described cases (the first to third embodiment) and the first to third embodiments and/or information including No ACK are not indicated with respect to ACK policy, ACK policy may be transmitted along with a control ID and ACK (in the HE control field) in order to indicate the first to third embodiments and/or the information. Alternatively, a control ID additionally defined according to ACK policy may be transmitted. In this case, only a control ID may be transmitted (in the HE control field) when an ACK/BA response is transmitted in a (MAC) header in the first and second embodiments. Alternatively, the trigger information may be indicated through a trigger request and an ACK/BA request may be additionally indicated in the second and third embodiments.

(2) Configuration of Control Content Field when Control ID (or Type) Corresponds to ACK/BA Response.

As a first embodiment, signaling of content other than control IDs may be unnecessary in the case of ACK response.

As a second embodiment, a BA response cannot be included in an HE control field having a size limited to 4 bytes because 11 bytes or more are required only for the BA control field and the BA information field even if the compression method mentioned in the above-described BAR related embodiment is used. Accordingly, the control content field/information with respect to the BA response may be included in an HE control field having a variable length or configured as a separate MPDU and transmitted through a payload.

(3) Configuration of Control Content Field when Control ID (or Type) Corresponds to Buffer Status Request A control content field with respect to a buffer status request may not be additionally generated/signaled or may be used for an AP to send a request for buffer status with respect to a desired access category (AC) to an STA.

As an embodiment for the latter case, one control ID may be allocated/set for buffer status request. In this case, the AP may send a request for a buffer status to the STA by transmitting the control ID. Here, the AC that the AP desires may be indicated through 2 bits (which can indicate/include only one AC) or 4 bits (which can indicate/include 4 ACs in the form of a bitmap) included in the control content field.

As another embodiment for the latter case, 4 control IDs may be allocated/set for respective ACs. In this case, the AP may send a request for a buffer status with respect to a specific AC to the STA by transmitting a control ID corresponding to a desired AC to the STA.

When a buffer status response to a buffer status request is received through a PPDU (or the payload of the PPDU), trigger information indicating resources to be used to transmit the buffer status response may be included in the control content field or included in another MAC header (e.g., trigger header) and transmitted. When the buffer status response is transmitted through a (MAC) header, the trigger information may not be additionally included in the control content field. Here, different control IDs may be respectively allocated for a case in which the trigger information is necessary and a case in which the trigger information is not necessary to discriminate the cases from each other. This may be interpreted as allocation of different control IDs in order to discriminate a case in which the buffer status response is received through a PPDU (or the payload of the PPDU) from a case in which the buffer status response is received through a (MAC) header.

(4) Configuration of Control Content Field when Control ID (or Type) Corresponds to Buffer Status Response An STA may transmit a buffer status response as a response to a buffer status request or without a buffer status request, unsolicitedly (as necessary). Here, a control content field including control information about the buffer status response may be configured by including the conventional QoS control field (2 bytes) therein or configured as a new control content field.

FIGS. 35 and 36 are diagrams illustrating HE control field configurations for a buffer status response according to an embodiment of the present invention.

Referring to FIG. 35($a$), the control content field may be configured to include all information included in the conventional QoS control field as well as buffer status response information. In this case, the conventional QoS control field may be defined as a control ID/type of the HE control field.

Referring to FIG. 35($b$), the control content field may be newly configured to include buffer status response information including information about multiple ACs. Here, which AC corresponds to the buffer status response information may be indicated by an AC information field (4 bits) in the form of a bitmap.

The control content field may include a scaling factor field. The scaling factor field may indicate a scaling factor for an AC and may be configured as 4 bits corresponding to respective ACs. Each bit of the scaling factor field indicates a scaling factor of the AC corresponding thereto. For example, a specific bit of the scaling factor field indicates that the scaling factor of the AC corresponding to the specific bit is a unit of 64 octets when set to "0" and indicates that the scaling factor of the corresponding AC is a unit of 512 octets when set to "1".

Alternatively, the scaling factor field may be configured to indicate a common scaling factor for all ACs, and in this case, may be configured in a size of 2 to 4 bits (e.g., units of 64, 128, 256 and 512 octets). Here, all ACs refer to ACs indicated/identified in the form of a bitmap through the AC information field. For example, when the AC information field indicates AC 1 and AC 3 (more specifically, when the AC information field indicates buffer status response information about AC 1 and AC 3), a scaling factor indicated by the scaling factor field refers to a scaling factor common for AC 1 and AC 3.

When the scaling factor field is not configured as 4 bits (i.e., when the scaling factor is configured as 4 bits or less), 1 to 2 bits for indicating a buffer status type may be added to the control content field and thus the unit of the scaling factor may change. For example, the scaling factor may be indicated as an octet unit, as described above, when the buffer status type is a queue size and indicated as units of 32 is, 64 is, 128 us and 256 us when the buffer status type is TXOP duration requested.

The control content field may include a queue size or TXOP duration field requested, and the corresponding field indicates a queue size or requested TXOP duration information for multiple ACs and may be configured not to exceed 2 bytes.

For example, 1 byte may be allocated per AC in the corresponding field irrespective of the number of ACs (indicated in the AC information field), and thus a maximum of 2 ACs can be indicated. For example, when there is one AC, only 1 byte among 2 bytes may be used to indicate a queue size or a TXOP duration requested for the corresponding AC and the remaining 1 byte may be padded.

As another example, 2 bytes may be divided by the number of allocated ACs (or indicated in the AC information field) and used in the corresponding field. For example, 2 bytes are allocated to one AC when the number of allocated ACs (or indicated in the AC information field) is 1, 1 byte is allocated per AC when the number of allocated ACs is 2, 5 bits and 1-bit padding are allocated per AC when the number of allocated ACs is 3, 4 bits are allocated per AC when the number of allocated ACs is 4, and allocated bits can be used to indicate a queue size or a TXOP duration requested for the corresponding AC.

In this case, the scaling factor may not be additionally indicated, and the scaling factor may be fixed to the unit of 64 octets or 32 μs in the case of 2 bytes and may be fixed to the unit of 128 octets or 64 μs in the case of 1 byte.

Referring to FIG. 36, buffer status responses including AC information may be identified by different control IDs for respective ACs. For example, the control ID field can indicate a buffer status response for AC 1 (BE) (FIG. 36($a$)), a buffer status response for AC 2 (BK) (FIG. 36($b$)), a buffer status response for AC 3 (VI) (FIG. 36($c$)) or a buffer status response for AC 4 (VO) (FIG. 36($d$)) using a control type/ID.

Here, the scaling factor field may be configured as 2 bits or 1 bit and a buffer status type (queue size or TXOP duration requested) may be indicated by 1 bit. In this case, the configuration of the scaling factor (field) is the same as the embodiment described with reference to FIG. 35($b$).

(5) Configuration of Control Content Field when Control ID (or Type) Corresponds to CSI Feedback Request An HE control field for CSI feedback request may not include an additional content control field (i.e., an STA requests only CSI feedback without additional control content) or may include the conventional VHT control field in a compressed form. Alternatively, CSI feedback may be requested using the conventional HT/VHT control field instead of the HE control field.

When a unicast trigger frame including trigger information (e.g., information about a UL feedback transmission region and/or transmission method) is separately transmitted, only information (included in the conventional HT/VHT control field) about a UL feedback configuration method may be included in the control content field without trigger information and transmitted. Here, different control IDs may be respectively allocated to a case in which the trigger information is necessary and a case in which the trigger information is not necessary. This may be interpreted as allocation of different control IDs to a case in which CSI feedback is transmitted/received through a PPDU (or the payload of the PPDU) and a case in which CSI feedback is transmitted/received through a (MAC) header. When CSI feedback response is limited to the HE control field, additional trigger information may not need to be transmitted.

FIG. 37($a$) is a diagram illustrating an HE control field configuration for CSI feedback request according to an embodiment of the present invention.

Referring to FIG. 37(a), a control content field for CSI feedback request may include trigger information. Here, the trigger information may correspond to information on the length of a UL PPDU, resource unit allocation information and/or differential MCS information, for example.

When the control content field includes the trigger information in this manner, it may be difficult to configure the control content field as 3 bytes or less. Accordingly, the control content field may be included in an HE control field having a variable length or configured as a separate MPDU and transmitted through a payload.

When the control content field does not include the trigger information, only the trigger information is excluded as shown in the example of FIG. 37(a). In this case, the control content field may be configured as 4 bytes or less.

In addition, the control content field may include MSI (3 bits), MFB (15 bits), coding type (1 bit) and/or FB type (1 bit) as feedback request information.

Furthermore, the control content field may additionally include a bit for requesting/indicating reporting of a best channel/band/resource unit in addition to the feedback request information. When reporting of the best channel/band/resource unit is requested/indicated according to setting of the bit, an STA may report the best channel/band/resource unit when the STA sends a CSI feedback response, calculate MFB in the corresponding region and transmit the MFB.

(6) Configuration of Control Content Field when Control ID (or Type) Corresponds to CSI Feedback Response A control content field for a CSI feedback response may be configured in an HE control field by compressing the conventional VHT control field or may be configured using the conventional HT/VHT control field without being configured in an HE control field.

FIG. 37(b) is a diagram illustrating a configuration of an HE control field for a CSI feedback response according to an embodiment of the present invention. Referring to FIG. 37(b), the HE control field may include a control ID field indicating a CSI feedback response ID/type and a control content field including CSI feedback response information. Here, the control content field may include the conventional VHT control field in a compressed form. For example, an unsolicited MFB (1 bit), MFSI/Rsv (3 bits), MFB (15 bits), STBC (1 bit), coding type (1 bit) and/or FB type (1 bit) may be included in the control content field.

In addition, the control content field of the present embodiment may be used to report a best channel/band/resource unit as in the aforementioned embodiment. For example, 2 bits of the control content field may be used to indicate a best channel and 15 bits thereof may be used to indicate an MFB measurement result in the corresponding channel. Here, the bit sizes can be changed, of course.

Differently from the above-described embodiments, CSI feedback response and response may be discriminated from each other by including MRQ (1 bit) in the HE control field without using control IDs as in the conventional VHT control field. Example with respect to this is illustrated in FIG. 37(b).

FIG. 37(c) is a diagram illustrating an HE control field configuration for CSI feedback request/response according to an embodiment of the present invention.

Referring to FIG. 37(c), a control ID field may indicate CSI feedback request and response types/IDs and a control content field may include MRQ (1 bit), unsolicited MFB (1 bit), MFSI/Rsv (3 bits), MFB (15 bits), STBC (1 bit), coding type (1 bit) and/or FB type (1 bit).

According to the embodiment of the configuration of FIG. 37(c), the control content field for CSI feedback request/response may be configured as 3 bytes without trigger information.

(7) Configuration of Control Content Field when Control ID (or Type) Corresponds to UL Trigger (or UL MU Response Scheduling)

FIG. 38 is a diagram illustrating an HE control field configuration for a UL trigger (or UL MU response scheduling) according to an embodiment of the present invention.

A control content field corresponding to a UL trigger type/ID may indicate a UL transmission region and/or a transmission scheme (i.e., trigger information) such that an STA can transmit UL MU data/control information. The control content field may indicate trigger information for UL MU data or indicate the aforementioned trigger information for ACK/BA, buffer status and CSI feedback report transmission.

UL MU data and control information may be transmitted by being aggregated into a (MAC) header and an MPDU or an MPDU and an MPDU. An exemplary HE control field configuration for this is illustrated in FIG. 38(a).

Referring to FIG. 38(a), the control content field for a UL trigger may include a UL PPDU length (6 to 9 bits), resource unit allocation information (8 bits), MCS (2 to 4 bits), coding type (1 bit), BF (1 bit), Nsts (3 bits), GI type (1 bit) and/or STBC (1 bit) as trigger information. Since the size of trigger information may exceed 3 bytes according to information bit size, bit sizes of some information may be fixed to specific sizes, or MCS may be configured to indicate a differential MCS to reduce the bit size or a large PPDU length indication unit is set, thereby decreasing the trigger information size to 3 bytes of less.

Referring to FIG. 38(b), the control content field for a UL trigger may include compressed trigger information and a control type/ID therefor may be separately defined. For example, in the case of UL MU control information that needs to be transmitted more robustly than UL MU data, BF (1 bit), Nsts (3 bits), GI type (1 bit) and/or STBC (1 bit) may be fixed to robust values. That is, MCS may be fixed to a specific level or may be configured to indicate a differential value (e.g., an MCS level/MCS level-1/MCS level-2/MCS level-3 for MCS of a DL frame) in the control content field. In addition, BF, Nsts, GI type and STBC information may be excluded from the control content field by presetting no use of beamforming, Nsts=1, long GI and use of STBC. In this case, the size of the control content field may be reduced to 2 bytes.

In addition, if the length of a UL control frame is shorter than a normal UL frame (e.g., UL data frame), the UL PPDU length may be indicated as 16 μs unit in the control content field. In this case, the UL PPDU length may be 6 bits.

As described above, when the length of the HE control field is fixed to 4 bytes, the control ID field and the control content field may be aggregated into 4 bytes in one MPDU (or HE control field) and an exemplary configuration therefor is illustrated in FIGS. 38(b) and 38(c).

FIG. 38(b) illustrates an HE control field in which a control ID/content field for ACK/BA request and a control ID field for buffer status request have been aggregated and FIG. 38(c) illustrates an HE control field in which a control ID/content field for buffer status request of AC 1 and a control ID/content field for buffer status request of AC 2 have been aggregated.

However, the present invention is not limited to the above-described embodiment, and when the length of the HE control field is fixed to a value other than 4 bytes or is variable, the number of aggregated control ID/content fields may be controlled on the basis of the length of the HE control field.

FIG. 39 is a flowchart illustrating a method of transmitting an HE control field according to an embodiment of the present invention. The above embodiments/description can be equally applied to this flowchart and thus redundant description will be omitted.

First, an STA may receive a first PPDU (S3910) and transmit a second PPDU as a response to the first PPDU. Here, the STA may refer to a non-AP or an AP. If the STA is an AP, the first PPDU may correspond to a UL PPDU and the second PPDU may correspond to a DL PPDU. On the contrary, if the STA is a non-AP, the first PPDU may correspond to a DL PPDU and the second PPDU may correspond to a UL PPDU.

Here, the first or second PPDU may include at least one MPDU, and the MAC header of the MPDU may include a high-efficiency (HE) control field. The HE control field may be an HT control field in which a very high throughput (VHT) subfield indicating a VHT format and an HE subfield indicating an HE format are set to '1'. Furthermore, the HE control field may include one or more control subfield. Here, the one or more control subfields may have a fixed/preset length, and when multiple control subfields are included in the HE control field, the control subfields may be aggregated for control IDs and included in the HE control field.

Each of the multiple control subfields may include a control content field including control information and a control ID field indicating a control information type.

Here, a control ID may correspond to an acknowledgement (ACK) or block ACK (BA) request type, an ACK or BA response type, a buffer status request type, a buffer status response type, a channel state information (CSI) feedback request type, a CSI feedback response type or an uplink (UL) trigger type, and various content fields may be configured according to control IDs. As embodiments with respect to this, the embodiments described above with reference to FIGS. 33 to 38 may be equally applied.

FIG. 40 is a block diagram of each STA device according to an embodiment of the present invention.

In FIG. 40, the STA device 4010 may include memory 4012, a processor 4011, and an RF unit 4013. As described above, the STA device is an HE STA device, and may be an AP or a non-AP STA.

The RF unit 4013 is connected to the processor 4011, and may send/receive radio signals. The RF unit 4013 may up-convert data, received from the processor 4011, into transmission and reception bands, and may send a signal.

The processor 4011 is connected to the RF unit 4013, and may implement the physical layer and/or MAC layer according to the IEEE 802.11 system. The processor 4011 may be configured to perform the operations of various embodiments of the present invention according to the above-described drawings and descriptions. Furthermore, a module for implementing the operations of the STA 4010 according to the above-described various embodiments of the present invention may be stored in the memory 4012 and may be executed by the processor 4011.

The memory 4012 is connected to the processor 4011, and stores various pieces of information for driving the processor 4011. The memory 4012 may be included in the processor 4011 or installed outside the processor 4011 and may be connected to the processor 4011 by known means.

Furthermore, the STA device 4010 may include a single antenna or multiple antennas.

An overall configuration of the STA device 4010 of FIG. 40 may be implemented so that the contents described in the various embodiments of the present invention are independently applied or two or more of the embodiments are simultaneously applied to the overall configuration. In particular, the processor 4011 of the STA device may be implemented so that the above-described embodiments operate.

The terms in the embodiments according to the present invention may be replaced by other terms as necessary and are not limited to the aforementioned terms. Accordingly, different terms may be considered to refer to the same object if they have the same function.

In the aforementioned embodiments, the elements and characteristics of the present invention have been combined in specific forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be configured by combining claims not having an explicit citation relation in the claims or may be included as a new claim by amendments after filing an application.

The embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

Furthermore, the terms in the embodiments according to the present invention may be replaced by other terms as necessary and are not limited to the aforementioned terms. Accordingly, different terms may be considered to refer to the same object if they have the same function.

MODE FOR INVENTION

Various embodiments have been described in the best mode for carrying out the invention.

INDUSTRIAL APPLICABILITY

Although a frame transmission method in a wireless communication system according to the present invention has been described based on an example in which the frame transmission method is applied to the IEEE 802.11 system, the frame transmission method can be applied to various wireless communication systems in addition to IEEE 802.11 system.

What is claimed is:

1. An operation method for a station (STA) in a wireless LAN (WLAN) system, the operation method comprising:
receiving a first physical protocol data unit (PPDU); and
transmitting a second PPDU as a response to the first PPDU;
wherein the first or second PPDU includes at least one MAC protocol data unit (MPDU) and a MAC header of the MPDU includes a high-efficiency (HE) control field,
wherein the HE control field is a high throughput (HT) control field in which values of a very high throughput (VHT) subfield indicating a VHT format and an HE subfield indicating an HE format are set to "1", and includes one or more control subfields,
wherein the one or more control subfields are fixed to preset lengths and included in the HE control field by being aggregated,
wherein the one or more control subfields respectively includes a control content field including control information and a control identifier (ID) field including a type of the control information,
wherein the control ID corresponds to a buffer status response type or an uplink (UL) trigger type,
wherein, based on the control ID field including the control ID corresponding to the buffer status response type, the control content field corresponding to the control ID field includes buffer status response information,
wherein the buffer status response information includes an access category (AC) field and a scaling factor field,
wherein the scaling factor field indicates a common scaling factor for all ACs indicated by the AC field,
wherein the first PPDU and the second PPDU are comprised a physical preamble and a data field sequentially,
wherein the physical preamble includes sequentially a L(legacy)-preamble and a High Efficiency (HE)-preamble,
wherein the HE-preamble includes sequentially an HE-Signal (SIG) A field, an HE-Short Training Field (STF) field, and an HE-Long Training Field (LTF) field,
wherein a first Inverse Discrete Fourier Transform (IDFT)/Discrete Fourier Transform (DFT) period is applied from the L-preamble to the HE-SIG A field and a second IDFT/DFT period is applied from the HE-STF field to the data field, and
wherein the second IDFT/DFT period is 4 times of the first IDFT/DFT period.

2. The operation method according to claim 1, wherein the control ID further corresponds to an acknowledgement (ACK) or block ACK (BA) request type, an ACK or BA response type, a buffer status response type, a channel state information (CSI) feedback request type, or a CSI feedback response type.

3. The operation method according to claim 2, wherein, based on the control ID field including the control ID corresponding to the ACK or BA request type, a control content field corresponding to the control ID field includes trigger information about transmission of an ACK or BA response to the ACK or BA request.

4. The operation method according to claim 1, wherein the buffer status response information further includes a scaling factor field, a queue size field or a transmission opportunity (TXOP) duration field.

5. The operation method according to claim 4, wherein the AC field includes an AC corresponding to the buffer status response information in the form of a bitmap.

6. The operation method according to claim 2, wherein, based on the control ID field including the control ID corresponding to the CSI feedback request type, a control content field corresponding to the control ID field includes trigger information about transmission of a CSI feedback in response to the CSI feedback request and feedback request information.

7. The operation method according to claim 6, wherein the feedback request information includes MRQ sequence identifier (MSI) information, MCS feedback (MFB) information, space-time block coding (STBC) information, coding type information and/or feedback (FB) type information.

8. The operation method according to claim 2, wherein, based on the control ID field including the control ID corresponding to the CSI feedback response type, a control content field corresponding to the control ID field includes CSI feedback response information.

9. The operation method according to claim 8, wherein the CSI feedback response information includes unsolicited MFB indication information, MAC feedback sequence identifier (MFSI) information, MFB information, STBC information, coding type information and/or FB type information.

10. The operation method according to claim 1, wherein, based on the control ID field including the control ID corresponding to the UL trigger type, a control content field corresponding to the control ID field includes trigger information for triggering UL multi-user (MU) transmission.

11. The operation method according to claim 10, wherein the trigger information includes UL PPDU length information, resource unit allocation information, modulation and coding scheme (MCS) information, coding type information, information on the number of streams, beamforming information, STBC information and/or guard interval (GI) type information.

12. A station (STA) device in a wireless LAN (WLAN) system, comprising:
a radio frequency (RF) unit configured to transmit and receive RF signals; and
a processor configured to control the RF unit,
wherein the STA device is configured to:
receive a first physical protocol data unit (PPDU) and transmit a second PPDU as a response to the first PPDU,
wherein the first or second PPDU includes at least one MAC protocol data unit (MPDU) and a MAC header of the MPDU includes a high-efficiency (HE) control field,
wherein the HE control field is a high throughput (HT) control field in which values of a very high throughput (VHT) subfield indicating a VHT format and an HE subfield indicating an HE format are set to "1" and one or more control subfields, wherein the one or more control subfields are fixed to preset lengths and included in the HE control field by being aggregated, wherein the one or more control subfields respectively includes a control content field including control information and a control identifier (ID) field including a type of the control information, wherein the control ID corresponds to a buffer status response type or an uplink (UL) trigger type, wherein, based on the control ID field including the control ID corresponding to the buffer status response type, the control content field corresponding to the control ID field includes buffer status response information, wherein the buffer status response information includes an access category (AC) field and a scaling factor field, wherein the scaling factor field indicates a common scaling factor for all ACs indicated by the AC field, wherein the first PPDU and the second PPDU are comprised a physical preamble and a data field sequentially, wherein the physical preamble includes sequentially a L(legacy)-preamble and a High Efficiency (HE)-preamble, wherein the HE-preamble includes sequentially an HE-Signal (SIG) A field, an HE-Short Training Field (STF) field, and an HE-Long Training Field (LTF) field, wherein a first Inverse Discrete Fourier Transform (IDFT)/Discrete Fourier Transform (DFT) period is applied from the L-preamble to the HE-SIG A field and a second IDFT/DFT period is applied from the HE-STF field to the data field, and wherein the second IDFT/DFT period is 4 times of the first IDFT/DFT period.

* * * * *